United States Patent
Koza et al.

(10) Patent No.: US 6,532,453 B1
(45) Date of Patent: Mar. 11, 2003

(54) GENETIC PROGRAMMING PROBLEM SOLVER WITH AUTOMATICALLY DEFINED STORES LOOPS AND RECURSIONS

(75) Inventors: John R. Koza, 25372 La Rena La., Los Altos Hills, CA (US) 94022; Forrest H Bennett, III, Palo Alto, CA (US); David Andre, Menlo Park, CA (US); Martin A. Keane, Chicago, IL (US)

(73) Assignee: John R. Koza, Los Alto Hills, CA (US)

(*) Notice: Subject to any disclaimer, the term of this patent is extended or adjusted under 35 U.S.C. 154(b) by 0 days.

(21) Appl. No.: 09/290,521

(22) Filed: Apr. 12, 1999

(51) Int. Cl.$^7$ .............................................. G06F 15/18
(52) U.S. Cl. ....................................................... 706/13
(58) Field of Search ..................................... 706/13, 12

(56) References Cited

U.S. PATENT DOCUMENTS

| | | | |
|---|---|---|---|
| 4,697,242 A | | 9/1987 | Holland et al. ............... 364/513 |
| 4,881,178 A | | 11/1989 | Holland et al. ............... 364/513 |
| 4,935,877 A | | 6/1990 | Koza ............................ 364/513 |
| 5,136,686 A | | 8/1992 | Koza ............................ 395/13 |
| 5,148,513 A | | 9/1992 | Koza et al. .................... 395/13 |
| 5,249,259 A | * | 9/1993 | Harvey .......................... 706/13 |
| 5,343,554 A | | 8/1994 | Koza et al. .................... 395/13 |
| 5,390,282 A | * | 2/1995 | Koza et al. .................... 706/13 |
| 5,742,738 A | | 4/1998 | Koza et al. .................... 395/13 |
| 5,867,397 A | | 2/1999 | Koza et al. .................... 364/489 |
| 5,946,673 A | * | 8/1999 | Francone et al. .............. 706/13 |
| 5,946,674 A | * | 8/1999 | Nordin et al. ................. 706/13 |
| 6,058,385 A | * | 5/2000 | Koza et al. .................... 706/13 |
| 6,128,607 A | * | 10/2000 | Nordin et al. ................. 706/13 |
| 6,282,527 B1 | * | 8/2001 | Gounares et al. .............. 706/13 |
| 6,327,582 B1 | * | 12/2001 | Worzel .......................... 706/13 |

OTHER PUBLICATIONS

Konstam, A.; "Group Classification using a Mix of Genetic Programming and Genetic Algorithms". ACM Digital Library, Proceedings of the 1998 ACM Symposium on Applied Computing, Jun. 1998, pp. 308–312.*

Olsson, R.; "Population Management for Automatic Design of Algorithms Through Evolution", IEEE Xplore, IEEE World Congress on Computational Intelligence, May 1998, pp. 592–597.*

Nishiguchi et al.; "Evolution of Recursive Programs with Multi-Niche Genetic Programming (mnGP)", IEEE Xplore, IEEE World Congress on Computational Intelligence, May 1998, pp. 247–252.*

Maxwell, S.R., III; "Experiments with a Coroutine Execution Model for Genetic Programming", IEEE Xplore, IEEE World Congress on Computational Intelligence, Jun. 1994, vol. 1, pp. 413–417a.*

(List continued on next page.)

Primary Examiner—Thomas Black
Assistant Examiner—Kelvin Booker
(74) Attorney, Agent, or Firm—Blakely, Sokoloff, Taylor & Zafman LLP

(57) ABSTRACT

The present invention is a genetic programming problem solver that automatically generates computer programs to solve problems. The genetic programming problem solver incorporates architecture-altering operations. In one embodiment, the genetic programming problem solver uses architecture-altering operations for automatically defined functions and loops, together with indexed memory, to generate the resulting computer programs. In a second embodiment, the genetic programming problem solver uses architecture-altering operations of automatically defined function, loops, recursions, and stores to generate the resulting computer programs.

84 Claims, 17 Drawing Sheets

OTHER PUBLICATIONS

Koza, J.R., Genetic Programming, Encyclopedia of Computer Science, Version 2, Aug. 1997.*

Koza, J.R., Future Work and Practical Applications of Genetic Programming, Version 3, Jun. 1996.*

Koza, J.R., Genetic Programming as a Means for Programming Computers by Natural Selection, Statistics and Computing, vol. 4, No. 2, 1994.*

Koza et al., Use of Genetic Programming to Find an Impulse Response Function in Symbolic Form, NEC Research Index, Retrieved from the Internet: http://citeseer.nj.nec.com/koza92use.html, 1992.*

Koza, J.R., Survey of Genetic Algorithms and Genetic Programming, Proceedings of the Wescon 95, Nov. 1995.*

Angeline, P.J., Genetic Programming and Emergent Intelligence, Advances in Genetic Programming, MIT Press, 1994, pp. 75–98.*

Potter et al., A Cooperative Coevolutionary Approach to Function Optimization, Parallel Problem Solving from Nature (PPSN III), Springer, Berlin, 1994, pp. 249–257.*

Perkis, T., Stack–Based Genetic Programming, Proceedings of the 1994 IEEE World Congress on Computational Intelligence 1994, vol. 1, pp. 148–153.*

Sherrah et al., The Evolutionary Pre–Processor: Automatic Feature Extraction for Supervised Classification Using Genetic Programming, Genetic Programming 1997: Proceedings of the 2nd Annual Conference, 1997, pp. 304–312.*

Rosca et al., Causality in Genetic Programming, Proceedings of the 5th International Conference on Genetic Algorithms, Jul. 1995, pp. 256–263.*

Filho et al., Genetic Algorithm Programming Environments, Computer, vol. 27, No. 6, pp. 28–43, Jun. 1994.*

Andre, David, Koza, John R., "Evolution of map making: Learning, planning, and memory using genetic programming". Proceedings of the First IEEE Conference on Evolutionary Computation. IEEE Press, vol. 1, 1994.

Brave, Scott, "The evolution of memory and mental models using genetic programming". In Koza, John R., Goldberg, David E., Fogel, David B., and Riolo, Rick L. (eds.). 1996. Genetic Programming 1996: Proceedings of the First Annual Conference, Jul. 28–31, 1996, Stanford University, Cambridge, MA: MIT Press, 1996.

Holland, John H., "Escaping brittleness: The possibilities of general–purpose learning algorithms applied to parallel rule– based systems". In Michalski, Ryszard S., Carbonell, Jaime G. and Mitchell, Tom M. "Maching Learning: An artificial Intelligence Approach", vol. II, p. 593–623. Los Altos, CA: Morgan Kaufmann, 1986.

Langdon, William B., "Evolving data structures using genetic programming". In Eshelman, Larry J. (ed.). Proceedings of the Sixth International Conference on Genetic Algorithms. San Francisco, CA: Morgan Kaufmann Publishers, 1995.

Langdon, William B., "Using data structures within genetic programming". In Koza, John R., Goldberg, David E., Fogel, David B., and Riolo, Rick L. (eds.), 1996. Genetic Programing 1996: Proceedings of the First Annual Conference, Jul. 28–31, 1996, Stanford University. Cambridge, MA: MIT Press, 1996.

Raik, Simon E. and Browne, David G., "Evolving state and memory in genetic programming". In Yao, Xin, Kim J. H. and Furuhashi, T. (eds.). "Simulated Evolution and Learning". First Asia–Pacific Conference, SEAL '96. Taejon, Korea, Nov. 1996, Selected Papers. Lecture Notes in Artificial Intelligence, vol. 1285. Heidelberg: Springer–Verlag, 1997.

Teller, Astro, "Genetic programming, indexed memory, the halting problem, and other curiosities". Proceedings of the Seventh Florida Artificial Intelligence Research Symposium, 1994.

Koza, John R., "Genetic Programming: On the Programming of Computers by Means of Natural Selection", 1992 Massachusetts Institute of Technology, 4 pages.

Koza, John R., "Genetic Programming II: Automatic Discovery of Reusable Programs", 1994 Massachusetts Institute of Technology, 12 pages.

Xin Yao, "Following the Path of Evolvable Hardware", Communications of the ACM, Apr. 1999, vol. 42, No. 4, p. 47–49.

Moshe Sipper, Daniel Mange, Eduardo Sanchez, "Quo Vadis Evolvable Hardware?", Communications of the ACM, Apr. 1999, vol. 42, No. 4, p. 50–59.

Tetsuya Higuchi, Nobuki Kajihara, "Evolvable Hardware Chips for Industrial Applications", Communications of the ACM, Apr. 1999, vol. 42, No. 4, p. 60–69.

Adrian Thompson, Paul Layzell, "Analysis of Unconventional Evolved Electronics", Communications of the ACM, Apr. 1999, vol. 42, No. 4, p. 71–79.

Andre, David and Koza, John R., "Parallel genetic programming: A scalable implementation using the transputer architecture." In Angeline, Peter J. and Kinnear, Kenneth E. Jr. (editors), 1996. Advances in Genetic Programming 2. Cambridge, MA: The MIT Press, 1996.

Langdon, William B., "Data structures and genetic programming". In Angeline, Peter J. and Kinnear, Kenneth E. Jr. (editors), 1996. "Advances in Genetic Programming 2". Cambridge, MA: The MIT Press, 1996.

Nordin, Peter, "A compiling genetic programming system that directly manipulates the machine code". In Kinnear, Kenneth E. Jr. (editor). "Advances in Genetic Programming". Cambridge, MA: The MIT Press, 1994.

Teller, Astro, "The evolution of mental models". In Kinnear, Kenneth E. Jr. (ed.). "Advances in Genetic Programming". Cambridge, MA: The MIT Press, 1994.

* cited by examiner

GENETIC PROGRAMMING PROBLEM SOLVER WITH AUTOMATICALLY DEFINED STORES LOOPS AND RECURSIONS

FIELD OF THE INVENTION

The field of the invention is computer-implemented genetic algorithms; more particularly, the present invention relates to automatically creating computer programs to solve problems using computer-implemented genetic algorithms, including embodiments that use automatically defined stores, loops, and recursions.

BACKGROUND OF THE INVENTION

A central challenge of computer science is to get a computer to solve a complex problem without explicitly telling the computer how to do it (e.g., programming it). In particular, it would be desirable to have a problem-independent system whose input is a high-level statement of a problem's requirements and whose output is a working computer program that solves the given problem.

Genetic programming is an automatic technique that is capable of creating complex designs and structures, such as computer programs. Genetic programming approaches a problem in terms of "what needs to be done" as opposed to "how to do it." For example, genetic programming has demonstrated that it is capable of generating computer programs from a given problem definition. Genetic programming creates a variety of computer programs because it employs a probabilistic process of natural selection to evolve computer constructs and because it is unencumbered by the preconceptions that often channel human thinking down familiar paths.

Genetic Algorithms

A genetic algorithm provides a method of improving a given set of objects. The processes of natural selection and survival of the fittest provide a theoretical base for the genetic algorithm. In *Adaptation in Artificial and Natural Systems* (MIT Press 1975), Professor John H. Holland presents a mathematical theory of adaptation for both natural and artificial systems. An important part of Holland's book describes a "genetic algorithm" patterned after nature's methods for biological adaptation. In a later work, Holland (1986) describes a classifier system that employs a genetic algorithm and a bucket brigade algorithm to solve problems. U.S. Pat. No. 4,697,242 (Holland et al.) and U.S. Pat. No. 4,881,178 (Holland et al.) describe classifier systems that use fixed length binary strings in conjunction with a genetic algorithm. The fixed length binary strings of a classifier represent IF-THEN rules.

Genetic Programming

"Genetic programming" (also called the "non-linear genetic algorithm" or the "hierarchical genetic algorithm" in previous years) is described in the book entitled *Genetic Programming: On the Programming of Computers by Means of Natural Selection*, Koza, John R., Cambridge, Mass.: The MIT Press, 1992, the book entitled *Genetic Programming II: Automatic Discovery of Reusable Programs*, Koza, John R., Cambridge, Mass.: The MIT Press, 1994, and in U.S. Pat. Nos. 4,935,877, 5,136,686, 5,148,513, 5,343,554, 5,742,738, and 5,867,397.

Genetic programming is referred to as "non-linear" or "hierarchical" because the original genetic algorithm described by Holland in 1975 operated on linear strings of characters (resembling chromosomes in nature), whereas genetic programming operates on hierarchical program trees of various sizes and shapes.

Genetic programming is capable of evolving computer programs that solve, or approximately solve, a variety of problems from a variety of fields. Genetic programming starts with a "primordial ooze" of randomly generated programs composed of the available programmatic ingredients and then applies the principles of animal husbandry to breed a new (and often improved) population of programs. Genetic programming performs the breeding in a domain-independent way using the Darwinian principle of survival of the fittest, an analog of the naturally-occurring genetic operation of crossover (sexual recombination), and occasional mutation. The crossover operation is designed to create syntactically valid offspring programs (given closure amongst the set of ingredients). Genetic programming combines the expressive high-level symbolic representations of computer programs with the near-optimal efficiency of improvement associated with Holland's genetic algorithm. A program that solves (or approximately solves) a given problem often emerges from this process.

As demonstrated in the book, *Genetic Programming II: Automatic Discovery of Reusable Programs* Koza, John R., Cambridge, Mass.: The MIT Press, 1994, genetic programming can evolve multi-part programs consisting of a main program and one or more reusable, parameterized, hierarchically-called subprograms (called automatically defined functions or ADFs).

A basic embodiment of genetic programming breeds computer programs to solve problems by executing the following steps:

(1) Generate an initial population of random compositions of the functions and terminals of the problem (i.e., computer programs).

(2) Iteratively perform the following substeps until the termination criterion has been satisfied:

(A) Execute each program in the population and assign it a fitness value using the fitness measure.

(B) Create a new population of computer programs by applying the following operations. The operations are applied to computer program(s) chosen from the population with a probability based on fitness.

(i) Reproduction: Copy an existing program to the new population.

(ii) Crossover: Create new offspring program(s) for the new population by recombining randomly chosen parts of two existing programs.

(iii) Mutation: Create one new offspring program for the new population by randomly mutating a randomly chosen part of one existing program.

(3) The program that is identified by the method of result designation (e.g., the best-so-far individual) is designated as the result of the genetic algorithm for the run. This result may be a solution (or an approximate solution) to the problem.

Other genetic programming processes may use additional operations such as "permutation," "define building block" (also called "encapsulation"), or the architecture-altering operations discussed below.

Before applying genetic programming to a problem, the user must perform five major preparatory steps, as shown in FIG. 1B. The preparatory steps of genetic programming are the user's way of communicating the high-level statement of the problem to the genetic programming system. The preparatory steps identify what the user provides to the genetic programming system before launching a run of genetic programming. The preparatory steps serve to unmistakably distinguish between what the user supplies to the genetic programming system and what the system delivers.

In one embodiment, the five major preparatory steps for genetic programming entail determining: (1) the set of terminals (e.g., the actual variables of the problem, zero-argument functions, and random constants, if any) for each branch of the to-be-evolved computer program; (2) the set of primitive functions for each to-be-evolved branch; (3) the fitness measure (or other arrangement for explicitly or implicitly measuring fitness); (4) the parameters for controlling the run; and (5) the termination criterion and the method of result designation for the run. In addition, when automatically defined operations are used, the architecture of the programs to be evolved must be determined in some way (not shown). A traditional approach is for the user to specify the architecture prior to the run of genetic programming. In this approach, the user performs an architecture-defining preparatory step prior to the run of genetic programming. FIG. 1B shows the results 115 of the preparatory steps as input to genetic programming 105 to produce a computer program 110.

Before applying genetic programming to a problem, where a multi-part program is to be evolved, it is the user's responsibility to specify the architecture of the computer program. In one embodiment, the architecture of a computer program consists of the number of result-producing branches (which is just one for a one-output program), the number of function-defining branches with the number or arguments possessed by each function-defining branch (subroutine, automatically defined function), the number of loop-defining branches with associated arguments, the number of recursion-defining branches with associated arguments, and the amount and type of storage available to the program. Many programs consist of just one result-producing branch and no other branches. Determining the architecture for an overall program may facilitate or frustrate evolution of the solution to the problem. For example, a 6-dimensional problem may have a natural decomposition into 3-dimensional subproblems. If 3-dimensional subprograms are readily available during the evolutionary process, the problem may be relatively easy to solve by means of the evolutionary process; however, if they are not available, the problem may be difficult or impossible to solve. Thus, the question arises as to how to determine the architecture of the programs that participate in the evolutionary process.

The existing methods for making these architectural choices include the methods of prospective analysis of the nature of the problem, seemingly sufficient capacity, affordable capacity, and retrospective analysis of the results of actual runs. Sometimes these architectural choices flow directly from the nature of the problem that they are virtually mandated. However, in general, there is not way of knowing a priori the architecture of the program corresponding to the solution the problem.

Some problems have a known decomposition involving subproblems of known dimensionality. For example, some problems involve finding a computer program (e.g., mathematical expression, composition of primitive functions and terminals) that produces the observed value of a dependent variable as its output when given the values of a certain number of independent variables as input. Problems of this type are called problems of symbolic regression, system identification, or simply "black box" problems. In many instances, it may be known that a certain number of the independent variables represent a certain subsystem or subspace. In that event, the problem may be decomposable into subproblems based on the known lower dimensionality of the known subsystem or subspace.

For many problems, the architectural choices can be made on the basis of providing seemingly sufficient capacity by over-specifying the number of functions and terminals. Over-specification often works to provide the eventual architecture, at the expense of processing time and waste of resources.

Resources are used by each part of a program. The practical reality is that the amount of resources that one can afford to devote to a particular problem will strongly influence or dictate the architectural choice. Often the architectural choices are made on the basis of hoping that the resources that one could afford to devote to the problem will prove to be sufficient to solve the problem.

A retrospective analysis of the results of sets of actual runs made with various architectural choices can determine the optimal architectural choice for a given problem. That is, in retrospective analysis, a number of runs of the problem are made with different combinations of the number of functions and terminal to retrospectively compute the effort required to solve the problem with each such architecture and to identify the optimal architecture. If one is dealing with a number of related problems, a retrospective analysis of one problem may provide guidance for making the required architectural choice for a similar problem.

A computer program is an entity that receives inputs, performs computations, and produces outputs. A computer program performs basic arithmetic and conditional computations on.variables of various types (including integer, floating-point, and Boolean variables), performs iterations and recursions, stores intermediate results in memory, organizes groups of operations into reusable functions or subroutines, passes information to subroutines in the form of dummy variables (formal parameters), receives information from subroutines in the form of return values, and organizes subroutine and a main memory into a hierarchy. A system for automatically creating computer programs should create entities that possess most or all of the above essential features of computer programs.

What is needed is a process that allows architecture to be created automatically during the genetic process and that allows for the automatic allocation of resources based upon a set of fixed terminals and functions without user intervention.

References Cited

U.S. Patents

U.S. Pat. No. 4,697,242, "Adaptive Computing System Capable of Learning and Discovery", issued Sep. 29, 1987, Holland et al.

U.S. Pat. No. 4,881,178, "Method of Controlling a Classifier System," issued Nov. 14, 1989, Holland et al.

U.S. Pat. No. 4,935,877, "Non-Linear Genetic Algorithms for Solving Problems," issued Jun. 19, 1990, Koza.

U.S. Pat. No. 5,136,686, "Non-Linear Genetic Algorithms for Solving Problems by Finding a Fit Composition of Functions," issued Aug. 4. 1992, Koza.

U.S. Pat. No. 5,148,513, "A Non-Linear Genetic Process for Use with Plural Co-Evolving Populations," issued Sep. 15, 1992, Koza, John R., and Rice, James P.

U.S. Pat. No. 5,343,554, "A Non-Linear Genetic Process for Data Encoding and for Solving Problems Using Automatically Defined Functions," issued Aug. 30, 1994, Koza, John R., and Rice, James P.

U.S. Pat. No. 5,742,738, "Simultaneous Evolution of the Architecture of a Multi-part Program to Solve a Problem Using Architecture Altering Operations," issued Apr. 21, 1998, Koza, John R., Andre, David, and Tackett, Walter Alden.

U.S. Pat. No. 5,867,397, "Method and Apparatus for Automated Design of Complex Structures Using Genetic Programming", issued Feb. 2, 1999, Koza, John R., Bennett III, Forrest H., and Andre, David.

Other Publications

Andre, David and Koza, John R., Evolution of map making: Learning, planning, and memory using genetic programming. *Proceedings of the First IEEE Conference on Evolutionary Computation*. IEEE Press., Volume I, 1994.

Andre, David and Koza, John R., Parallel genetic programming: A scalable implementation using the transputer architecture. In Angeline, Peter J. and Kinnear, Kenneth E. Jr. (editors), 1996. *Advances in Genetic Programming* 2. Cambridge, Mass.: The MIT Press, 1996.

Brave, Scott, Using genetic programming to evolve mental models. *Proceedings of the Fourth Golden West Conference on Intelligent Systems*. Raleigh, N.C.: International Society for Computers and Their Applications, 1995.

Brave, Scott, The evolution of memory and mental models using genetic programming. In Koza, John R., Goldberg, David E., Fogel, David B., and Riolo, Rick L. (eds.). 1996. *Genetic Programming 1996: Proceedings of the First Annual Conference*, Jul. 28–31. 1996, Stanford University, Cambridge, Mass.: MIT Press, 1996.

Holland, John H., *Adaptation in Natural and Artificial Systems: An Introductory Analysis with Applications to Biology, Control, and Artificial Intelligence*. Ann Arbor, Mich.: University of Michigan Press. Second edition. Cambridge, Mass.: The MIT Press, 1975.

Holland, John H., Escaping brittleness: The possibilities of general-purpose learning algorithms applied to parallel rule-based systems. In Michalski, Ryszard S., Carbonell, Jaime G. and Mitchell, Tom M. *Machine Learning: An Artificial Intelligence Approach, Volume II*. P. 593–623. Los Altos, Calif.: Morgan Kaufmann, 1986.

Koza, John R., *Genetic Programming: On the Programming of Computers by Means of Natural Selection*. Cambridge, Mass.: The MIT Press, 1992.

Koza, John R., *Genetic Programming II: Automatic Discovery of Reusable Programs*. Cambridge, Mass.: The MIT Press, 1994.

Langdon, William B., Evolving data structures using genetic programming. In Eshelman, Larry J. (ed.). *Proceedings of the Sixth International Conference on Genetic Algorithms*. San Francisco, Calif.: Morgan Kaufmann Publishers, 1995.

Langdon, William B., Using data structures within genetic programming. In Koza, John R., Goldberg, David E., Fogel, David B., and Riolo, Rick L. (eds.), 1996. *Genetic Programming 1996: Proceedings of the First Annual Conference*. Jul. 28–31, 1996. Stanford University. Cambridge, Mass.: MIT Press, 1996.

Langdon, William B., Data structures and genetic programming. In Angeline, Peter J. and Kinnear, Kenneth E. Jr. (editors), 1996. *Advances in Genetic Programming* 2. Cambridge, Mass.: The MIT Press, 1996.

Langdon, William B., *Genetic Programming and Data Structures: Genetic Programming+Data Structures= Automatic Programming!* Amsterdam: Kluwer, 1998.

Nordin, Peter, A compiling genetic programming system that directly manipulates the machine code. In Kinnear, Kenneth E. Jr. (editor). *Advances in Genetic Programming*. Cambridge, Mass.: The MIT Press, 1994.

Raik, Simon E. and Browne, David G., Evolving state and memory in genetic programming. In Yao, Xin, Kim, J. H. and Furuhashi, T. (eds.). *Simulated Evolution and Learning*. First Asia-Pacific Conference SEAL '96. Taejon, Korea, November 1996. Selected Papers. Lecture Notes in Artificial Intelligence, Volume 1285. Heidelberg: Springer-Verlag, 1997.

Teller, Astro, The evolution of mental models. In Kinnear, Kenneth E. Jr. (ed.). *Advances in Genetic Programming*. Cambridge, Mass.: The MIT Press, 1994.

Teller, Astro, Genetic programming, indexed memory, the halting problem, and other curiosities. *Proceedings of the Seventh Florida Artificial Intelligence Research Symposium*, 1994.

SUMMARY OF THE INVENTION

A general purpose genetic programming problem solving mechanism and process are described. In one embodiment, the computer programs are automatically generated to solve problems. In one embodiment, the process creates a population of programmatic entities from a set of generic functions. The process then generates a solution to the problem by altering an architecture of at least one programmatic entity in the population by performing at least one of an automatically defined loop, an automatically defined recursion, and an automatically defined store. The process then evolves the population to generate a new entity in the population.

DESCRIPTION OF THE DRAWINGS

The present invention will be understood more fully from the detailed description given below and from the accompanying drawings of the preferred embodiments of the invention, which, however, should not be taken to limit the invention to the specific embodiments but are for explanation and understanding only.

DETAILED DESCRIPTION OF THE INVENTION

Figure 1A:
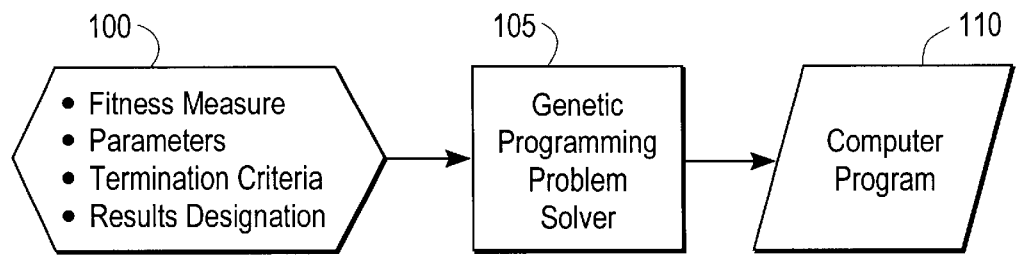
FIG. 1A is a block diagram of a general purpose problem solving system.
Figure 1B:
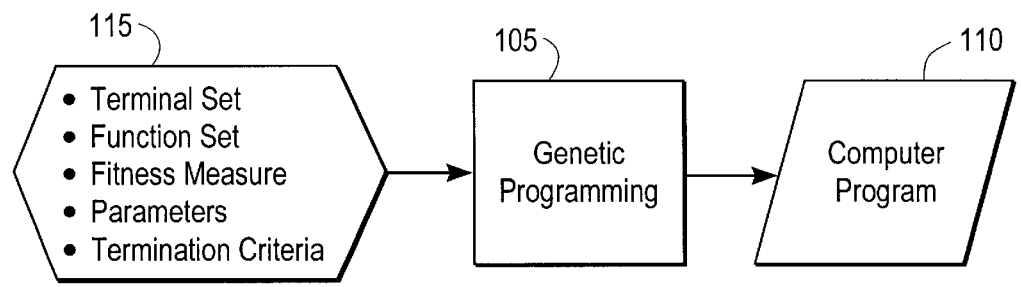
FIG. 1B is a block diagram of the prior art of a general purpose problem solving system.

The present invention describes a system and method for a genetic programming problem solver that automatically generates computer programs to solve pre-specified problems.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of a Genetic Programming Problem Solver

Genetic programming problem solvers and processes for solving problems are described. The computer programs satisfy pre-specified goals. In one embodiment, the problem solver creates a population of entities from a set of non-user-specified terminals and a set of non-user-specified generic functions. The set of functions and terminals are used on many problems and not tailored to the user's immediate problem. The problem solver automatically determines the architecture of each entity in the population. The problem solver then generates a solution to the problem by evolving a set of new entities in the population by modifying the population of entities.

FIG. 1A is a block diagram of one embodiment of the Genetic Programming Problem Solver. In FIG. 1A, preparatory steps 100 are provided to the Genetic Programming Problem Solver (GPPS) 105. GPPS 105 produces a computer program 110 that solves the given problem. GPPS 105 may produce one or more computer programs that solve the problem. In order to address a central aim of machine learning and artificial intelligence—to get a computer to solve a problem without the user-explicitly instructing the computer how to do it, GPPS 105 eliminates the need for the user to specify the function set and terminal set prior to applying genetic programming to a problem by using a standardized set of generic function's and terminals. GPPS 105 uses a generic function set that is not specifically tailored to a particular problem being handled. Thus, GPPS 105 eliminates the first and second major preparatory step for genetic programming (determining and supplying the terminal and function sets).

In addition, in one embodiment, GPPS 105 eliminates the need for the user to specify whether to employ subroutines (automatically defined functions (ADFs)) and loops in solving a given problem. The first embodiment eliminates this need by using architecture-altering operations during the run of genetic programming to create, duplicate, and delete ADFs and loops. Thus, in this embodiment, GPPS 105 also eliminates the need.for the user to pre-specify the architecture of the computer program.

In another embodiment, GPPS 105 eliminates not only the need to specify whether to employ ADFs and loops, but also the need to specify whether to employ recursions and internal storage in solving a given problem. GPPS 105 may implement this by using architecture-altering operations during the run of genetic programming to create, duplicate, and delete recursions and internal storage. Moreover, in one embodiment, if a program contains automatically defined functions, both embodiments also eliminate the need for the user to specify the number of arguments possessed by each ADF. If the loops, recursions, or stores possess arguments, the embodiments also eliminate the number of arguments taken by each loop, recursion, or store. Thus, this embodiment eliminates the need for the user to pre-specify the architecture of the computer program.

In one embodiment, GPPS 105 is capable of automatically creating computer programs with (1) various numbers of inputs; (2) various numbers of outputs; (3) one or more main result-producing branches that are to be evolved; (4) zero or more automatically defined functions (ADFs), to be evolved, each possessing zero or more arguments; (5) zero or more automatically defined loops (ADLs), each (in one embodiment) consisting of a loop initialization branch having a sequence of steps that are evolved, a loop condition branch having a sequence of steps to be evolved, a loop body branch having a sequence of steps to be evolved, and a loop update branch having a sequence of steps to be evolved; and (6) a fixed number of cells of indexed memory.

In an alternative embodiment, GPPS 105 has the additional capability of handling programs with (1) an initially-unspecified number of automatically defined recursions (ADRs) each consisting of a recursion condition branch consisting of a to-be-evolved sequence of steps, a recursion body branch having a sequence of steps is to be evolved, a recursion update branch having a sequence of steps to be evolved, and a recursion ground branch having a sequence of steps to be evolved; and (2) internal storage of an initially-unspecified number and type as implemented by automatically defined stores (ADSs) (which are in lieu of the indexed memory of embodiment one).

A computer program is an entity that receives certain inputs, performs various operations on them, and produces certain outputs. The vast majority of problems in Koza, John R., *Genetic Programming: On the Programming of Computers by Means of Natural Selection.* Cambridge, Mass.: The MIT Press, 1992, and Koza, John R., *Genetic Programming II: Automatic Discovery of Reusable Programs.* Cambridge, Mass.: The MIT Press, 1994 involve the four arithmetic functions of addition, subtraction, multiplication, and division and a conditional branching operator (e.g., the three-argument "If Greater Than Zero" IFGTZ). Arithmetic and conditional functions have proven to be well-suited for a broad range of problems to be solved. These primitive functions constitute the core of the repertoire of primitive machine code instructions for virtually every general-purpose computer that has ever been built precisely because human programmers have found them useful in solving a broad range of problems.

In addition, computer programs process variables of many different types (e.g., Boolean-valued variables, integer-valued variables, and floating-point variables). Floating-point variables have the advantage of subsuming both Boolean and integer variables in the sense that a floating-point variable can be readily interpreted as a Boolean or integer variable. Specifically, an integer variable can be represented by a floating-point number by adopting the convention that each variable that is required to be integral will be floored (i.e., reduced it to the largest integer less than or equal to it). Similarly, a Boolean variable can be represented by a floating-point number by adopting the convention that a positive floating-point number represents the Boolean value of TRUE and a zero or negative floating-point number represents FALSE.

The inputs to the computer programs can, without loss of generality and without a significant sacrifice in convenience, be received as an input vector. The outputs can be handled similarly by means of an output vector. Indeed, inputs and outputs may be so treated in practice internally in ordinary computing machines. Problem-specific side-effecting functions (e.g., robotic control functions) can be handled, without loss of generality, by way of an output vector and an output interface (wrapper) that converts numerical output to side-effecting actions.

Constrained Syntactic Structure of the Program Trees in the Population

Figure 2:
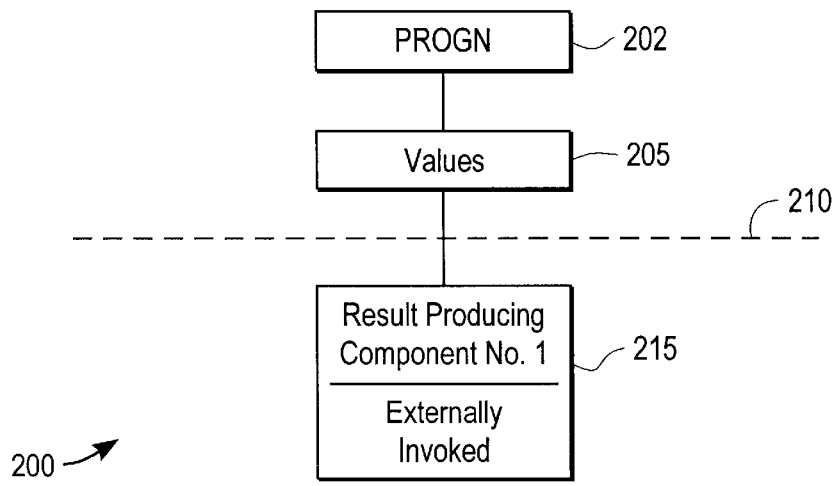
FIG. 2 illustrates one embodiment of a constrained syntactic structure.

FIG. 2 illustrates one embodiment of a constrained syntactic structure for a program tree 200 and shows one result-producing branch 215. In alternate embodiments, program trees may not conform to this particular constrained syntactic structure.

Both the random program trees in the initial population (generation zero) and any random subtrees created by the architecture-altering operations in later generations are created to conform.to the constrained syntactic structure of the program tree 200. An external controller invokes (executes) the result-producing branch 215 and the result-producing branch 215 returns values to the VALUES function 205. The result-producing branch may be referred to as an externally invokable sub-entity of the overall program because it is a main program that is invoked from the outside by an external controller. This contrasts with internally invokable sub-entities, such as automatically defined functions (also referred to as subroutines or, occasionally, function-defining branches), loops, and recursions, which are invoked (called) by branches from inside the overall program. In one embodiment, the VALUES function 205 performs the function by the same name in the programming language LISP in.that it accepts all values returned from the result-producing branch 215. The result-producing branch 215 and VALUES function 205 are grouped in a set by the place-holder PROGN function 202. PROGN function 202 allows the.branches to execute in sequence (performing the same role as the PROGN function in LISP). FIG. 2 also includes line 210, which designates portions of the entity that are susceptible to genetic operations, such as crossover and mutation. Such operations can only occur on portions of the entity below line 210. Those portions above line 210 are immune from being the subject of these operations.

In one embodiment, each program in generation zero has a uniform architecture consisting of one result-producing branch 215. There are no automatically defined functions or loops in generation zero of this embodiment. Also, in one embodiment, after generation zero, GPPS 105 uses the architecture-altering operations to create, duplicate, and delete automatically defined functions and to determine the number of arguments possessed by each automatically defined function. GPPS 105 allows hierarchical references among the automatically defined functions created by the architecture-altering operations. Similarly, GPPS 105 uses the architecture-altering operations to create, duplicate, and delete automatically defined loops.

In another embodiment, each program in generation zero has a uniform architecture having one result-producing branch 215. There are no automatically defined functions (ADF), no automatically defined loops (ADL), no automatically defined recursions (ADR), and no automatically defined stores (ADS) in generation zero of this embodiment. Also in another embodiment, after generation zero, GPPS 105 uses the architecture-altering operations to create, duplicate; and delete automatically defined functions and to determine the number of arguments possessed by each automatically defined function. GPPS 105 allows hierarchical references among the automatically defined functions created by the architecture-altering operations. Similarly, GPPS 105 uses the architecture-altering operations to create, duplicate, and delete ADLs, ADRs, and ADSs from individual programs. In the embodiments, hierarchical references are also possible between automatically defined loops (subject to the usual considerations of execution time associated with such nested loops). And, in one embodiment using automatically defined recursion, hierarchical references are also possible between automatically defined recursions (again subject to the usual considerations of execution time associated with such nested recursions).

Description of One Embodiment of GPPS

Figure 3A:
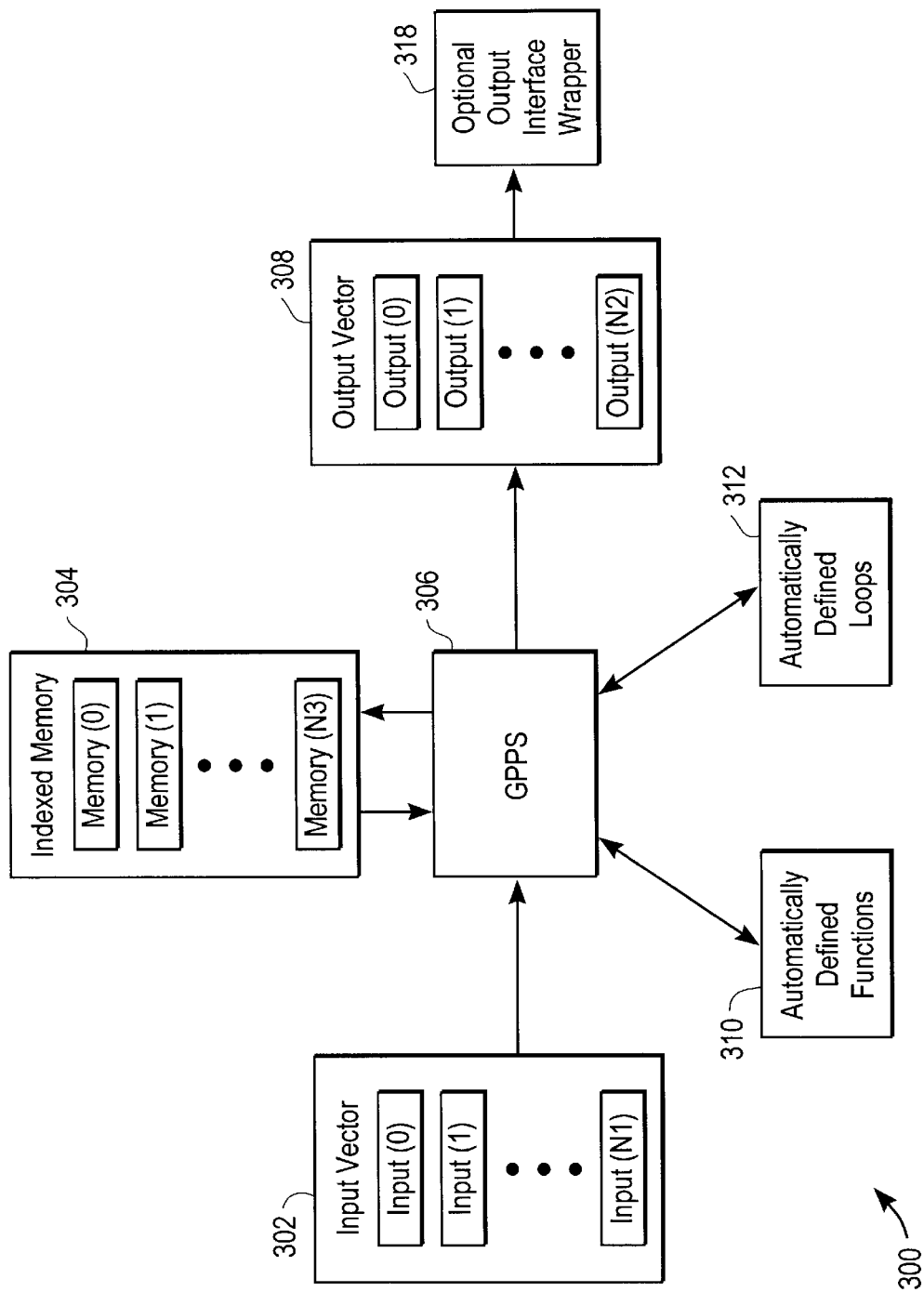
FIG. 3a is a data flow diagram of a first embodiment of a genetic programming problem solver.

FIG. 3a is a data flow diagram of one embodiment of a genetic programming problem solver (GPPS) 300. FIG. 3a includes input vector 302 (of size N1), output vector 308 (of size N2), and indexed memory 304 (of size N3). GPPS 306 potentially may have zero, one, or more automatically defined functions 310 and zero, one, or more automatically defined loops 312. Automatically defined functions 310 can each possess zero, one, or more arguments. GPPS 300 may also contain a generic function sets that is not specifically tailored to each new problem being handled by GPPS 300.

Referring to FIG. 3a, GPPS 300 contains the following generic functions and terminals:

arithmetic functions
    addition (+),
    subtraction (−),
    multiplication (*),
    protected division %, conditional branching operators
"If Greater Than Zero" IFGTZ,
"If Equal Zero" IFEQZ,
numerically valued logical functions
conjunction TAND,
disjunction TOR,
negation TNOT,
input reading function
read linear input RLI,
writing and reading functions for indexed memory
write indexed memory WIM,
read indexed memory RIM,
output writing and reading functions
write linear output WLO,
read linear output RLO,
conversion function
FLOOR,
terminals
floating-point random constants, R,
a constant specifying the number of inputs, NINPUTS,
a constant specifying the number of outputs, NOUTPUTS,
the loop index, INDEX,
potential automatically defined functions 310 such as
ADF0,
ADF1,
ADF2,
ADF3,
potential terminals representing the dummy variables (formal parameters) of the potential automatically defined functions 310 such as
ARG0,
ARG1,
ARG2,
ARG3,
potential terminals representing the return value of the loop body branch of each potential automatically defined loop 312, such as
LBB0, and
LBB1.

In addition to the floating-point random constants, the terminal set of GPPS 306 includes the following terminals:

NINPUTS is an externally established, invariant terminal that specifies the number of input(s) for the problem in input vector 302.

NOUTPUTS is an externally established, invariant terminal that specifies the number of output(s) for the problem in output vector 308.

INDEX is the loop index for automatically defined loops 312. It is externally initialized to zero prior to execution of a program. It remains zero if there are no automatically defined loops 312 in the program. It is externally initialized to zero as the beginning of execution of each automatically defined loop 312. It is externally incremented by one after the end of each execution of a loop update branch. If it is referenced outside of an automatically defined loop 312, it returns its leftover value.

The addition, subtraction, multiplication, and division functions are the basic operations of general-purpose computers. Nordin, Peter, A compiling genetic programming system that directly manipulates the machine code. In Kinnear, Kenneth E. Jr. (editor). *Advances in Genetic Programming*. Cambridge, Mass.: The MIT Press, 1994, noted the usefulness of the machine code operations of addition, subtraction, multiplication, division, and conditional operations in solving problems. In one embodiment, the arithmetic functions are advantageously implemented in a protected form that prevents overflows, underflows, or undefined combinations of values (such as division by zero) from stopping execution of the overall program.

In addition to the IFGTZ conditional branching operator and the arithmetic functions, the function set of GPPS 306 includes the IFEQZ ("If Equal Zero") function, which is the three-argument conditional branching operator that evaluates and returns its second argument if its first argument (the condition) is equal to zero, but otherwise evaluates and returns its third argument.

There are three numerically valued logical functions: TAND, TOR, and TNOT. TAND is the two-argument numerical-valued conjunctive function returning a floating-point +1.0 if both of its arguments are positive, but returning –1.0 otherwise. TAND is a short-circuiting (optimized) function in the sense that its second argument will not be evaluated (and any side-effecting function contained therein will remain unexecuted) if its first argument is negative.

TOR is the two-argument numerical-valued disjunctive function returning a floating-point +1.0 if one or both of its arguments is positive, but returning –1.0 otherwise. TOR is a short-circuiting (optimized) function in the sense that its second argument will not be evaluated (and any side-effecting function contained therein will remain unexecuted) if its first argument is positive.

TNOT is the one-argument numerical-valued negation function returning a floating-point +1.0 if its argument is negative, but returning –1.0 otherwise. RLI ("Read Linear Input") is a one-argument function that returns the value of the element of input vector 302 specified by the argument. The argument is adjusted by flooring it and then taking it modulo the size (NINPUTS) of input vector 302. WIM ("Write Indexed Memory"), a two-argument function, writes the value returned by the first argument into the location of indexed memory 304 specified by the second argument (adjusted in the same manner as above based on the size of indexed memory 304).

RIM ("Read Indexed Memory") is a one-argument function that returns the value of the element of the vector of indexed memory specified by the argument (adjusted in the same manner as above based on the size of indexed memory 304).

WLO ("Write Linear Output"), a two-argument function, writes the value returned by the first argument into the location in output vector 308 specified by the second argument (adjusted in the same manner as above based on the size, NOUTPUTS, of output vector 308).

RLO ("Read Linear Output") is a one-argument function that reads the location in output vector 308 specified by the argument (adjusted in the same manner as for RLI). This function enables output vector 308 to be used as an additional area of indexed memory.

FLOOR is the one-argument conversion function that floors its argument by reducing it to the next lower integer.

GPPS 306 initializes all cells of indexed memory 304 and all cells of the output vector 308 to zero for each set of inputs (i.e., each fitness case). If the fitness evaluation of a program requires that it be run through a series of time steps, GPPS 306 does not initialize indexed memory 304 or output vector 308 before each time step.

Since the initialization, updating, and terminating of the iteration is controlled by branches that will be subject to vicissitudes of the evolutionary process, the total number of iterations that can be performed by any one iteration-performing branch is rationed.

In one embodiment, when GPPS 306 is used to solve a problem, the program architecture, the function set, and the terminal set do not change from problem to problem. That is, GPPS 306 eliminates the first and second preparatory steps of genetic programming. Thus, there are only three problem-specific preparatory steps with GPPS 306, namely determining the fitness measure, determining the run's control parameters and determining the termination criterion and the method of result designation. It is clear that the determination of the fitness measure (the third major preparatory step of genetic programming) is, as a general rule, the most important preparatory step in applying genetic programming to a problem.

Description of an Alternative Embodiment of GPPS

Figure 3B:
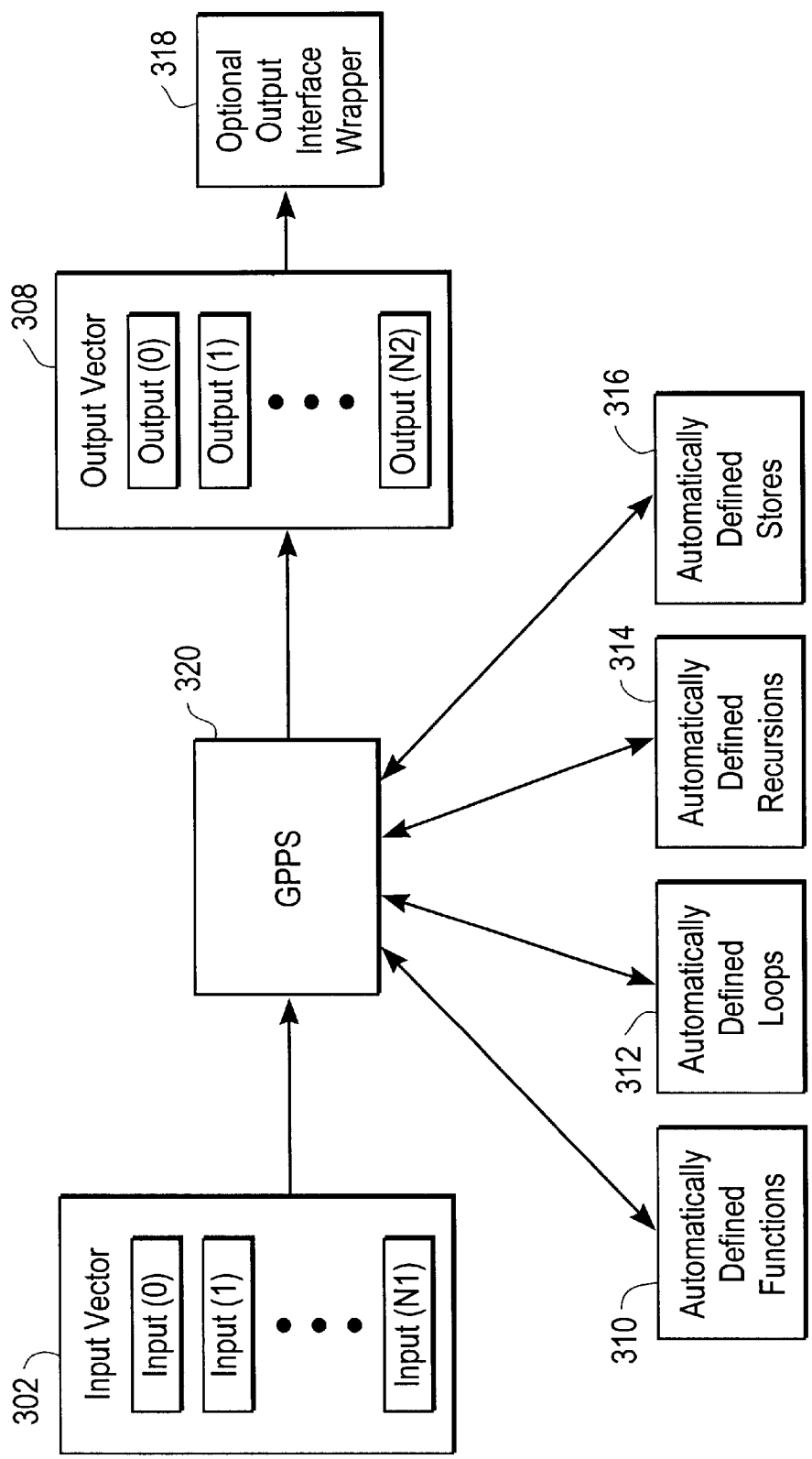
FIG. 3b is a data flow diagram of a second embodiment of a genetic programming problem solver.

FIG. 3b is a data flow diagram of a second embodiment of a genetic programming problem solver 330 (GPPS). FIG. 3b includes input vector 302 (of size N1), output vector 308 (of size N2), optional output interface wrapper 318, and GPPS 320. In addition, GPPS 330 may have zero, one, or more automatically defined functions 310, automatically defined loops 312, automatically defined recursions 314, and automatically defined stores 316.

The FIG. 3b embodiment uses the same generic functions and terminals as for the embodiment shown in FIG. 3a except for the following. Because GPPS 330 replaces the built-in indexed memory 304 by automatically defined stores 316, GPPS 330 does not use the WIM ("Write Indexed Memory") and the RIM ("Read Indexed Memory") functions. Because the decision to use internal storage is automatic, GPPS 330 does not use the RLO function. Referring to FIG. 3b, GPPS 330 adds potential writing and reading functions for implementing automatically defined stores, such as: storage writing branch, SWB0, and storage reading branch, SRB0, and storage writing branch, SWB1, and storage reading branch, SRB1.

Figure 4:
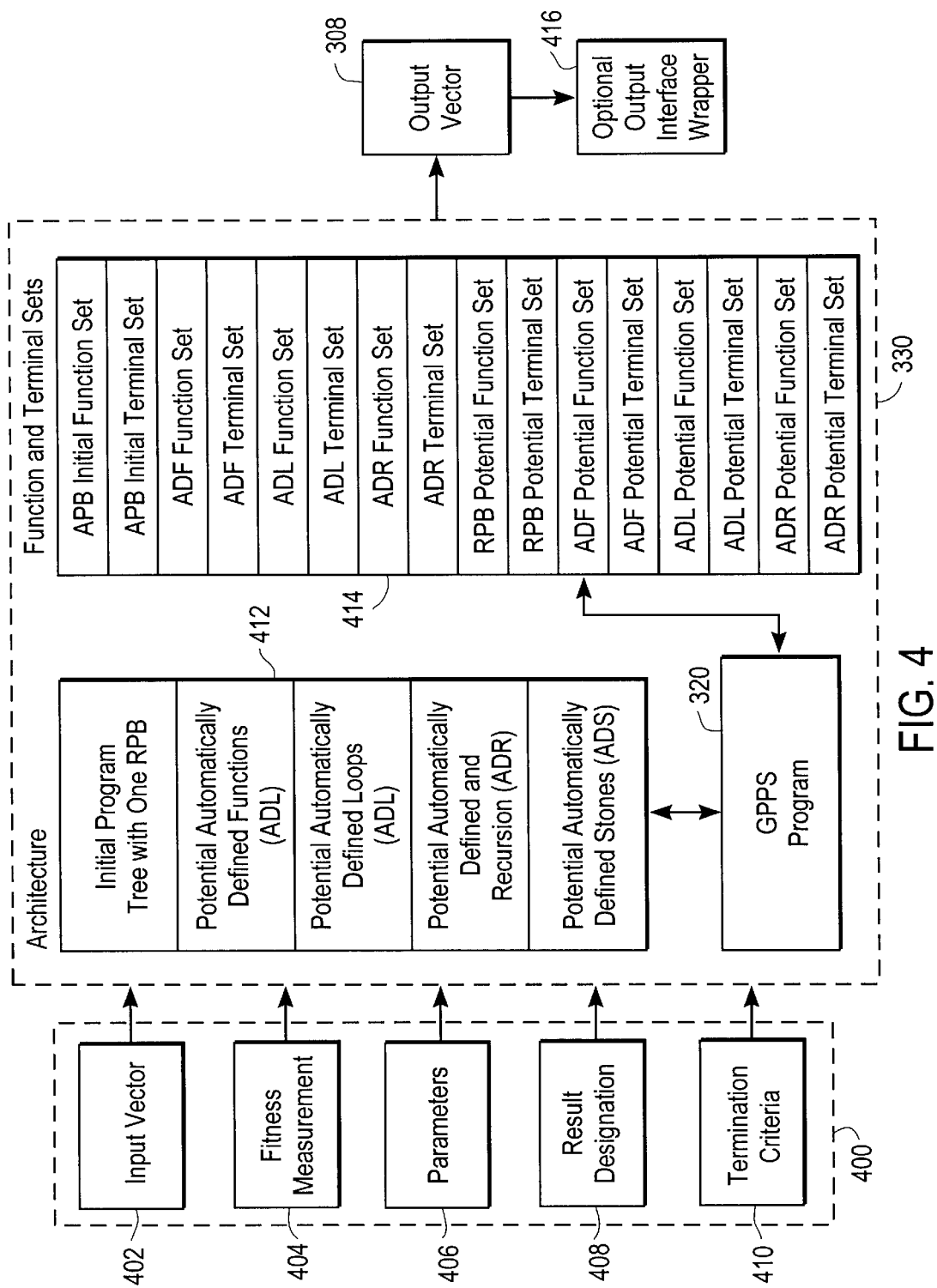
FIG. 4 is a block diagram illustrating external and internal structural altering components of the embodiment of FIG. 3b.

FIG. 4 is a block diagram of one embodiment of GPPS 330 of FIG. 3b. FIG. 4 shows external inputs 400, architectural altering operations 412, function and terminal sets 414, GPPS 320, and output vector 308. External inputs 400 includes input vector 402, fitness measurement 404, parameters 406, result designation 408, and termination criteria 410. GPPS 330 contains a series of architectural altering operations 412. In one embodiment, architectural altering operations 412 may cause the duplication, creation, or deletion of potential automatically defined functions (ADFs), potential automatically defined loops (ADLs), potential automatically defined recursions (ADRs), and potential automatically defined stores (ADSs). The architectural altering operations may not include ADR or ADS.

In addition, GPPS 330 contains function and terminal sets 414. GPPS 330 also contains optional output interface wrapper 416. In one embodiment, function and terminal sets 414 are generic and do not change from run to run of GPPS 320, which allows GPPS 320 to operate as a general purpose problem solver. Function and terminal sets 414 contain an initial set of-functions and terminals and a potential set of functions and terminals for both GPPS 300 and GPPS 330. Function and terminal sets 414 includes the initial function set for the result-producing branch, $F_{rpb\text{-}initial}$. Since there are no automatically defined functions in generation zero, the initial function set for automatically defined functions, $F_{adf\text{-}initial}$, is empty. Since there are no automatically defined loops in generation zero, the initial function set for the branches of the automatically defined loops, $F_{adl\text{-}initial}$, is empty.

Also, function and terminal sets 414 contains the set of potential functions for the result-producing branch, $F_{rpb\text{-}potential}$, the set of potential functions for the branches of each automatically defined loop, $F_{adl\text{-}potential}$, the potential function set for the automatically defined functions, $F_{adf\text{-}potentials}$ and the initial terminal set for the result-producing branch, $T_{rpb\text{-}initial}$. Since there are no automatically defined functions in generation zero, the initial terminal set for automatically defined functions, $T_{adf\text{-}initial}$, is empty. Since there are no automatically defined loops in generation zero, the initial terminal set for the branches of the automatically defined loops, $T_{adl\text{-}initial}$, is empty.

Further, function and terminal sets 414 includes the set of potential terminals for the result-producing branch, $T_{rpb\text{-}potential}$, the set of potential terminals for the automatically defined functions, $T_{adf\text{-}potential}$ and the set of potential terminals for the branches of the automatically defined loops, $T_{adl\text{-}potential}$.

In one embodiment, function and terminal sets 414 also includes the initial function set of the automatically defined recursions, $F_{adr\text{-}initial}$. Since there are no automatically defined recursions in generation zero, the initial function set for the automatically defined recursions are empty. Likewise, the terminal set for the automatically defined recursions, $T_{adr\text{-}initial}$, is empty. The function and terminal sets 414 for GPPS 330 also contains the potential automatically defined recursion function and terminal sets, $F_{adr\text{-}potential}$ and $T_{adr\text{-}potential}$, respectfully.

Table I shows the function and terminal sets 414 for two embodiments.

TABLE I

Function and Terminal Sets for GPPS First and Second Embodiments

| Function & Terminal Sets | An Embodiment of GPPS 306 (FIG. 3A) | An Embodiment of GPPS 320 (FIG. 3B) |
|---|---|---|
| $F_{rpb}$-initial | {+, -, *, %, IFLTE, IFEQZ, TOR, TAND, TNOT, RLI, WIM, RIM, WLO, RLO, FLOOR} taking 2, 2, 2, 2, 4, 4, 2, 2, 1, 1, 2, 1, 2, 1, and 1 arguments, respectively | {+, -, *, %, IFLTE, TOR, TAND, TNOT, RLI, WLO, FLOOR} taking 2, 2, 2, 2, 4, 2, 2, 1, 1, 2, 2, 1, and 1 arguments, respectively. |
| $F_{adf}$-initial | empty | empty |
| $F_{adl}$-initial | empty | empty |
| $F_{rpb}$-potential | {ADL0, ADL1 . . . ADLn, ADF0, ADF1 . . . ADFn} | {ADL0, ADL1 . . . ADLn, ADR0, SWB0, SWB1 SWBn, ADF0, ADF1 ADFn, SRB0, SRB1 . . . SRBn } |
| $F_{adl}$-potential | {ADF0, ADF1 . . . ADFn} | {ADF0, ADF1 . . . ADFn} |
| $F_{adf}$-potential | {ADF0, ADF1 . . . ADFn} | {ADF0, ADF1 . . . ADFn} |
| $T_{rpb}$-initial | {NINPUTS, NOUTPUTS, INDEX, ℜ} | {NINPUTS, NOUTPUTS, INDEX, ℜ} |
| $T_{adf}$-initial | Empty | Empty |
| $T_{adl}$-initial | Empty | Empty |
| $T_{rpb}$-potential | {LBB0, LBB1 . . . LBBn} {ARG0, ARG1 . . . ARGn, NINPUTS, NOUTPUTS, INDEX, ℜ} | {LBB0, LBB1 . . . LBBn} {ARG0, ARG1 . . . ARGn, NINPUTS, NOUTPUTS, INDEX, ℜ} |
| $T_{adf}$-potential | {NINPUTS, NOUTPUTS, INDEX, ℜ} | {NINPUTS, NOUTPUTS, INDEX, ℜ} |
| $T_{adl}$-potential | Not defined | empty |
| $F_{adr}$-initial | Not defined | {ADR0, ADF0, ADF1 . . . ADFn} |
| $F_{adr}$-potential | Not defined | empty |
| $T_{adr}$-initial | Not defined | {NINPUTS, NOUTPUTS, INDEX, ℜ} |
| $T_{adr}$-potential | | |

In one embodiment (e.g., FIG. 3a), after generation zero, the architecture-altering operations of GPPS 306 introduce automatically defined loops, automatically defined functions, and the dummy variables possessed by the automatically defined functions. As a result, individuals in the population begin to contain invocations of the newly created automatically defined functions (e.g., ADF0, ADF1, ADF2, . . . ADFn), and references to terminals representing the dummy variables of the newly created automatically defined functions (e.g., ARG0, ARG1, ARG2, . . . ARGn). In addition, individuals in the population begin to contain terminals representing the return values of the loop body branches (e.g., LBB0 . . . LBBn) of automatically defined loops ADL0 . . . ADLn. The potential automatically defined functions take an as-yet-unknown number of arguments (between zero and n). The set of potential functions for the n branches of each automatically defined loop, $F_{adl\text{-}potential}$ is identical to the set of potential functions for the result-producing branch. The potential function set for the automatically defined functions, $F_{adf\text{-}potential}$, is subject to the limitation that a function-defining branch can refer hierarchically only to a previously-defined function-defining branch. The program tree used by GPPS 306 contains floating-point random constants and floating-point arithmetic functions. Thus, the program typically deposits a floating-point value in output vector 308.

In another embodiment (e.g., FIGS. 3b), after generation zero, the architecture-altering operations used by GPPS 320 introduce automatically defined functions, the dummy variables possessed by the automatically defined functions, automatically defined loops, automatically defined recursions, and automatically defined stores. As a result, individuals in the population begin to contain functions and terminals associated with the newly created branches.

Contained within the set of potential functions for the result-producing branch are SWB0 . . . SWBn, the storage writing branches of automatically defined stores, ADS0 . . . ADSn, respectively. The automatically defined functions take an as-yet-unknown number of arguments (between zero and n). As in the first embodiment, the potential function set for the automatically defined functions, $F_{adf\text{-}potential}$, is subject to the limitation that a function-defining branch automatically defined function can refer hierarchically only to a previously-defined function-defining branch. The set of potential functions for the n branches of each automatically defined recursion, $F_{adr\ potential}$, includes the recursion body branch, RBB0, along with the automatically defined functions. In the potential terminals for the result-producing branch, LBB0, is the return value from the loop body branch of automatically defined loop ADL0. SRB0 . . . SRBn are the return values of the respective storage reading branches of automatically defined stores ADS0 . . . ADSn. The program tree used by GPPS 320 contains floating-point random constants and floating-point arithmetic functions. In other embodiments, storage writing branches and storage reading branches may appear in types of branches other than result-producing branches. For example, memory is commonly used in automatically defined loops, automatically defined recursions, and automatically defined functions (subroutines).

Execution of the Run of Genetic Programming

Figure 5A:
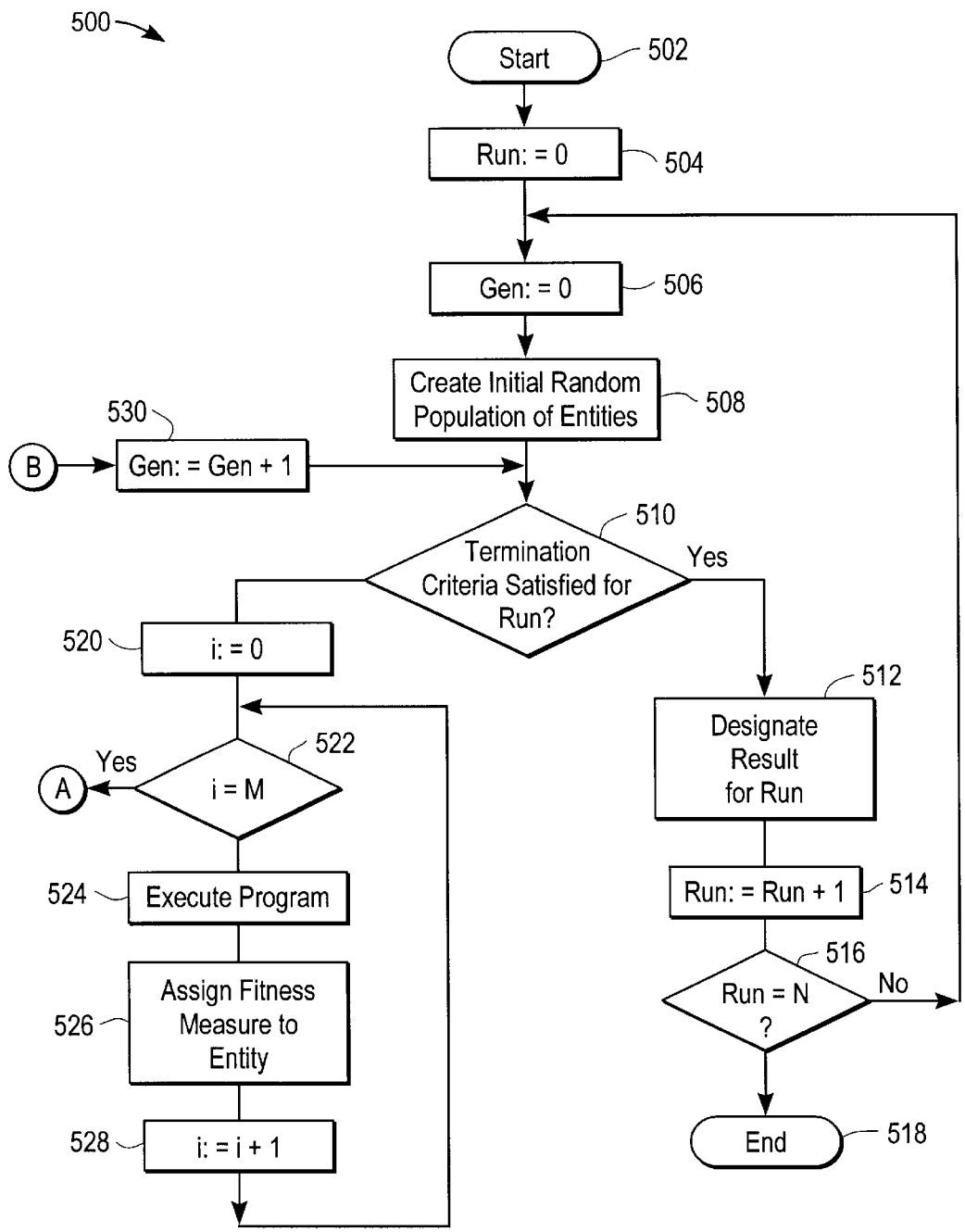
FIGS. 5a–c is a flowchart of a process for automatically creating computer programs to solve problems.
Figure 5B:
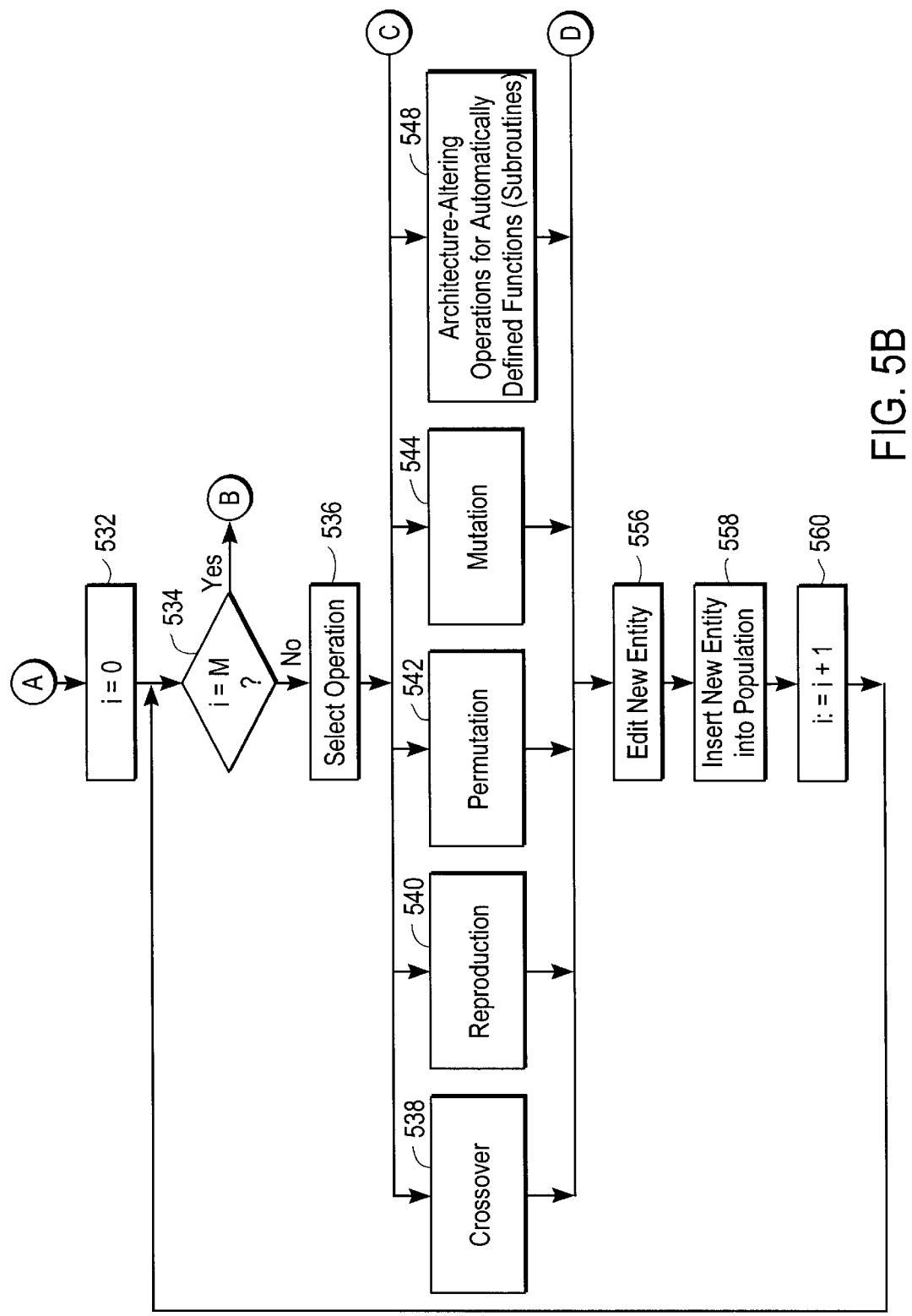
Figure 5C:
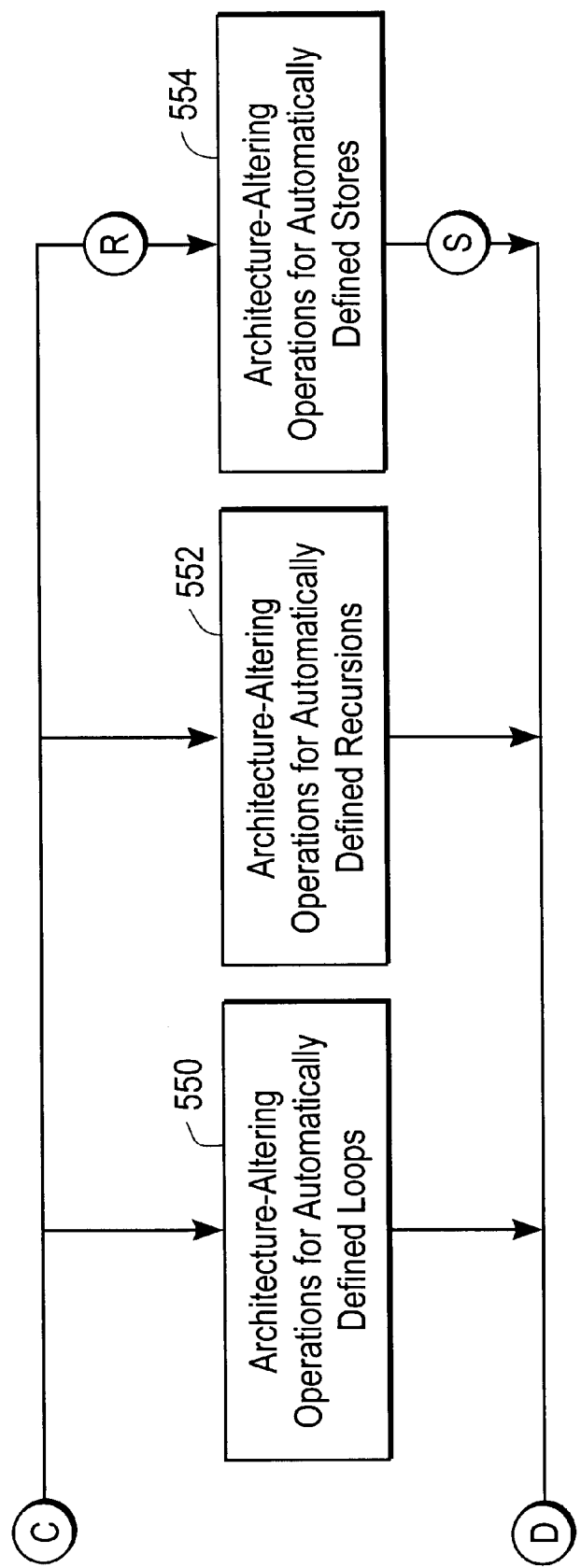

FIGS. 5a–5c is a flow-chart of one embodiment of a process for automatically creating computer programs to solve problems using genetic programming. RUN is the current run number while N is the maximum number of runs to be made. The variable GEN refers to the current generation number, the variable M is the population size, and the index i refers to the current individual circuit in the population.

Again referring to FIG. 5a, process 500 comprises several independent runs, controlled by processing logic. The processing logic may comprise hardware, and/or software, dedicated logic, etc. Processing logic initializes the number of runs, RUN, to 0 at step 504. Each run consists of many generations; therefore, method 500 initializes the generation number, GEN, to 0 at step 506.

Next, at step 508, for generation zero, processing logic initially creates a population of entities for the run. This creates a number, M, of individual program trees (typically randomly).

Next, at step 510, processing logic determines if the termination criteria has been satisfied for the run. The criteria is typically based on either reaching a certain maximum number of generations, G, or on satisfying some problem-specific criteria. If the criteria is satisfied at step 510, processing logic continues processing at step 510. At step 512, processing logic designates the result for the run (typically by designating the best individual achieved over the generations). Then, at step 514, processing logic increments the run number, RUN. If the run number, RUN, is equal to the maximum number of runs, N, at step 516, then processing logic ends processing at step 518. Otherwise, processing logic continues processing at step 506 by performing another RUN.

If, at step 510, the termination criteria for the run has not been satisfied, processing logic then continues processing at step 520. Beginning at step 520, processing logic preferably performs two main iterative loops over the individual entities (i) in the population. In the first of these two main iterative loops (beginning at step 520), the fitness of each individual i in the population is determined. In the second of these two main iterative loops (beginning at step 532, FIG. 5b), the genetic and architectural-altering operations are performed.

Processing logic begins processing the fitness loop at step 520 by initializing the index, i, of the individual in the population to zero. Processing logic tests the index, i, at step 522 to determine if it equals (or exceeds) the population size, M. If index, i, equals M, processing logic begins processing the genetic operation loop at step 532. If it does not, processing logic determines the fitness measure of each individual i in the population. In general, the determination of fitness may be implicit or explicit and it may or may not produce a numerical value of fitness. Processing logic is based on the case in which the determination of fitness is explicit and in which a numerical value of fitness is determined. When genetic programming is being used for the development of a computer program to solve a specified problem, processing logic determines the fitness measure of the individual program by executing the program (step 524), and assigning a fitness measure to the computer program (step 526).

For each individual entity, i, in the population, processing logic processes the first loop to determine the fitness measure of a new program in steps 520 through 528.

At step 524, processing logic begins processing the evaluation of fitness measure for each individual program tree in the population by traversing the tree in order to execute the program. At step 526, processing logic determines the fitness value of the execution of the computer program against the prespecified fitness measure supplied by the user during the preparatory steps.

Next, at step 528, processing logic increments the index, i, of the individual in the population. If the index, i, satisfies the test at step 522 of being equal to (or greater than) the population size, M, then processing logic ends processing of the first of the main iterative loops over the individuals in the population and processing logic continues processing at step 532, FIG. 5b. Otherwise, processing logic continues at step 524.

Processing logic begins processing the second of the two main iterative loops over the individuals in the population, shown in FIGS. 5b and 5c, by initializing the index, i, of the individual in the population to 0 at step 532. Processing logic tests the index, i, to determine if it equals (or exceeds) the population size M, at step 534. If it does, processing logic ends processing the genetic operation loop and processing logic continues execution at step 530, FIG. 5a. If it is not, processing logic processes step 536.

At step 536, processing logic chooses a genetic operation or architecture-altering operation to perform by a probabilistic determination. In one embodiment, one of the alternatives is randomly chosen. The sum of the probabilities of choosing operations 538 through 554 is one.

In one embodiment, termed steady state, only one genetic operation is performed on each generation. Experience with this approach has not been favorable on a number of problems. However, this approach may be used with GPPS if desired.

Each of the genetic operation alternatives begins with a selection step. For example, for the genetic operation of reproduction, processing logic processes step 540. In step 540, processing logic selects an individual from the population with relatively high fitness values, in a probabilistic manner. The selection is substantially based on the fitness measure of the individual such that individuals having a relatively high fitness measure are preferred over individuals having a relatively low fitness measure. Any of a variety of selection criteria may be used such as tournament selection or fitness proportionate reproduction. The selection step for the crossover operation 538 requires the selection of two individuals based on fitness. Selection step for the mutation operation 544 and the other selection steps requires selection of one individual based on fitness. The same individual in the population may be selected more than once during each generation.

For each of the genetic operation alternatives, processing logic processes the appropriate genetic operation. For example, if the operation of reproduction is chosen, then processing logic processes the operation of reproduction. If the operation of crossover is chosen, then processing logic processes the crossover operation. In the version of the crossover operation used in this embodiment, a single offspring is produced. If the operation of mutation is chosen, then processing logic processes the mutation operation. The other operations are processed similarly.

In addition, processing logic may randomly select an architecture-altering operation from the selections available for a specific embodiment. Processing logic may choose from architecture-altering operations for automatically defined functions 548, architecture-altering operations for automatically defined loops 550, architecture-altering operations for automatically defined recursions 552, and architecture-altering operations for automatically defined stores 554. After processing logic chooses the architecture-altering operation, the operation creates a new offspring program for the new population by applying the architecture-altering operation to the selected program, as described below.

After processing logic processes the genetic and architecture-altering operations, processing logic edits the new entity at step 556 to remove redundancies, and adds the newly created individuals to the population at step 558.

Then, at step 560, processing logic increments the index, i, of the individual in the population. If the index, i, does not satisfy the test at step 534 of being equal to (or greater than) the population size, M, processing logic continues processing this second main iterative loops at step 536.

If the index, i, satisfies the test at step 534, then processing logic returns to step 530, FIG. 5a. The generation number, GEN, is incremented at step 530 and processing logic continues processing at step 510.

In the FIG. 5a embodiment, processing logic is composed of a series of software steps implemented on top of a multithreaded operating system and may, therefore, run in parallel operation. It should be recognized that there are numerous slight variations of the overall process possible. Some of these variations may be used as a matter of convenience.

Genetic Operations

The genetic operations of crossover, reproduction, permutation, mutation, are described in U.S. Pat. No. 5,343,554 to Koza et al., "A Non-Linear Genetic Process for Data Encoding and for Solving Problems Using Automatically Defined Functions" which is hereby incorporated by reference.

Automatically Defined Functions

Automatically defined functions are described in U.S. Pat. No. 5,742,738 to Koza et al., "Simultaneous Evolution of the Architecture of a Multi-part Program to Solve a Problem Using Architecture Altering Operations" which is hereby incorporated by reference.

Automatically Defined Loops

Automatically defined loops provide a mechanism by which genetic programming implements a general form of iteration involving an initialization step, a termination condition, a loop body, and an update step.

In one embodiment, an automatically defined loop consists of four distinct branches, namely a loop initialization branch, LIB, a loop condition branch, LCB, a loop body branch, LBB, and a loop update branch, LUB.

The bodies of all four branches of an ADL are subject to evolutionary modification during the run of genetic programming. When the loop is invoked, a fixed structure (not subject to evolutionary modification) causes the loop initialization branch, LIB, of the automatically defined loop to be executed. The loop condition branch, LCB, is then executed and the loop is either continued or terminated based on whether the condition specified by the loop condition branch is satisfied. If the loop is not terminated, the loop body branch, LBB, is executed. Then, the loop update branch, LUB, is executed. Thereafter, the loop condition branch, the loop body branch, and the loop update branch are repeatedly executed. In one embodiment, the automatically defined loops, is continued while the return value of the loop condition branch, LCB, returns a positive numerical value. That is, the loop is terminated as soon as the loop condition branch becomes zero or negative.

Using the above terminology for LIB, LCB, LBB, and LUB, an automatically defined loop might be written as the following for loop in the C programming language:

```
GTYPE ADL(void)
{
GTYPE result 0;
for (LIB( ); LCB( )>0; LUB( )
  {
  result=LBB( );
  }
return(result);
}
```

An automatically defined loop (ADL) resembles an automatically defined function in that it has a name (allowing it to be invoked) and an argument list (which may or may not be empty). In one embodiment, an automatically defined loop differs from an automatically defined function in that the automatically defined loop has four distinct branches.

An automatically defined loop may be invoked by a result-producing branch, an ADF, an automatically defined recursion, or another ADL. When an expression such as (ADL3 ARG0 ARG1) is encountered during the execution of a program, the loop initialization branch, LIB3, of automatically defined loop ADL3 is executed first. Then, the loop condition branch, LCB3, is executed. The loop is either continued or terminated based on the value produced by LCB3. If the loop is not terminated, the loop body branch, LBB3, is then executed. Finally, the loop update branch, LUB3, is executed. After that, a loop having three branches (LCB3, LBB3, and LUB3) is repeatedly executed while the loop condition branch, LCB3, is positive. During the execution of the loop, the values of the arguments, if any, of the loop (i.e., ARG0 and ARG1 above) are available to any of the four branches. The value returned by the above expression is the value returned by the last execution of the loop body branch, LBB3.

The overall program may contain arbitrarily many automatically defined loops (up to some preestablished limit), each possessing arbitrarily many arguments (again, up to a preestablished limit).

If any of the four branches of the automatically defined loop contains a reference to another automatically defined, then the ADL is executed when it is encountered, thereby creating a nested iterative structure. A computer program may contain nested automatically defined loops (subject to a preestablished limit on the depth of nesting).

It is a practical necessity to ration the computer resources that may be consumed by the automatically defined loop. This rationing may be implemented as a time-out limit based on a maximum number of executions (or a maximum amount of computer time) consumed by a single automatically defined loop in a program and an additional separate limit based on the maximum cumulative number of executions (or the maximum cumulative amount of computer time) consumed by all automatically defined loops in a program.

The idea of an automatically defined loop can be illustrated by applying it to the problem of computing the numerical average of LEN numbers in a vector V. Such a computation might be performed with a for loop in the C programming language in the following way:

M0=0;

for (i=0; i<LEN; i++)

{

M0=M0+V[i];

}

Figure 10:
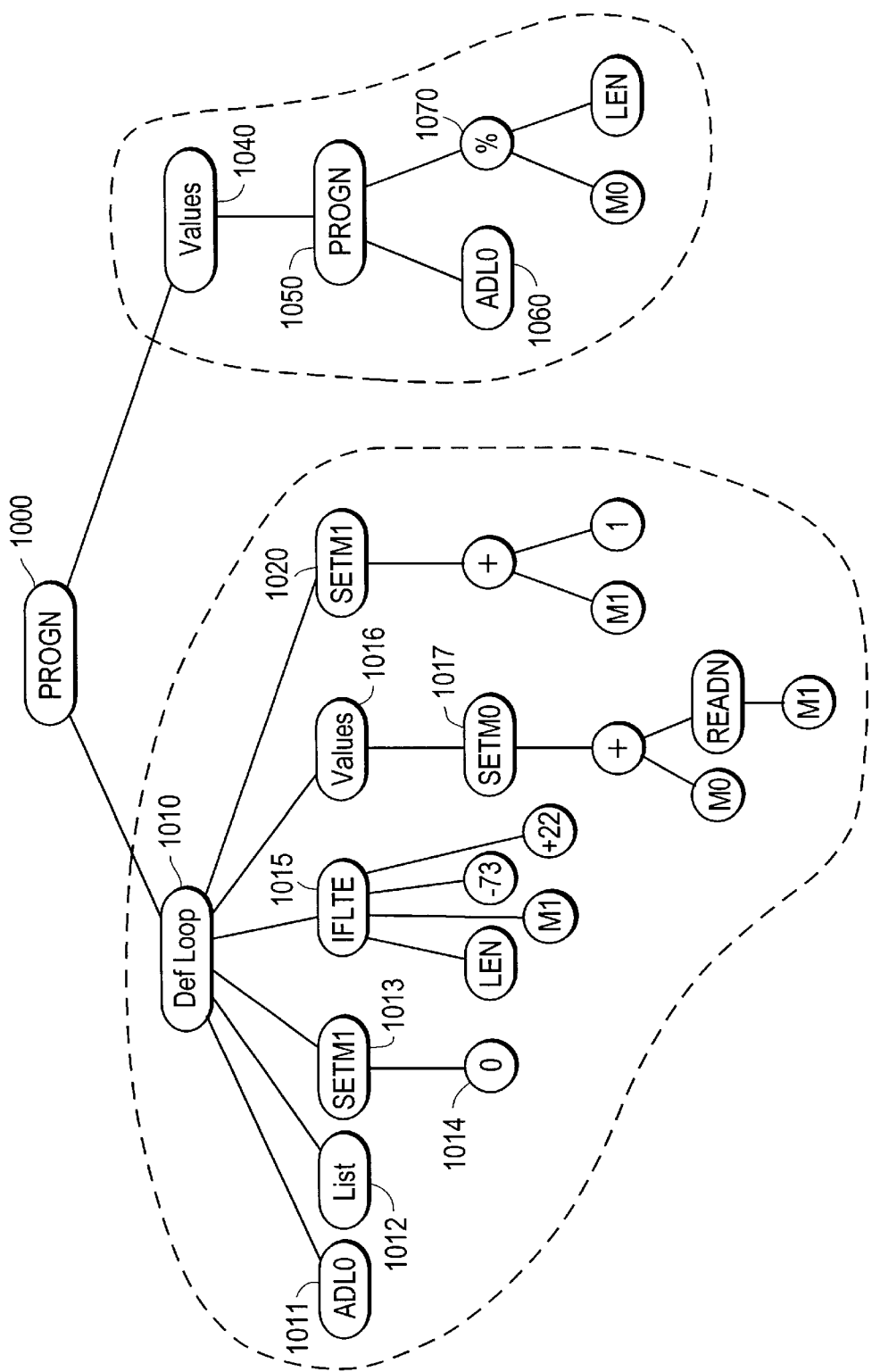
FIG. 10 illustrates one embodiment of a program tree for automatically defined loops.

FIG. 10 shows an example of a multi-part program having one result-producing branch in the right part of the figure and one automatically defined loop, ADL0, having four branches in the left part of the figure. The subtree rooted at setm1 1013 constitutes the loop initialization branch, LIB0, of this automatically defined loop. The subtree rooted at IFLTE 1015 constitutes the loop condition branch, LCB0. The subtree rooted at VALUES 1016 constitutes the loop body branch, LBB0. The subtree rooted at setm1 1020 constitutes the loop update branch, LUB0. The overall program computes the average of a set of numbers stored in a vector of length LEN. The top-most point in the overall program is PROGN (labeled 1000). The top-most PROGN 1000 begins by executing the DEFLOOP 1010. An automatically defined loop is defined by a DEFLOOP. The DEFLOOP resembles the DEFUN that defines an automatically defined function. This definitional process enables the automatically defined loop to be invoked by other branches of the overall program. Execution of the DEFLOOP 1010 e returns nothing of interest to PROGN 1000. The automatically defined loop has a name, ADL0 within the overall program. If ADL0 possesses arguments, the arguments appear under LIST 1012; however, a particular automatically defined loop described herein possesses no arguments and hence no dummy variables appear. After the automatically defined loop is defined, the top-most PROGN 1000 then proceeds to execute VALUES 1040 in the right part of the figure This VALUES begins with its own PROGN (labeled 1050). PROGN 1050 begins by invoking ADL0 460. When ADL0 460 is invoked, the loop initialization branch, LIB0, is executed first. The top-most point of the LIB0 is the setting function SETM1 1013. The SETM1 function sets the memory location named M1 to the value of its one embodiment. The LIB0 sets named memory cell M1 to the constant 0. As it occurs, this action is redundant since all cells of memory are always initialized to zero prior to execution of every fitness case for every overall program. The top-most point of the loop condition branch, LCB0, is IFLTE 1015. The IFLTE ("If Less Than or Equal") conditional branching operator tests whether LEN is less than or equal to M1. If so, the IFLTE operator 1015 returns −73, and, since this value is non-positive, the loop terminates. If not, the IFLTE operator returns +22, and, since the value is positive, the loop continues. As shown, this particular loop executes exactly LEN times (for positive LEN). The top-most point of the loop body branch, LBB0, is VALUES 1016. The LBB0 computes a running sum by setting M0 to the sum of the current value of M0 and the value of M1-th element of the vector. The one-argument function READV returns the element of the vector designated by its argument (modulo the length of the vector). Note that this loop is relying on M0 having been initialized to zero prior to execution of the overall program. The top-most point of the loop update branch, LUB0, is SETM1 1020. The LUB0 sets M1 to the sum of the current value of M1 and the constant 1. Control then returns to the loop condition branch, LCB0, which again tests whether LEN is less than or equal to M1. The loop continues while the loop condition branch, LCB0, is positive. This occurs when the loop is executed exactly LEN times. The return value of this particular ADL0 is ignored because PROGN 450 returns only the value of its final argument. The result-producing branch then computes the quotient (at 1070) of the running sum stored in M0 and the length LEN of the vector. PROGN 1050 then returns this quotient to VALUES 1040. This value becomes the value produced by the overall program (i.e., the value returned by PROGN 4000). The cell of named memory, M0, is the conduit for communication from the automatically defined loop to the result-producing branch.

When using automatically defined loops, it is often convenient to introduce an explicit indexing terminal (called INDEX) that counts the number of executions of the loop. When INDEX is used, an automatically defined loop might be written as the following for loop in the C programming language:

GTYPE ADL(void)

{

GTYPE result=0;

int index=0;

for (LIB ( ); LCB( )>0; LUB( ), index++)

```
{
   result=LBB( );
}
return(result);
}
```
There are, of course, numerous ways of structuring an automatically defined loop to perform a particular calculation. For example, the steps performed in the loop condition branch, the loop body branch, and the loop update branch in the above example need not be partitioned into the three branches in the manner described. Instead, these steps can be consolidated or distributed among any one, two, or three of these branches in any computationally equivalent way. As another example, if the index variable, INDEX, were available, it could be used in lieu of M1 above. As yet another example, the value of ADL0 could be referenced (in lieu of M0) in the result-producing branch because the return value.of ADL0 happens to be equal to M0 after completion of the loop in the above illustrative example. That is, the entire result-producing branch could be reduced to merely (% ADL0 LEN) instead of (PROGN ADL0 (% M0 LEN)).

One Embodiment of the Automatically Defined Loop

Only a constrained form of the automatically defined loop is used herein. In a embodiment, each automatically defined loop is executed exactly once prior to execution of the result-producing branch; the result-producing branch is executed once; and nested loops are not allowed. Thus, in this embodiment, the appearance of the name of an automatically defined loop (e.g., ADL3) appearing in a program does not cause the execution of the loop. Instead, ADL3 merely returns the appropriate value from the already-executed loop (i.e., the value returned by the last execution of the loop body branch, LBB3, of ADL3).

Specifically, in one embodiment of an automatically defined loop, there may be multiple automatically defined loops in a program (up to some preestablished limit);

the automatically defined loops are each invoked once prior to the invocation of the single result-producing branch;

the return value of each automatically defined loop is available to the result-producing branch as a terminal;

there are no nested automatically defined loops;

the automatically defined loops do not possess arguments;

the automatically defined loops may contain references to automatically defined functions and the automatically defined functions may refer to one another hierarchically;

the automatically defined loops may contain functions and terminals that write and read memory; and the result-producing branch has access to memory (which may have been written during the execution of the automatically defined loop).

In one embodiment, the execution of an overall program in this embodiment includes the following steps:

(1) For each fitness case, all locations of all types of memory are initialized to zero.

(2) If there are no automatically defined loops, step 4 is executed next. If there are one or more automatically defined loops, the first automatically defined loop (ADL0) is now executed once. The execution of automatically defined loop ADL0 includes of the following substeps:

(a) An index, called INDEX, is externally initialized to zero as if the initialization step were located at the beginning of the loop initialization branch, LIB, of each automatically defined loop.

(b) The loop initialization branch, LIB0, is executed exactly one time for the automatically defined loop.

(c) This substep is the beginning of the loop. The loop condition branch, LCB0, is executed. The loop continues provided LCB0 is positive and provided INDEX is less than a preestablished maximum number of executions of the loop, $N_{max\text{-}adl\text{-}executions}$. When LCB0 causes the termination of ADL0, step 3 is executed.

(d) The loop body branch, LBB0, is executed. The final return value of this branch is available to the invoking branch as ADL0.

(e) The loop update branch, LUB0, is executed.

(f) INDEX is externally incremented by one for each execution of the automatically defined loop as if the incrementing step were located at the end of the loop update branch, LUB0.

(g) The loop then returns to substep (c).

(3) If there are additional automatically defined loops (e.g., ADL1, ADL2, . . . ), they are each executed once in the same manner as step 2.

(4) The result-producing branch, RPB, is executed once.

(5) If an automatically defined function appears in any branch of the automatically defined loop, the result-producing branch, or another automatically defined function, it is executed in the usual way at the time that it is referenced.

Figure 11:
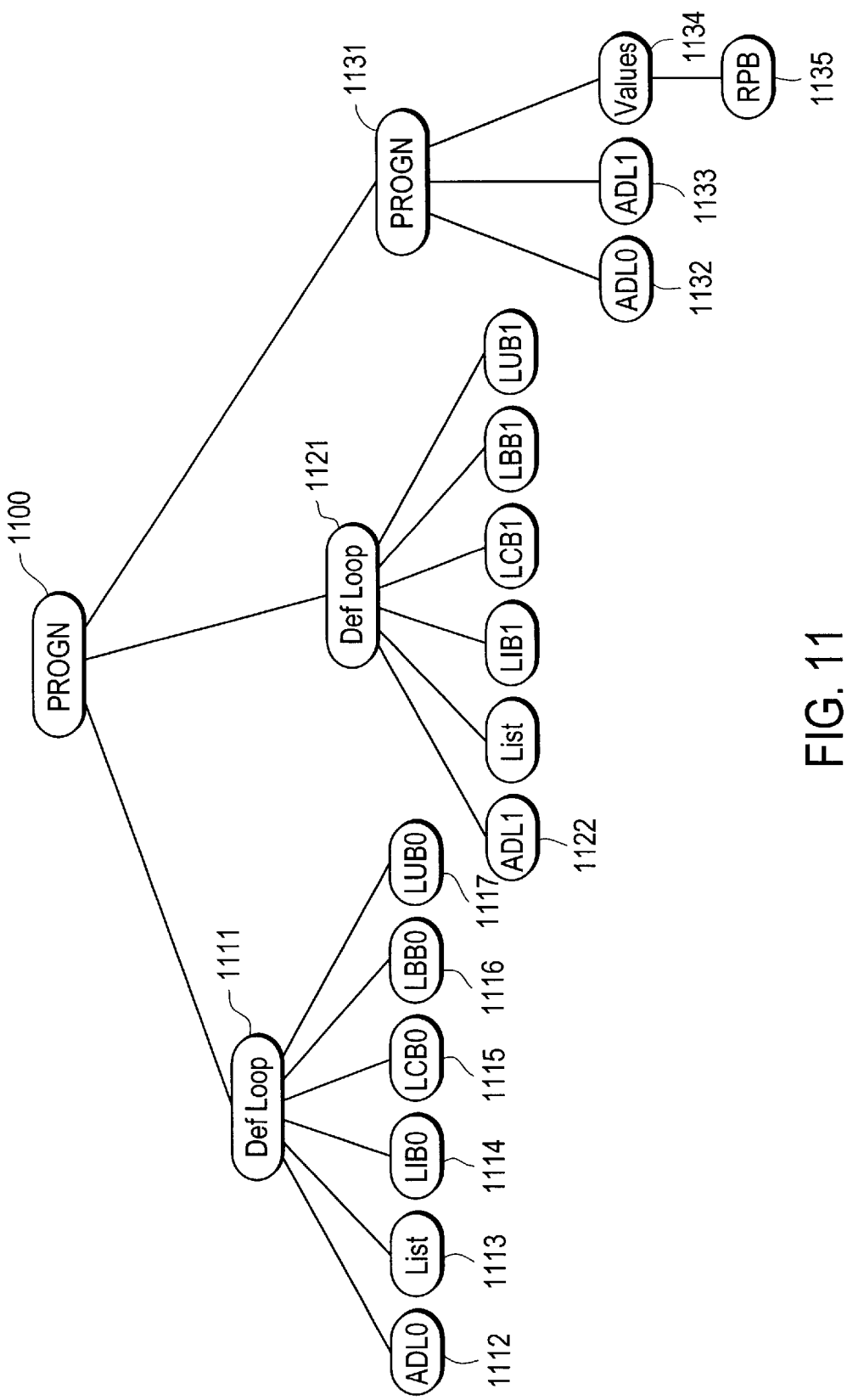
FIG. 11 illustrates a second.embodiment of a program tree for automatically defined loops

FIG. 11 illustrates this simplified model with two automatically defined loops, ADL0 and ADL1. The execution of the first two arguments (i.e., DEFLOOP 1111 and DEFLOOP 1121) of PROGN 1100 does not return anything interesting. The execution of the third argument of PROGN 1100 (that is, PROGN 1131 at the second level of the hierarchy) first causes the first automatically defined loop (ADL0 1132) to be executed once. As explained above, the execution of ADL0 1132 begins with the execution of its loop initialization branch (LIB0 1114) followed by the repeated execution of a loop including the loop condition branch (LCB0 1115), the loop body branch (LBB0 1116), and the loop update branch (LUB0 1117) while the loop condition branch (LCB0 1115) is positive. The continuation of the execution of PROGN 1131 then causes the branches of the second automatically defined loop (ADL1 1133) to be executed once in a similar manner. The values returned by ADL0 1132 and ADL1 1133 are ignored by top-most PROGN 1131. The continuation of the execution of PROGN 1131 then causes the execution of VALUES 1134, which, in turn, causes the execution of the result-producing branch, RPB 1135. The result-producing branch may refer to the values returned by the automatically defined loop. The value returned by PROGN 1131 (and hence the value returned by top-most PROGN 1100) is the value returned via VALUES 1134 from the execution of the result-producing branch, RPB 1135.

Architecture-altering operations for automatically defined loops can be used to automate the decision as to how many times, if ever, to employ automatically defined loops in solving a problem (along with the related decision of exactly what computation to perform with each loop). In particular, automatically defined loops and their arguments may be created, duplicated, or deleted using architecture-altering operations that are analogous to the operations applicable to automatically defined functions.

Loop Creation

In one embodiment, the architecture-altering operation of loop creation operates on one individual in the population selected probabilistically on the basis of fitness. It creates one new offspring program for the new population by adding a loop initialization branch, a loop condition branch, a loop body branch, and a loop update branch. A program with k branches begets a program with k+4 branches. Each of these four new branches is composed of a portion of a preexisting branch of the given program. The operation also creates a DEFLOOP to define the four newly created branches, unique names for the automatically defined loop and its four branches, an argument list for the automatically defined loop, and an invoking reference to the new automatically defined loop. The automatically defined loop may or may not possess arguments.

In one embodiment, the steps in the architecture-altering operation of loop creation are as follows:

(1) Select, based on fitness, an individual program from the population to participate in this operation. A copy is first made of the selected program and the operation is then performed on the copy. Thus, the original unchanged program remains available to be reselected for another operation.

(2) Randomly pick one of the branches of the selected program. If the selected program has only one branch, that branch is automatically picked. The picking of the branch may, as an option, be restricted to a result-producing branch or other specified category of branches. Randomly choose a point in this first picked branch of the selected program. Add a uniquely-named new loop initialization branch, LIB, to the selected program. The top-most point of this newly created loop initialization branch consists of a copy of the subtree rooted at the first chosen point. No change is made in the picked branch of the selected program.

(3) Randomly pick, independently from step 2, one of the branches of the selected program in the same manner as step 2. Randomly choose a point in this second picked branch of the selected program. Add a uniquely-named new loop condition branch, LCB, to the selected program. The top-most point of this newly created loop condition branch consists of a copy of the subtree rooted at the second chosen point. No change is made in the picked branch of the selected program.

(4) Randomly pick, independently from steps 2 and 3, one of the branches of the selected program in the same manner as steps 2 and 3. Randomly choose a point in this third picked branch of the selected program. Add a uniquely-named new loop update branch, LUB, to the selected program. The top-most point of this newly created loop update branch consists of a copy of the subtree rooted at the third chosen point. No change is made in the picked branch of the selected program.

(5) Randomly pick, independently from steps 2, 3, and 4, one of the branches of the selected program in the same manner as steps 2, 3, and 4. Randomly choose a point in this fourth picked branch of the selected program. Add a uniquely-named new loop body branch, LBB, to the selected program. The top-most point of this newly created loop body branch consists of a copy of the subtree rooted at this fourth chosen point. However, unlike steps 2, 3, and 4, the picked branch of the selected program is changed by removing the subtree starting at this fourth chosen point and replacing the subtree with the name of the newly created automatically defined loop. The reason for the removal of this subtree from the fourth picked branch is that the newly created automatically defined loop is intended to repeatedly execute the steps of the removed subtree.

(6) The terminal set of each branch of the new automatically defined loop is identical to that of the branch of the selected program that was chosen to create the particular branch of the automatically defined loop. The function set of each branch of the new automatically defined loop is identical to that of the branch of the selected program that was chosen to create the particular branch of the automatically defined loop. The function set of the branch of the selected program that was chosen to create the loop body branch is enlarged to include the name of the newly created automatically defined loop. The terminal set of each of the four branches of the picked automatically defined loop is unchanged. The function set of any branch in the program whose function set includes the picked branch (i.e., any branch that actually calls the picked automatically defined loop or that is permitted to call the picked automatically defined loop) is enlarged to include the name of the newly created automatically defined loop. The terminal set of any branch in the program whose function set includes the picked automatically defined loop is not affected by this operation.

The operation of loop creation is, in general, not semantics-preserving. There are several parameters for controlling the operation of loop creation for automatically defined loops.

First, the loop creation operation is controlled by a parameter specifying the probability of executing the operation on each generation, $P_{loop-creation}$. Second, there is a maximum number of automatically defined loops, $N_{adl}$, for each program in the population.

Third, there is a maximum size, $S_{adl}$, for all four branches of each newly created automatically defined loop.

Fourth, the loop creation operation is controlled by a parameter specifying the minimum number, $N_{min-argument-adl}$, and the maximum number, $N_{max-argument-adl}$, of arguments for each newly created automatically defined loop. If automatically defined loops possess arguments, each branch is given arguments in the same manner as for the subroutine creation operation (with appropriate changes being made in the picked branch of the selected program).

Fifth, since the loop condition branch and loop update branch are executed once for each loop, the loop creation operation can, if desired, be simplified so that it creates only two new branches, instead of four. In this event, the two new branches would be the loop initialization branch, LIB, and the loop body branch, LBB. Updating (if any) occurs within the loop body branch. The value returned by the loop body branch determines whether the loop is terminated (in the same manner as the value returned by the loop condition branch determines whether the loop is terminated in the four-branch arrangement).

Sixth, the terminal INDEX may be included in the terminal set of the four branches of the automatically defined loop (and other branches of the overall program) so that it is available as an ingredient for the evolving programs.

Loop creation deepens the hierarchy of references in a computer program.

Loop Duplication

The group of four branches that constitute an automatically defined loop may be duplicated using an architecture-altering operation analogous to subroutine duplication.

In one embodiment the operation of loop duplication operates on one individual in the population selected probabilistically on the basis of fitness and creates one new offspring program for the new population by duplicating all four branches of an existing automatically defined loop of one existing program and making additional appropriate changes to reflect this change. One embodiment of the steps of the architecture-altering operation of loop duplication are very similar to that of subroutine duplication as shown below:

(1) Select, based on fitness, an individual program from the population to participate in this operation.
(2) Pick one of the automatically defined loops of the selected program as the loop-to-be-duplicated. If the selected program has only one automatically defined loop, that loop is automatically picked. If the selected program has no automatically defined loops (or already has the maximum number of automatically defined loops established for the problem), this operation is aborted.
(3) Add a uniquely-named new automatically defined loop to the selected program, thus increasing, by one, the number of automatically defined loops in the selected program. The newly created automatically defined loop has the same argument list and the same body as the to-be-duplicated automatically defined loop.
(4) For each occurrence of an invocation of the to-be-duplicated automatically defined loop anywhere in the selected program, randomly choose either to leave that invocation unchanged or to replace that invocation with an invocation of the to-be-duplicated automatically defined loop. If the choice is to make the replacement, the arguments in the invocation of the newly created automatically defined loop are identical to the arguments of the preexisting invocation.
(5) The terminal sets of each of the four branches of the new automatically defined loop are identical to that of the corresponding branch of the picked automatically defined loop. The function sets of each of the four branches of the new automatically defined loop are identical to that of the corresponding branch of the picked automatically defined loop. The function set of the loop body branch of the picked automatically defined loop is enlarged to include the name of the.newly created automatically defined loop. The terminal set of each of the four branches of the picked automatically defined loop is unchanged. The function set of any branch in the program whose function set includes the picked automatically defined loop (i.e., any branch that actually calls the picked automatically defined loop or that is permitted to call the picked automatically defined loop) is enlarged to include the name of the newly created automatically defined loop. The terminal set of any branch in the program whose function set includes the picked automatically defined loop is not affected by this operation. Loop duplication broadens the hierarchy of references in a computer program. A program with k branches begets a program with k+4 branches.

The offspring produced by a loop duplication is semantically equivalent to its parent.

Loop Deletion

The group of four branches that constitute an automatically defined loop may be deleted from a computer program during the run of genetic programming using an architecture-altering operation analogous to subroutine deletion.

In one embodiment the, operation of loop deletion operates on one individual in the population selected probabilistically on the basis of fitness and creates one new offspring program for the new population by deleting all four branches of one automatically defined loop of the existing program.

The deletion of an automatically defined loop raises the question of how to modify invocations of the to-be-deleted branches in the remaining branches of the overall program. The options include random regeneration, consolidation, and macro expansion.

Appropriate changes in the function and terminal sets of the affected branches of the program must be made to reflect the deletion.

Loop deletion provides a mechanism for narrowing the hierarchy of the an overall program. A program with k branches begets one with k–4 branches.

The operation of loop deletion sets up an experimental trial, during the run of genetic programming, as to whether a particular looping structure is, in fact, useful. After being shorn of its former four branches, the downsized program competes with other individuals in the population (frequently including the reasonably fit parent that spawned it) for survival during subsequent generations of the evolutionary process.

Loop Argument Creation, Loop Argument Duplication, and Loop Argument Deletion

In one embodiment, automatically defined loops do not possess arguments. However, such arguments would be useful for certain problems. If automatically defined loops were to possess arguments, then it would be appropriate to employ additional architecture-altering operations to create, duplicate, and delete their arguments. These architecture-altering operations for automatically defined loops are defined in a manner analogous to the operations of argument creation, argument duplication, and argument deletion that are applicable to automatically defined functions.

Automatically Defined Recursion

Automatically defined recursions provide a mechanism by which genetic programming implements a general form of recursion involving a termination condition, a recursion body, an update step, and a base (ground) case. Specifically, in one embodiment, an automatically defined recursion (ADR) includes a recursion condition branch, RCB, a recursion body branch, RBB, a recursion update branch, RUB, and a recursion ground branch, RGB.

The bodies of the four branches of an ADR are subject to evolutionary modification during the run of genetic programming. When the recursion is invoked, a fixed structure (not subject to evolutionary modification) first causes the recursion condition branch, RCB, to be executed. The recursion is continued while the recursion condition branch returns certain specified values. In one embodiment the convention for the automatically defined recursions is that the recursion is continued as long as the recursion condition branch, RCB, returns a positive numerical value. If the recursion is continued, the recursion body branch, RBB, is executed. A distinguishing feature of an automatically defined recursion is that the recursion can invoke itself. In particular, the recursion body branch, RBB, is unique in that it may recursively reference the automatically defined recursion of which it is a part. After the RBB completes, the recursion update branch, RUB, is executed. When the recursion is terminated (because the recursion condition branch returns a non-positive value), the recursion ground branch, RGB, is executed exactly once.

When the recursion condition branch, RCB, returns a positive numerical value, the return value of the automatically defined recursion is the value returned by the recursion body branch, RBB. When the recursion condition branch, RCB, returns a non-positive numerical value, the return value of the automatically defined recursion is the value returned by the recursion ground branch, RGB.

Using the above terminology for RCB, RBB, RUB, and RGB, a recursion in C might be written as follows:

```
GTYPE ADR0 (GTYPE ARG0)
{
  GTYPE RESULT;
  if (RCB (ARG0))
  {
    RESULT=RBB (ARG0); /* This may call ADR0 */
    RUB (ARG0);
  }
  else
    RESULT=RGB (ARG0);
  return (RESULT);
}
```

The following hand-written program for the Boolean even-6-parity problem illustrates an automatically defined recursion in genetic programming. In this illustrative problem, the six Boolean input values (0 and 1) reside in a vector. The RLI ("Read Linear Input") function is a one-argument function that returns the value of the element of the input vector specified by the RLI's one argument (modulo 6). The program consists of one result-producing branch and one automatically defined recursion consisting of four branches.

The result-producing branch, RPB, of the program is
  (ADR0 5).
That is, the RPB invokes the ADR0 with an argument of 5.

The recursion condition branch, RCB0, of the automatically defined recursion possesses one argument (ARG0) and is
  (IFGTZ ARG0 1 −1).
IFGTZ ("If Greater Than Zero") is a conditional branching operator (section 13.3.2).

The recursion body branch, RBB0, possesses one argument (ARG0) and is
  (IFGTZ
    (ADR0 (−ARG0 1))
    (IFGTZ (RLI ARG0) −1 1)
    (IFGTZ (RLI ARG0) 1 −1)
  ).

The recursion update branch, RUB0, possesses one argument (ARG0) and is irrelevant to this example. It might contain
  (* 2 3).

The recursion ground branch, RGB0, possesses one argument (ARG0) and is
  (IFGTZ (RLI ARG0) −1 1).

An automatically defined recursion resembles an automatically defined function, and an automatically defined loop in that it has a name (allowing it to be invoked in the same manner as any other function) and an argument list. An ADR differs from an ADF in that the ADR has four distinct branches. An ADR differs from an ADF in that the branches of an ADR are, in general, executed multiple times for a single invocation. Moreover, an ADR differs from an ADF, and an ADL in that its recursive body branch (RBB) is allowed to contain a recursive reference to the ADR itself.

A multi-part computer program may contain arbitrarily many automatically defined recursions (up to some preestablished limit).

An automatically defined recursion may be called from a result-producing branch, an ADF, and ADL, or another ADR. In addition, an ADR may call itself.

Since the recursion condition branch of an automatically defined recursion is subject to evolutionary modification during the run, it is a practical necessity to ration the computer resources that may be consumed by the automatically defined recursion. This rationing may be implemented in numerous ways. For example, the rationing may be in the form of a preestablished limit based on the maximum depth for any one recursion and on the total number of recursive calls allowed in any one program.

Figure 12:
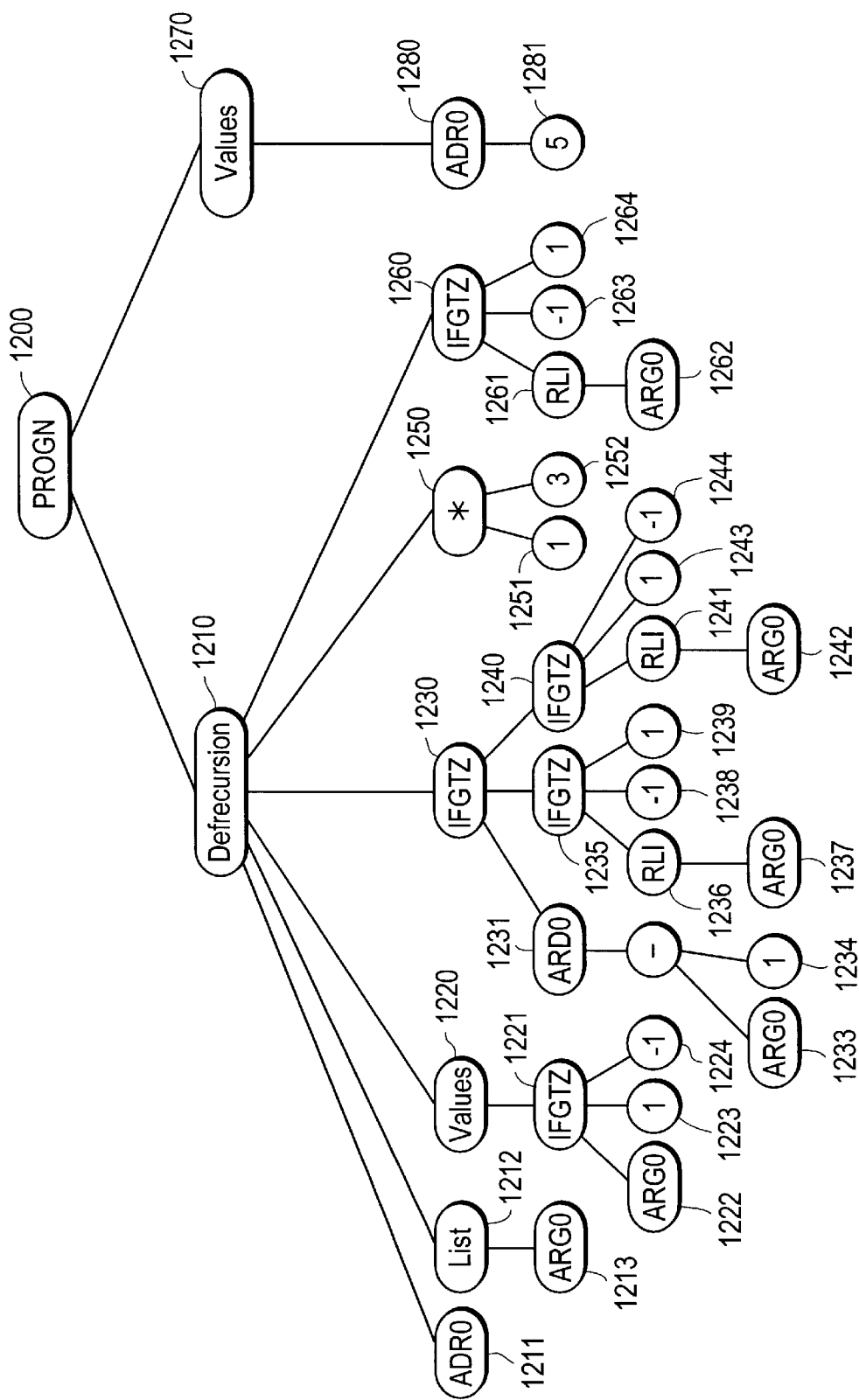
FIG. 12 illustrates a program tree for automatically defined recursions.

FIG. 12 depicts the above program for the Boolean even-6-parity problem. It shows a multi-part program consisting of one result-producing branch in the right part of the figure and one automatically defined recursion, ADR0 (consisting of four branches) in the left part of the figure. The top-most point in the overall program is PROGN (labeled 1200). The subtree rooted at VALUES 1220 constitutes the recursion condition branch, RCB0, of automatically defined recursion ADR0. The subtree rooted at IFGTZ 1230 constitutes recursion body branch, RBB0, of ADR0. The subtree rooted at the multiplication (*) at 1250 constitutes the recursion update branch, RUB0. The subtree rooted at IFGTZ 1260 constitutes the recursion ground branch, RGB0. The overall program computes the Boolean even-6-parity function of six Boolean variables residing in an input vector of length six. The top-most PROGN 1200 begins by executing the DEFRECURSION 1210. An automatically defined recursion is defined by a DEFRECURSION. The DEFRECURSION resembles the DEFUN that defines an automatically defined function, and the DEFLOOP that defines an automatically. This definitional process enables the automatically defined recursion to be invoked by other branches of the overall program. Execution of the DEFRECURSION 1210 returns nothing of interest to PROGN 1200. The automatically defined recursion has a unique name, ADR0 within the overall program. An automatically defined recursion always possess at least one argument. The argument list of ADR0 1211 appears under LIST 1212. In this example, there is one dummy variable (formal parameter) ARG0 1213 in the argument list. After the automatically defined recursion is defined, the top-most PROGN 1200 then proceeds to execute VALUES 1270 in the right part of the figure. This VALUES 1270 begins by invoking automatically defined recursion ADR0 1280 with an argument consisting of the constant 5 (labeled 1281). When ADR0 is invoked the first time, the recursion condition branch, RCB, is executed first. The recursion condition branch, RCB0, returns 1 in this example because the current value of ARG0 is 5. Since RCB0 returns a positive value, the recursion body branch, RBB0, is executed. The top-most point of the RBB0 is IFGTZ 1230. The first argument of IFGTZ 1230 recursively invokes ADR0 with an argument of ARG0 minus 1. The recursion body branch, RBB0, computes the even-2-parity of the ARG0-th location of the input and the value returned from the recursive call (ADR0 (−ARG0 1)). In particular, If the value returned for (ADR0 (−ARG0 1)) is positive (i.e., the parity of the ARG0−1 inputs is even), the Boolean value (0 or 1) in location ARG0 of the input vector is examined. If this value in the input vector is positive, a −1 is returned by IFGTZ 1235. Otherwise, a 1 is returned by IFGTZ 1235 and, in turn, by IFGTZ 1230.and, in turn, by the call to ADR0.

If the value returned for (ADR0 (−ARG0 1) ) is negative (i.e., the parity of the ARG0 −1 inputs is odd), the Boolean value in location ARG0 of the input vector is examined. If this value in the input vector is positive, a 1 is returned by IFGTZ 1240. Otherwise, a −1 is returned by IFGTZ 1240 and, in turn, by IFGTZ 1230 and, in turn, by the call to ADR0.

The recursion update branch (whose top-most point is the multiplication function labeled 1250) is irrelevant in this example.

The top-most point of the recursion ground branch, RGB0, is IFGTZ 1260. The recursion ground branch, RGB0, computes the even-1-parity of the ARG0-th location of the input vector. This is the base case of the recursion. In particular, If the value (0 or 1) in location ARG0 of the input vector is positive (i.e., odd parity), IFGTZ 1260 returns −1.

If the value (0 or 1) in location ARG0 of the input vector is non-positive (i.e., even parity), IFGTZ 1260 returns 1.

Although the distinguishing feature of an automatically defined recursion is that the recursion is permitted to invoke itself, the recursion body branch of a particular automatically defined recursion that arises during the evolutionary process may not actually do so. The recursion condition branch, the recursion body branch, and the recursion update branch, RUB, are repeatedly executed as long as the recursion condition branch, RCB, returns a positive numerical value (or perhaps until a preestablished maximum limit on the number of recursive executions is exceeded).

There are various alternative ways of implementing automatically defined recursions in the context of genetic programming. For example, the recursion body branch and recursion update branch might be consolidated so that an automatically defined recursion has only three branches. In this three-branch approach, the updating would occur within the recursion body branch.

Architecture-Altering Operations for Automatically Defined Recursions

The decision as to how many times, if ever, to employ automatically defined recursions in solving a problem can be made during the run of genetic programming by means of architecture-altering operations. Specifically, automatically defined recursions may be created using an architecture-altering operation that is analogous to the operation of subroutine creation for ADFs, and the operation of loop creation for ADLs.

Recursion Creation

The architecture-altering operation of recursion creation operates on one individual in the population selected probabilistically on the basis of fitness. It creates one new offspring program by adding a recursion condition branch, a recursion body branch, a recursion update branch, and a recursion ground branch. A program with k branches begets an offspring program with k+4 branches. Each of these four new branches is composed of a portion of a preexisting branch of the given program. The operation also creates a DEFRECURSION to define the four newly created branches, unique names for the automatically defined recursion and its four branches, an argument list for the automatically defined recursion, and an invoking reference to the new automatically defined recursion. An automatically defined recursion always has at least one argument.

The steps in the architecture-altering operation of recursion creation are as follows:

(1) Select, based on fitness, an individual program from the population to participate in this operation. A copy is first made of the selected program and the operation is then performed on the copy. Thus, the original unchanged program remains available to be reselected for another operation.

(2) Randomly pick one of the branches of the selected program. If the selected program has only one branch, that branch is automatically picked. The picking of the branch may, as an option, be restricted to a result-producing branch or other specified category of branches. Randomly choose a point in this first picked branch of the selected program. Add a uniquely-named new recursion ground branch, RGB, to the selected program. The top-most point of this newly created recursion ground branch consists of a copy of the subtree rooted at the first chosen point. Randomly pick one terminal of this subtree and change it to ARG0.

(3) Randomly pick, independently from step 2, one of the branches of the selected program in the same manner as step 2. Randomly choose a point in this second picked branch of the selected program. Add a uniquely-named new recursion condition branch, RCB, to the selected program. The top-most point of this newly created recursion condition branch consists of a copy of the subtree rooted at the second chosen point. Randomly pick one terminal of this subtree and change it to ARG0.

(4) Randomly pick, independently from steps 2 and 3, one of the branches of the selected program in the same manner as steps 2 and 3. Randomly choose a point in this third picked branch of the selected program. Add a uniquely-named new recursion update branch, RUB, to the selected program. The top-most point of this newly created recursion update branch consists of a copy of the subtree rooted at the third chosen point. Randomly pick one terminal of this subtree and change it to ARG0.

(5) Randomly pick, independently from steps 2, 3, and 4, one of the branches of the selected program in the same manner as steps 2, 3, and 4. Randomly choose a point in this fourth picked branch of the selected program. Add a uniquely-named new recursion body branch, RBB, to the selected program. The top-most point of this newly created recursion body branch consists of a copy of the subtree rooted at this fourth chosen point. However, unlike steps 2, 3, and 4, the picked branch of the selected program is changed by removing the subtree starting at this fourth chosen point and replacing the subtree with the name of the newly created automatically defined recursion. The reason for the removal of this subtree from the selected program is that the body of the recursion is intended to repeatedly perform the steps of the subtree. Randomly pick one terminal of this subtree and change it to ARG0. Randomly pick an-argument subtree and change it to an invocation of the newly created automatically defined recursion.

(6) The terminal set of each branch of the new automatically defined recursion contains the dummy variables (formal parameters) of the automatically defined recursion along with the terminals in the terminal set of the branch of the selected program that was picked to create that particular branch of the automatically defined recursion. The function set of each branch of the new automatically defined recursion is identical to that of the branch of the selected program that was picked to create the particular branch of the automatically defined recursion with the following important exception: The function set of the recursion body branch additionally includes the name of the newly created automatically defined recursion. The function set of the branch of the selected program that was picked to create the recursion body branch is enlarged to include the name of the newly created automatically defined recursion. The terminal set of each of the four branches of the picked automatically defined recursion is enlarged by ARG0. The function set of any branch in the program whose function set includes the picked branch (i.e., any branch that actually calls the picked automatically defined recursion or that is permitted to call the picked automatically defined recursion) is enlarged to include the name of the newly created automatically defined recursion. The terminal set of any branch in the program whose function set includes the picked branch is not affected by this operation.

The operation of recursion creation is, in general, not semantics-preserving. There are several parameters for controlling the operation of recursion creation for automatically defined recursions.

First, the recursion creation operation is controlled by a parameter specifying the probability of executing the operation on each generation, $p_{recursion-creation}$. Second, there is a maximum number, $N_{adr}$, of automatically defined recursions for each program in the population.

Third, there is a maximum size, $S_{adr}$, for all four branches of each newly created automatically defined recursion.

Fourth, the recursion creation operation is controlled by a parameter specifying the minimum number, $N_{min-argument-adr}$, ba of arguments for each newly created automatically defined recursion. This minimum must be at least one.

Fifth, the recursion creation operation is controlled by a parameter specifying the maximum number, $N_{max-argument-adr}$, of arguments for each newly created automatically defined recursion.

Recursion Deletion

The group of four branches that constitute an automatically defined recursion may be deleted from a computer program during the run of genetic programming using an architecture-altering operation analogous to subroutine deletion, and loop deletion. A program with k branches begets an offspring program with k−4 branches.

The operation of recursion deletion operates on one individual in the population selected probabilistically on the basis of fitness and creates one new offspring program for the new population by deleting all four branches of one automatically defined recursion of the existing program.

The deletion of an automatically defined recursion raises the question of how to modify invocations of the to-be-deleted branches by remaining branches of the selected program. The realistic options include random regeneration and consolidation, but not macro expansion.

Appropriate changes in the function and terminal sets of the affected branches of the program must be made to reflect the deletion.

The operation of recursion deletion creates the opportunity to conduct a trial, during the run of genetic programming, as to whether a particular recursive structure is, in fact, useful. After being shorn of its former four branches, the downsized program competes with other individuals in the population (frequently including the reasonably fit parent that spawned it) for survival during subsequent generations of the evolutionary process.

Recursion Duplication

The group of four branches that constitute an automatically defined recursion may be duplicated during the run of genetic programming using an architecture-altering operation analogous to the operations of subroutine duplication, and loop duplication. A program with k branches begets an offspring program with k+4 branches.

The operation of recursion duplication operates on one individual in the population selected probabilistically on the basis of fitness and creates one new offspring program for the new population by duplicating the entire group of four branches of one automatically defined recursion of the existing program and making additional appropriate changes in the function and terminal sets of the affected branches of the program to reflect the duplication.

Recursion Argument Creation, Recursion Argument Duplication, and Recursion Argument Deletion Architecture-altering operations may be used to create, duplicate, and delete arguments of automatically defined recursions. These architecture-altering operations are defined in a manner analogous to the operations of argument creation, argument duplication, and argument deletion that are applicable to automatically defined functions.

Automatically Defined Stores

Internal storage (memory) is convenient, and often necessary, in writing computer programs. Memory can be implemented in genetic programming in numerous ways, including named memory, indexed (vector) memory, matrix and array memory, stacks, queues, lists, other data structures, and relational memory.

When first looking at a problem, it is usually not apparent whether internal storage would be necessary, helpful, or useless in solving the problem. Moreover, even if internal storage is known to be necessary or helpful, it may not be apparent as to what amount of internal storage is sufficient for a particular problem. In addition, it may not be obvious as to what type and dimensionality of internal storage (e.g., named memory, indexed memory, arrays stacks, queues, lists, relational memory) is advantageous for a given problem. Even if an the amount, type, and dimensionality of internal memory is known, it is not trivial to decide exactly what to store in memory and exactly when to retrieve the stored information during the course of a program's execution. Therefore, it would be desirable to automate the decision as to whether to.use internal storage on a particular problem, how much internal storage to use, what type of internal storage to use, what dimensionality of internal storage to use, and, of course, the specific way in which it is used.

There are several possible ways to implement the automatic creation and deletion of internal storage during a run of genetic programming. Preferably, automatically defined stores provide a mechanism by which genetic programming implements a general form of internal storage.

In the preferred embodiment, an automatically defined store (ADS) is implemented by adding two new branches to the given computer program, namely a storage writing branch, SWB, and a storage reading branch, SRB.

The storage writing branch, SWB, may be thought of as simply a WRITE function and the storage reading branch, SRB, may be viewed as a READ function. In this approach, the pair of branches of an automatically defined store are not used for housing any executable code. Instead, when internal storage is added or to (or deleted from) an existing computer program, the branches provide an administratively convenient (albeit somewhat artificial) way to expand (or contract) the program's function sets so as to include (or delete) the function necessary to write to the newly created memory and the function necessary to access the newly created memory.

A program may contain arbitrarily many automatically defined stores (subject to a preestablished maximum number of automatically defined stores, $N_{max-ads}$).

Each automatically defined store has a (1) name, (2) dimensionality, (3) type, and (4) size.

Each automatically defined store in a given program has a unique name. The automatically defined stores in a given program are named sequentially as ADS0, ADS1, etc.; the storage writing branches are named sequentially SWB0, SWB1, etc.; and the storage reading branches are named sequentially SRB0, SRB1, etc.

The dimensionality of an automatically defined store is the number of arguments necessary to address it. The dimensionality of each automatically defined store is established at the time it is created. The choice of dimensionality for each automatically defined store is made independently for each newly created automatically defined store, and the choice is typically made randomly (subject to a preestablished maximum dimensionality for the automatically defined stores). Thus, if a program contains more than one automatically defined store, the automatically defined stores may (and are likely) to have different dimensionality.

The type of an automatically defined store is established at the time it is created. The choice of type is made independently for each newly created automatically defined store. The choice of type for an automatically defined store is typically made randomly; however, this random choice is constrained by its already-chosen dimensionality (and by preestablished limits on the types of internal storage permitted for its already-chosen dimensionality). Thus, if a program contains more than one automatically defined store, the automatically defined stores may (and are likely) to be of different types.

Table II shows some of the possible types of internal storage of dimensionality 0,1,2,3, and 4.

TABLE II

Types of internal storage.

| Dimension | Possible types |
| --- | --- |
| 0 | Named memory, push-down stack, queue |
| 1 | Indexed (vector) memory, list |
| 2 | Matrix, relational memory |
| 3 | Three-dimensional array |
| 4 | Four-dimensional array |

The types of internal storage of dimensionality 0 include (1) named memory, (2) a push-down stack, and (3) a queue.

Named memory is.an example of internal storage with dimensionality 0 because no argument is required for specifying the address of named memory. For example, when the zero-argument SRB2 function for named memory is invoked, it returns the contents of named memory cell 2. The SRB2 function operates in the same manner as the terminal M2 associated with named memory cell 2. When the one-argument SWB2 function is invoked, it writes the contents of named memory cell two (2) with the value returned by evaluating its one argument. This same value becomes the return value of the SWB2 function.

A push-down stack and a FIFO (first-in first-out) queue are also of dimensionality 0 because an address is not required to access either of these data structures. For example, suppose the second automatically defined store, ADS1, of a given program is a push-down stack. In that event, the execution of the storage writing branch, SWB1, pushes the value provided by its argument onto the stack associated with ADS1. The execution of the storage reading branch, SRB1, pops the top-most value from the push-down stack associated with ADS1.

And, as another example, suppose the first automatically defined store, ADS0, of a given program is a queue. In that event, the execution of the storage writing branch, SWB0, appends the value provided by its argument to the end of the queue associated with ADS0. The execution of the storage reading branch, SRB0, returns the first-in element that is currently in the queue.

The types of internal storage of dimensionality include (1) indexed (vector) memory, and (2) lists.

Indexed (vector) memory is internal storage of dimensionality 1. When indexed (vector) memory is being implemented, the SRB and the SWB each possess an argument for specifying the address of indexed memory that is being read or written. The SRB function for indexed memory possesses one argument (i.e., the address) and the SWB function possesses two arguments (i.e., the address and the value to be written into the designated memory cell). In the case of indexed memory, execution of the two-argument SWB function writes the result of evaluating its second argument into the cell of indexed memory designated by its second argument. The SWB function returns the value of its second argument. Execution of the one-argument storage reading branch, SRB, returns the current value of the cell of indexed memory designated by its argument.

List memory is an additional example of internal storage of dimensionality one (1).

The types of internal storage of dimensionality include (1) two-dimensional matrix memory, and (2) relational memory.

In the case of two-dimensional matrix memory, the execution of the three-argument SWB function writes the result of evaluating its third argument into the cell of two-dimensional matrix memory designated by its first two arguments. Execution of the two-argument SRB function returns the current value of the cell of the matrix designated by its two argument arguments.

In relational memory, there is a fixed pallet of points. Initially, there are no connections between any of the points in the pallet. The writing function for relational memory provides a way to record the existence of a relation between two points of the pallet. The reading function provides a way to determine whether a relation exists between two points. Execution of the two-argument SWB function draws a directed line from the point in the pallet specified by its first argument to the point specified by its second argument. Execution of the two-argument SRB function returns +1 if there is a directed line connecting the point in the pallet specified by its first argument to the point specified by its second argument.

The size of the indexed (vector) memory is determined at the time the memory is created. The choice is typically made randomly (subject to a preestablished maximum size). All references to an address in indexed memory are modulo the size of the indexed memory. The choice of memory size is made separately and independently for each newly created automatically defined store. Thus, vector memories of sizes that are appropriate for solving a given problem will tend to grow and prosper within the evolving population, while vector memories of inappropriate sizes will tend to disappear.

Two-dimensional matrix memory is an example of array memory of dimensionality two. Higher-dimensional array memory may also be created. When array memory of dimensionality k is being used, the SRB function possesses k arguments (to specify the k addresses in the k-dimensional array that is being read). The SWB function possesses a k+1 arguments (to specify the k addresses as well as the value that is to be.written into the designated cell of the array). The dimensions of an array are determined at the time the memory is created. The choices are typically made randomly and independently for each separate dimension of the array at the time it is created, subject to a preestablished maximum size associated with each separate dimension of the array.

For example, for two-dimensional array (matrix) memory, $N_{max\text{-}ads\text{-}size\text{-}index\text{-}1}$ is the maximum size for the array's first dimension and $N_{max\text{-}ads\text{-}size\text{-}index\text{-}2}$ is the maximum size for the array's second dimension. If an individual program in the population possesses more than one array, the choices of dimensions are made anew at the time each separate array is created. Each index of an address of array is taken modulo the actual chosen size for that particular dimension. For example, suppose that the maximum size for a two-dimensional array's first dimension, $N_{max-ads-size-index-1}$, is 5 and the maximum size for an array's second dimension, $N_{max-ads-size-index-2}$, is 6. Suppose further that the actual size of the matrix is chosen to be 3×4. Then, when the matrix is addressed, the first index of the address in the matrix is taken modulo 3 and the second index is taken modulo 4.

Relational memory is an additional example of memory of dimensionality two (2) since two explicit arguments are used.

Architecture-Altering Operations for Automatically Defined Stores

The architecture-altering operations provide a way to automate the decision as to whether to use internal storage on a particular problem, how much internal storage to use, what type of internal storage to use, and, of course, the specific way in which it is used.

Referring to FIG. 5b, if at step 536, GPPS 320 (FIG. 3b) selects automatically defined stores operations 554, then GPPS 320 executes the process of FIGS. 6a through 6d.

Figure 6A:
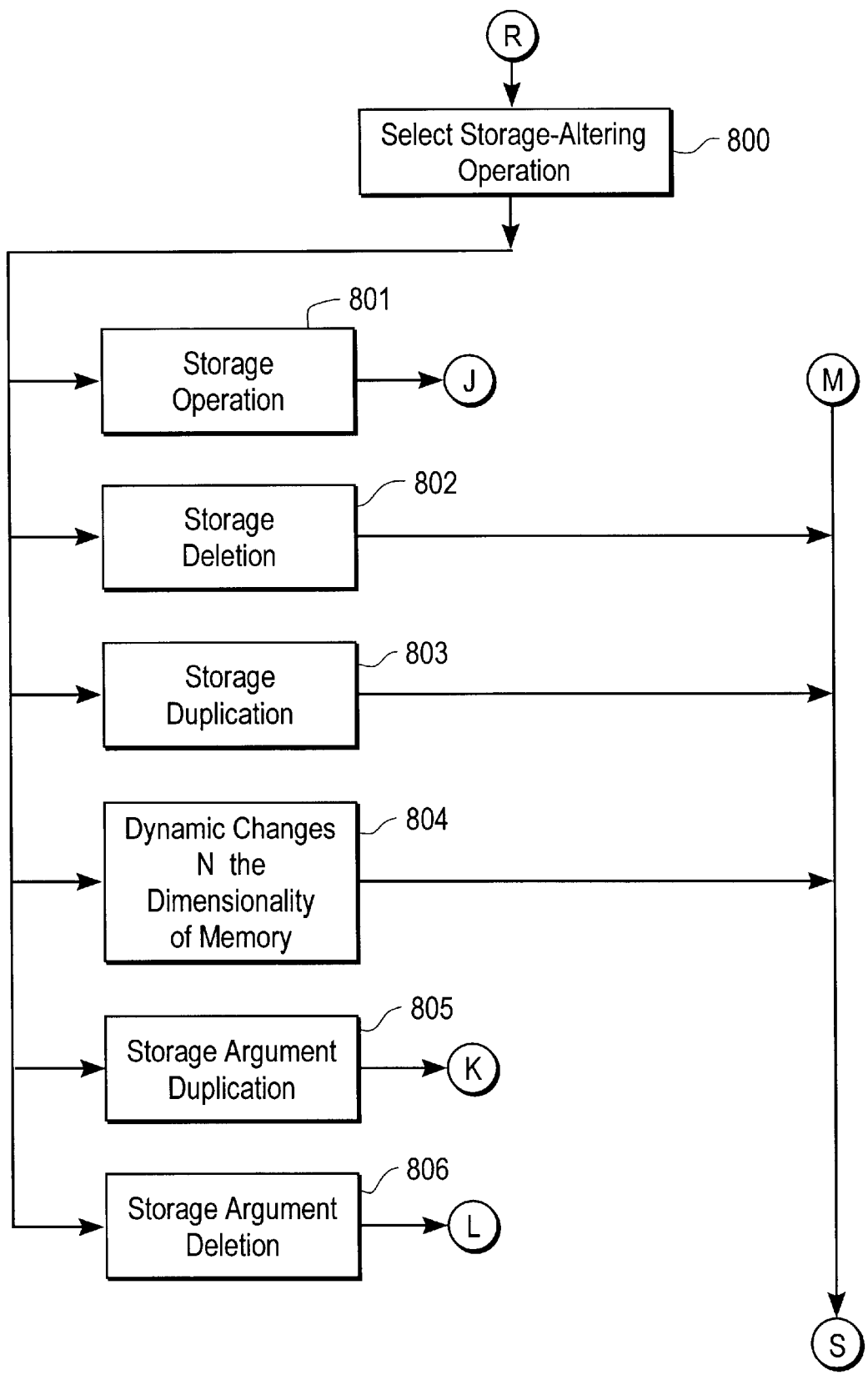
FIGS. 6a–6d is a flowchart of a process for the execution of an automatically defined stores operation.

In FIG. 6a, GPPS 320 selects a storage-altering operation at step 800. GPPS 320 randomly selects from storage creation 801, storage deletion 802, storage duplication 803, dynamic changes in the dimensionality of memory 804, storage argument duplication 805, or storage argument deletion 806. After GPPS 320 executes the selected storage-altering operation, GPPS 320 returns to step 556, FIG. 5b, to continue processing.

Storage Creation Operation

The architecture-altering operation of storage creation operates on one individual in the population selected probabilistically on the basis of fitness. It creates one new offspring program for the new population by adding a storage writing branch, SWB, and a storage reading branch, SRB to the program tree. The operation also creates appropriate names for referencing the two new branches, an invoking reference to the storage writing branch, SWB, and an invoking reference to the storage reading branch, SRB.

Figure 6B:
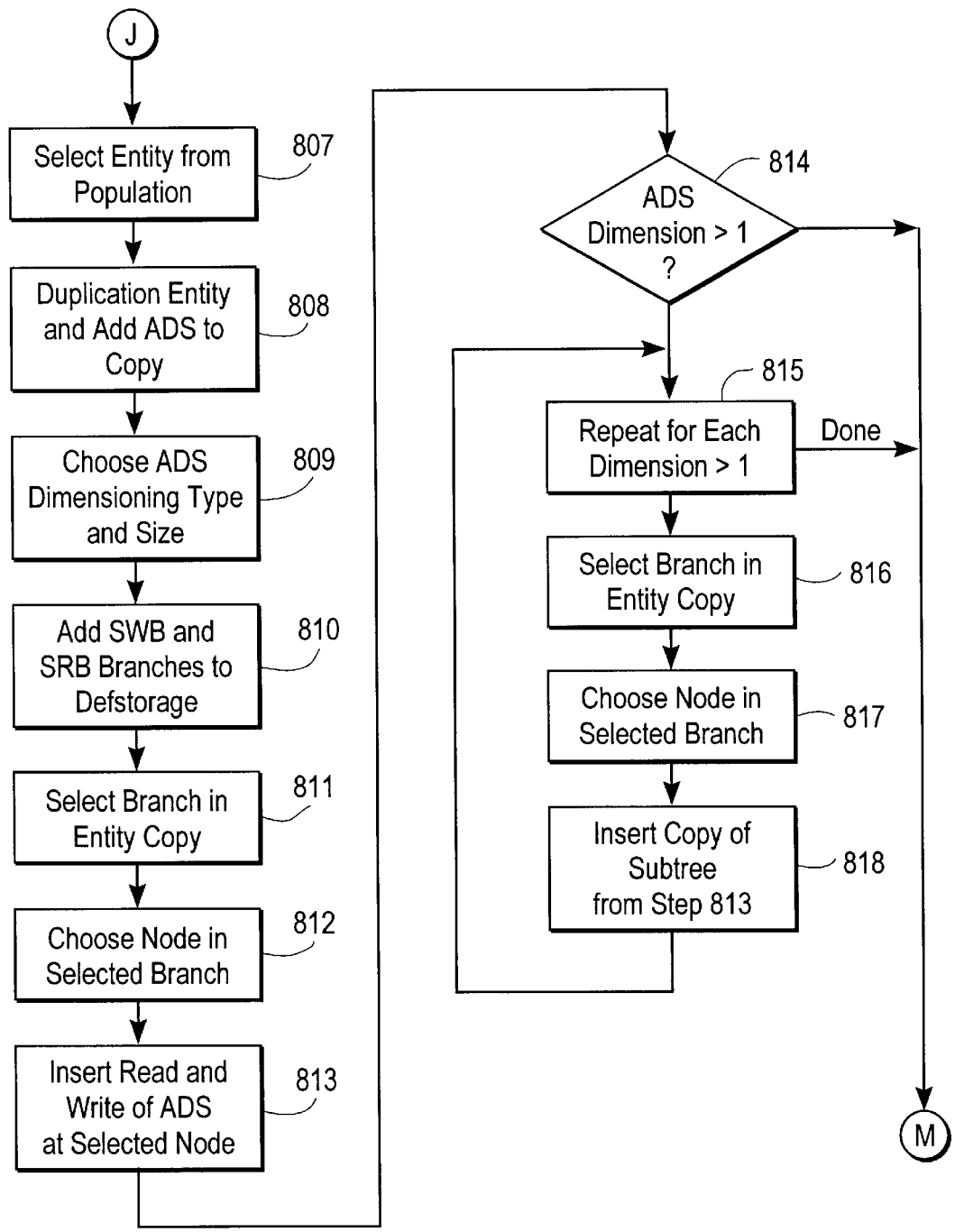

If at step 800, GPPS 320 selects storage creation, GPPS 320 performs the method steps shown in FIG. 6b. First at step 807, GPPS 320 selects, based on fitness, an individual program from the population to participate in this operation. A copy is made of the selected program at step 808 and the operation is then performed on the copy. GPPS 320 also adds an ADS definition to the copy. Thus, the original unchanged program remains available to be reselected for another operation.

Next, at step 809, GPPS 320 randomly chooses a dimension for the new memory (subject to a preestablished maximum dimensionality for the automatically defined stores, $N_{max-ads-dimension}$). If it is appropriate for the chosen dimension of memory, GPPS 320 randomly chooses a type for the new memory from the preestablished repertoire of allowable types for the problem. If it is appropriate for the chosen dimension and the chosen type of memory, GPPS 320 randomly chooses a size for the new memory, subject to a preestablished maximum size associated with each separate dimension of the type of memory (e.g., $N_{max-ads-size-index-1}$ for the size of indexed memory for an array's first dimension, $N_{max-ads-size-index-2}$ for an array's second dimension, etc.).

Next, at step 810, GPPS 320 adds a uniquely-named new storage writing branch, SWB, to the selected program. The storage writing branch contains only fixed code necessary to implement writing the chosen type of memory. In addition, GPPS 320 adds a uniquely-named new storage reading branch, SRB, to the selected program. The storage reading branch contains only fixed code necessary to implement reading the chosen type of memory.

At step 811, GPPS 320 randomly picks one of the branches of the selected program. If the selected program has only one branch, that branch is automatically picked. The picking of the branch may, as an option, be restricted to a result-producing branch or other specified category of branches.

Then, at step 812, GPPS 320 randomly chooses a node in this first picked branch of the selected program. Then, at step 813, GPPS 320 temporarily deletes the entire subtree rooted at this chosen node and inserts a two-argument PROGn connective function at this chosen node. GPPS 320 inserts an invocation of the storage writing branch, SWB, as the first argument of the PROGn and insert an invocation of the storage reading branch, SRB, as the second argument of the PROGn. GPPS 320 then restores the temporarily deleted subtree as the first argument of the invocation of the storage writing branch, SWB.

Next, at step 814, GPPS 320 determines if the ADS inserted in PROGn has a dimensionality equal to or greater than 1. If the dimensionality of the newly created memory is equal to or greater than 1, GPPS 320, at step 815, creates an appropriate number of additional address arguments to both the invocation of the storage writing branch, SWB, and the invocation of the storage reading branch, SRB for each dimension equal to or greater than one (1).

The k-th address argument of the storage writing branch, SWB, will be identical to k-th address argument of the storage reading branch, SRB. To create each such twice-needed address argument, at step 816, GPPS 320 randomly picks (independently from step 807 and all other address arguments) one of the branches of the selected program in the same manner as step 807. Then, at step 817, GPPS 320 randomly chooses (independently from step 808 and all other address arguments) a node in this newly picked branch of the selected program. Then, at step 818, GPPS 320 inserts one copy the entire subtree rooted at the this newly chosen node in this newly picked branch of the selected program as the k-th address argument of the storage writing branch, SWB, and inserts a second copy of this entire subtree as the k-th address argument of the storage reading branch, SRB.

After GPPS 320 inserts a copy of the subtree from step 813 as described for steps 815 through 818 for each dimension equal to or greater than 1, or in the event that the dimension is 0, GPPS 320 continues execution at step 556 of FIG. 5b.

The function set and terminal set of both branches of the new automatically defined store are empty. The function set of the picked branch of the selected program is enlarged to include the names of the storage writing branch, SWB, and the storage reading branch, SRB of the newly created automatically defined store. The terminal set of the picked branch of the selected program is unchanged. (In discussing automatically defined stores, we treat the SRB for named memory as a zero-argument function, rather than as a terminal). GPPS 320 enlarges the function set of any branch in the program whose function set includes the picked branch (i.e., any branch that actually calls the picked branches or that is permitted to call the picked branches) to include the names of the storage writing branch, SWB, and the storage reading branch, SRB, of the newly created automatically defined store. This enlargement operation does not affect the terminal set of any branch in the program whose function set includes the picked branches.

Figure 7:
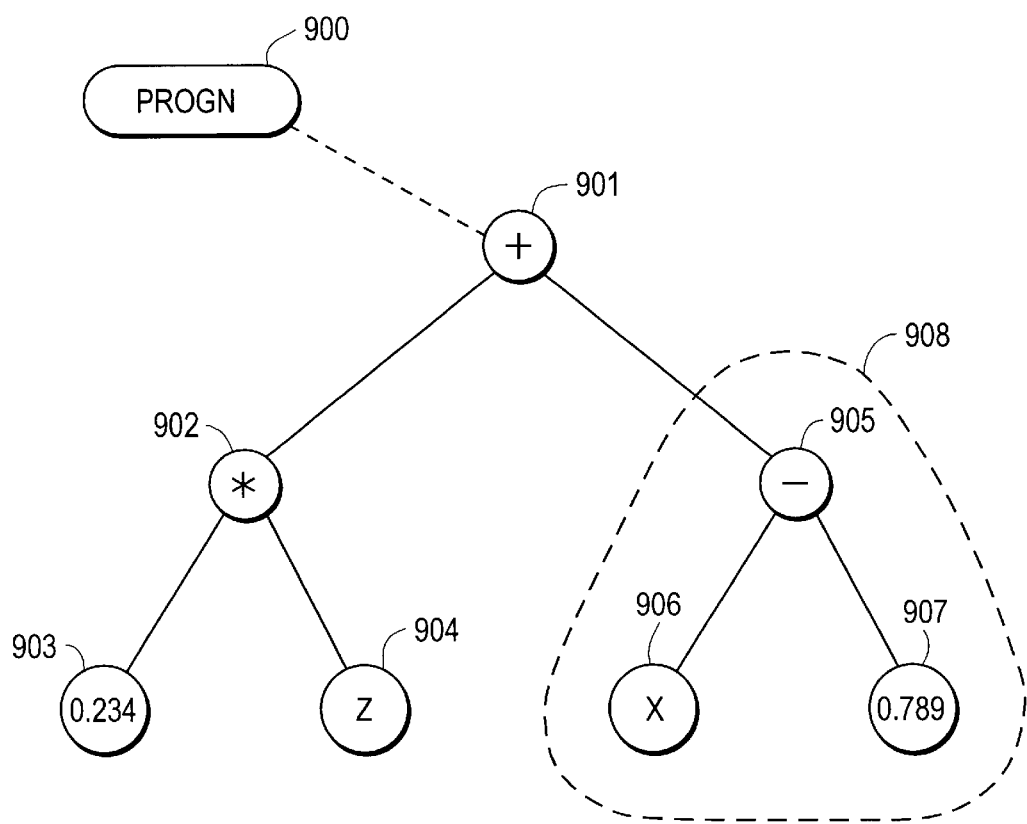
FIG. 7 illustrates a portion of a program tree.
Figure 8:
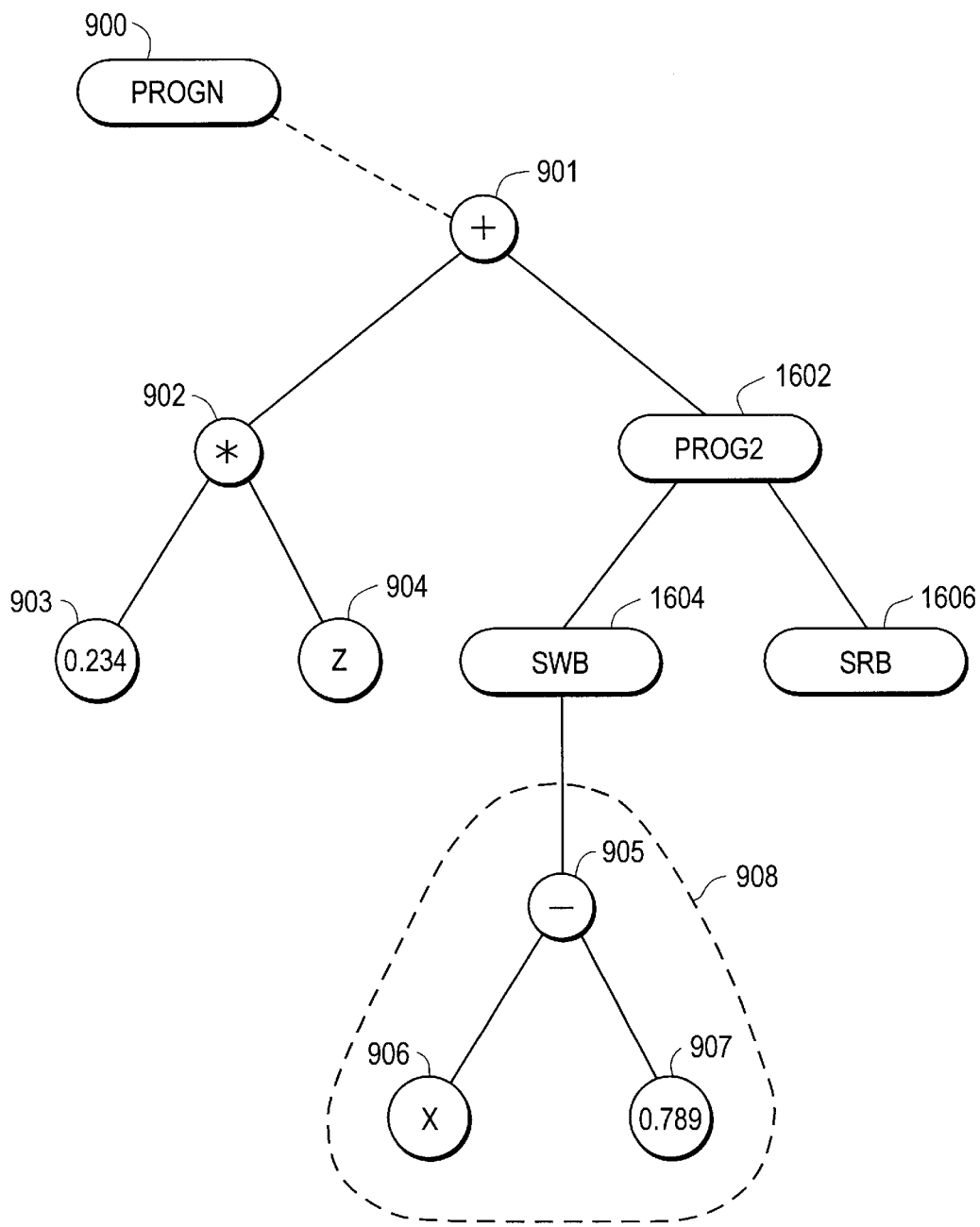
FIG. 8 is a program tree illustrating an application of a storage creation operation consisting of an automatically defined stores to the partial program tree of FIG. 7.

FIGS. 7 and 8 illustrate the application of the storage creation method described above. Suppose that the illustrative result-producing branch of a computer program shown in FIG. 7 is the branch that is picked in step 807 during the operation of storage creation.

Suppose that node 905 is the node chosen in step 808 from the branch picked in FIG. 7 during the operation of storage creation. If so, the three-point subtree (−X 0.789) rooted at node 905 is temporarily deleted from the branch (and held aside for later use). As shown in FIG. 8, GPPS inserts a two-argument PROG2 1602 connective function at this chosen point. GPPS inserts an invocation of SWB 1604 as the first argument of PROG2 1602 and inserts an invocation of SRB 1606 as the second argument of PROG2 1602. GPPS then inserts the temporarily deleted three-point subtree as the argument of the invocation of SWB 1604. If the newly created internal storage is of dimensionality zero (0) (e.g., named memory, a push-down stack, or a queue), the figure shows the result of the operation of storage creation.

If the newly created internal storage is of dimensionality one (1) or higher, both the SWB and SRB would possess additional argument(s) specifying address(es) in the newly created memory. When GPPS executes the program, PROG2 1602 first executes SWB 1604. SWB 1604 writes the value returned by the three-point subtree into the newly created memory. SWB 1604 returns this just-written value, but PROG2 1602 ignores the value returned by the execution of its first argument. PROG2 1602 then executes SRB 1606. SRB 1606 reads the value in the newly created memory and returns this just-read value. PROG2 1602, then returns the value returned by SRB 1606. Consequently, the value returned by PROG2 1602 is identical to the value returned by the original three-point subtree rooted at point 905, FIG. 7. Moreover, if the original subtree contains side-effecting functions, GPPS executes these functions in precisely the same sequential order as before the storage creation operation.

Once the architecture becomes open to evolution by way of the architecture-altering operations, functions and terminals often migrate from one part of the evolving overall program to another. This subsequent migration occurs because of crossover, because of mutation (since newly created functions and terminals enter the set of ingredients from which new subtrees are randomly created), and because of subsequent architecture-altering operations.

The value(s) returned and the action(s) performed by the overall program are unchanged by the operation of storage creation. That is, the offspring program produced by the architecture-altering operation of storage creation is semantically equivalent to the original selected program (its parent).

The parent that spawned the new individual program is usually a reasonably fit member of its generation. The offspring produced by the storage creation operation is equally fit (assuming that the problem's fitness measure is oblivious to the program's structure and the fitness cases do not vary from generation to generation). Thus, both parent and offspring have a good chance of surviving in the population for some time into the future. As the two diverge over a period of generations, the fitness of some descendent of one will generally become better than the fitness of some descendent of the other. That is, the parent and offspring and their descendants will compete with one another (and, of course other individuals in the population) for survival during subsequent generations of the evolutionary process.

Thus, the storage creation operation sets up an experimental trial, during the run of genetic programming, as to whether a program with internal storage, is, in fact, beneficial. The competitive pressures of the environment (as expressed by the problem's fitness measure) ultimately determine the outcome of the trial. Time will tell whether internal storage is, in fact, beneficial to the overall goal of solving the problem at hand. If internal storage is, in fact, necessary to solve a given problem, individuals with internal storage should be fruitful and should multiply in the population.

Alternatively, GPPS may implement the operation of storage creation without explicitly introducing the PROG2 connective into the function set of the problem. In this alternative embodiment, GPPS incorporates the functionality of the PROG2 into the storage writing branch, SWB. The modified version of the SWB possesses one additional final argument, namely the SRB. GPPS inserts the modified version of the SWB in place of the chosen subtree (i.e., the three-point subtree in the example). The modified version of the SWB first writes the desired value into the newly created memory (as before) and then executes this final argument, namely the SRB.

There are several parameters for controlling the operation of storage creation. First, the storage creation operation is controlled by a parameter specifying the probability of executing the operation on each generation, $p_{storage-creation}$. Second, there is a maximum number of automatically defined stores, $N_{max-ads}$, for each program in the population. Third, the storage creation operation is controlled by a parameter specifying the maximum dimensionality, $N_{max-ads-dimension}$, of the memory being created. Fourth, the storage creation operation is controlled by a data structure specifying the allowable types of internal storage for each allowable dimensionality. Fifth, the storage creation operation is controlled by a set of parameters specifying the maximum size associated with each separate dimension of the vector, matrix, or array (e.g., $N_{max-ads-size-index-1}$ for the first dimension, $N_{max-ads-size-index-2}$ for the second dimension, if any, and so forth).

Storage Deletion

The storage writing branch, SWB, and the storage reading branch, SRB, that constitute an automatically defined store may be deleted from a computer program during the run of GPPS using an architecture-altering operation.

The operation of storage deletion, step 802 FIG. 6a, operates on one individual in the population selected probabilistically based on fitness and creates one new offspring program for the new population by deleting both branches of one automatically defined store of the existing program.

The deletion of an iteration-performing branch raises the question of how to modify invocations of the to-be-deleted branches by the remaining branches of the overall program. The options include random regeneration, consolidation, and even potentially (at the expense of the semantics) macro expansion.

GPPS makes appropriate changes in the function and terminal sets of the affected branches of the program to reflect the deletion.

The operation of storage deletion creates the opportunity to conduct an experimental trial, during the run of genetic programming, as to whether a particular automatically defined store is, in fact, useful. After the deletion, the program with the reduced amount of storage competes with other individuals in the population (often including the reasonably fit parent that gave rise to it) for survival in subsequent generations of the evolutionary process.

Storage Duplication

GPPS may duplicate storage using an architecture-altering operation. The architecture-altering operation of storage duplication, step 803 FIG. 6a, preserves the semantics of the program.

The operation of storage duplication 803 operates on one individual in the population selected probabilistically based on fitness. Storage duplication 803 then creates one new offspring program for the new population by duplicating both branches of one automatically defined store of the existing program and creating invocations of the newly created automatically defined store.

GPPS makes appropriate changes in the function and terminal sets of the affected branches of the program to reflect the duplication.

Dynamic Changes in the Dimensionality of Memory

Named memory can be viewed as array memory of dimensionality zero (0) and indexed (vector) memory can be viewed as array memory of dimensionality one (1). The architecture-altering operations of storage argument duplication and storage argument deletion, step 804, FIG. 6a, provide a mechanism for dynamically altering the dimensionality of an already-created memory array during the run of genetic programming. These operations act on the pair of branches that constitute an automatically defined store. Since there is no body to the storage reading and writing branches, there is no analog, in the realm of internal storage, to the operation of argument creation.

Storage Argument Duplication

The architecture-altering operation of storage argument duplication, step 805, FIG. 6a, changes the storage reading branch function, SRB, and the storage writing branch function, SWB, by increasing the number of arguments that they each possess.

Figure 6C:
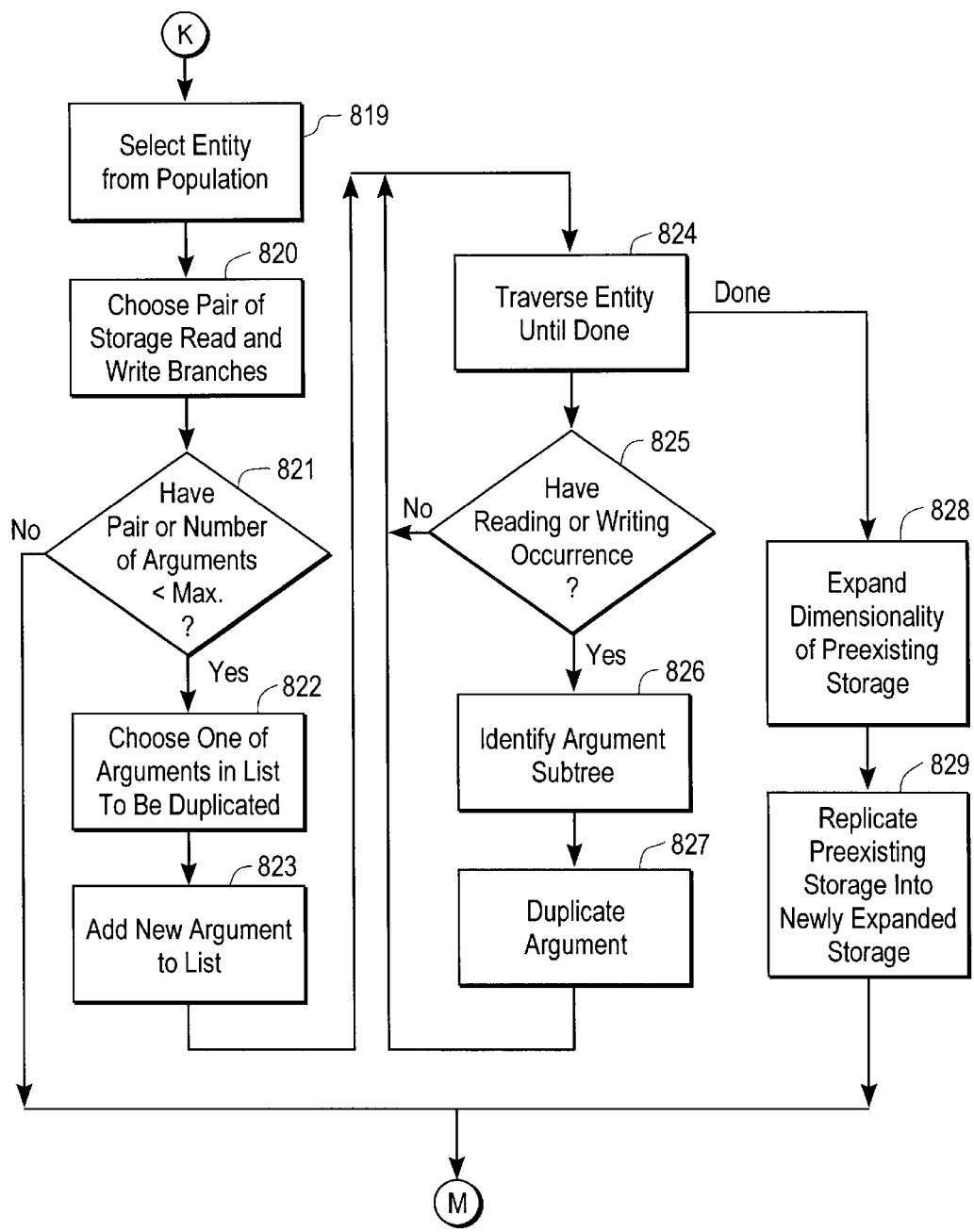

FIG. 6c is a flowchart of the process for the storage argument duplication operation, which operates on one individual selected from the population probabilistically based on fitness. A program with k storage reading and writing branches begets an offspring program with k storage reading and writing branches. However, there is one more argument in one pair of storage reading and writing branches of the offspring (compared to the corresponding pair of branches in the parent). The operation appropriately modifies the argument list for the pair of branches involved.

First, at step 819, GPPS 320 (FIG. 3a) selects an individual program from the population to participate in this operation. Then, at step 820, GPPS 320 picks one pair of storage reading and writing branches for named memory, indexed (vector) memory, or array memory from the selected program. If the selected program has only one such pair of branches, GPPS 320 automatically chooses that pair. At step 821, GPPS 320 determines if the selected program has no such pair of branches or if the picked function-defining branch already has the maximum number of arguments established for the problem. If the test at step 821 fails, GPPS 320 aborts this operation and returns to step 556 in FIG. 5b.

Next, at step 822, GPPS 320 chooses one of the arguments of the picked pair of storage reading and writing branches of the selected program as the argument-to-be-duplicated. Then, at step 823, GPPS 320 adds a uniquely-named new argument to the argument list of the picked pair of storage reading and writing branches, thus increasing, by one, the number of arguments in their argument lists.

At step 824, GPPS 320 traverses the entity for all occurrences of the picked pair of an invocation of the picked storage reading branch anywhere in the selected program. At step 825, GPPS 320 determines if it has found a reading or writing occurrence. If it has, then GPPS 320, at step 826, identifies the argument subtree in that invocation corresponding to the argument-to-be-duplicated. Then, at step 827, GPPS 320 duplicates that argument subtree in that invocation, thereby increasing, by one, the number of arguments in the invocation. The storage writing branch always has one more argument than its associated storage reading branch. After GPPS 320 traverses the entity, at step 828, it expands and replicates the preexisting internal storage for the selected program so it becomes an array with one additional dimension. If argument j is chosen in step 822 and $N_{max\text{-}ads\text{-}size\text{-}index\text{-}j}$ is the maximum size for the array's j-th dimension, then the amount of internal storage will increase by a factor of $N_{max\text{-}ads\text{-}size\text{-}index\text{-}j}$ after this replication. For example, if the storage argument duplication operation is applied to a 2 by 3 matrix (memory of dimensionality 2) called A and the first argument (dimension) of its two arguments is chosen in step 822, then the newly created memory will be expanded from a 2 by 3 two-dimensional matrix to a 2 by 3 by 2 three-dimensional array in step 828 of FIG. 6c. The new three-dimensional array, called B, will be accessed by three arguments (instead of the previous two). Suppose the six elements of the original 2 by 3 two-dimensional matrix are called A(1,1), A(2,1), A(1,2), A(2,2), A(1,3), and A(2,3). Then, a reference to the new storage element B(2,3,1) is simply a reference to the original element A(2,3). In general, a reference to B(I,J,1) is simply a reference to original element A(I,J) for all I between 1 and 2 and all J between 1 and 3. That is, these six elements of B are the same as the original six elements of A. Moreover, after the expansion of dimensionality from two to three, a reference to B(2,3,2) is a reference to one of the six newly created cells of memory. Because of the replication of information from two-dimensional matrix A into three-dimensional array B, the contents of B(2,3,2) has been set (replicated) to be the same as the contents of B(2,3,1). In general, the contents of B(I,J,2) is set to A(I,J) for all I between 1 and 2 and all J between 1 and 3. If original matrix A is viewed as a 2 by 3 rectangle, array B can be viewed as a 2 by 3 by 2 three-dimensional box. The bottom layer (layer 1) of the box has the original six elements of matrix A and the top layer (layer 2) of the box has copies of the original six elements of A.

The terminal set of the picked storage reading branch and the picked storage writing branch is enlarged to include the name of the newly created argument. The function set of any branch whose function set includes the picked storage reading branch or the picked storage writing branch (i.e., any branch that actually calls or that is permitted to call them) is unchanged; however, the arity of the picked storage reading branch and the picked storage writing branch are both incremented by one in the list containing the number of arguments possessed by each function for any branch whose function set includes the picked branches. The terminal set of any branch whose function set includes the picked the picked storage reading branch or the picked storage writing branch (i.e., any branch that actually calls or that is permitted to call them) is unchanged.

The difference between array memory of dimensionality k versus array memory of dimensionality k+1 is that higher-dimensional internal storage permits information to be accessed with a greater degree of refinement. The operation of storage argument duplication sets up an experimental trial, during the run of genetic programming, as to whether higher-dimensional internal storage is necessary or superfluous.

Storage Argument Deletion

The architecture-altering operation of storage argument deletion, step 806, FIG. 6a, changes the storage reading branch function, SRB, and the storage writing branch function, SWB, by decreasing the number of arguments that they each possess. Storage argument deletion operates on one individual selected from the population probabilistically on the basis of fitness. A program with k storage reading and writing branches begets an offspring program with k storage reading and writing branches. However, there is one less argument in one pair of storage reading and writing branches of the offspring (compared to the corresponding pair of branches in the parent). The operation appropriately modifies the argument list for the pair of branches involved.

Figure 6D:
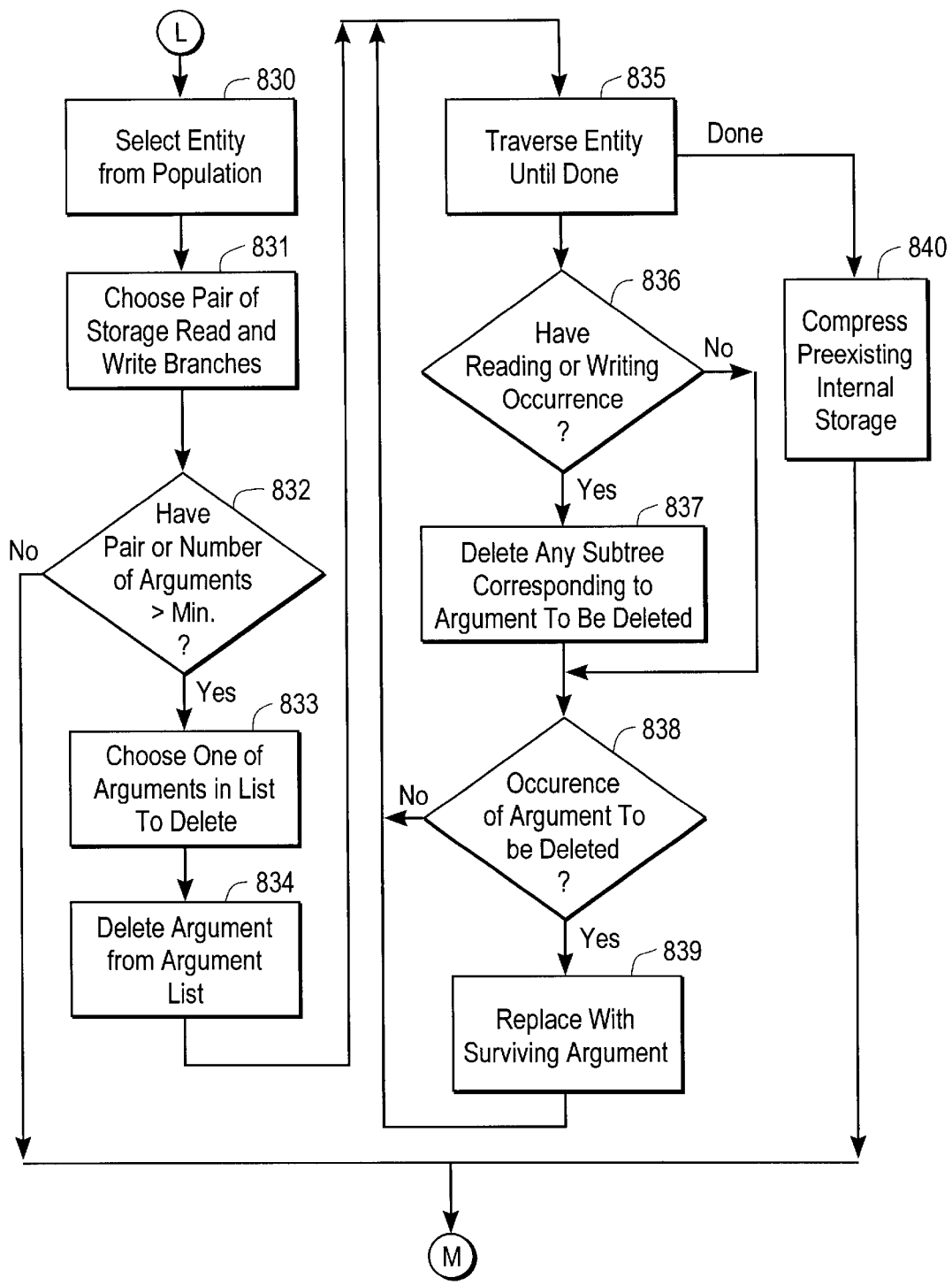

FIG. 6d is a method for executing the architecture-altering operation of storage argument deletion. First, at step 830, GPPS 320 selects an individual program from the population to participate in this operation. Then, at step 831, GPPS 320 picks one pair of storage reading and writing branches for named memory, indexed (vector) memory, or array memory from the selected program. If the selected program has only one such pair of branches, that pair is automatically chosen.

Then, at step 832, GPPS 320 determines if the selected program has no such pair of branches or if the picked function-defining branch already has the minimum number of arguments established for the problem. If either case is found, GPPS 320 returns to step 556 of FIG. 5b and the operation is aborted.

Next, at step 833, GPPS 320 chooses one of the arguments of the picked pair of storage reading and writing branches of the selected program as the argument-to-be-deleted. Then, at step 834, GPPS 320 deletes the argument-to-be-deleted from the argument list of both branches of the picked pair of storage reading and writing branches of the selected program, thus decreasing, by one, the number of arguments in each of their argument lists.

GPPS 320 then traverses the entire entity beginning at step 835. If GPPS 320 finds an occurrence of an invocation of the picked storage reading branch or storage writing branch at step 836, GPPS 320, at step 837, deletes the argument subtree in that invocation corresponding to the argument-to-be-deleted, thereby decreasing, by one, the number of arguments in the invocation.

At step 838, GPPS 320 determines if an occurrence of the argument-to-be-deleted has been found. If it has, GPPS 320, at step 839, replaces the argument-to-be-deleted with a surviving argument.

After traversing the entire entity, GPPS 320, at step 840, then compresses the preexisting internal storage for the selected program so it becomes an array with fewer dimensions. If argument j is chosen, in step 833, and $N_{max-ads-size-index-j}$ is the maximum size for the array's j-th dimension, then the amount of internal storage will decrease by a factor of $N_{max-ads-size-index-j}$ after this compression.

The terminal set of the picked storage reading branch and the picked storage writing branch is changed by deleting the name of the argument-to-be-deleted. The function set of any branch whose function set includes the picked storage reading branch or the picked storage writing branch (i.e., any branch that actually calls or that is permitted to call them) is unchanged; however, the arity of the picked storage reading branch and the picked storage writing branch are both decremented by one in the list containing the number of arguments possessed by each function for any branch whose function set includes the picked branches. The terminal set of any branch whose function set includes the picked the picked storage reading branch or the picked storage writing branch (i.e., any branch that actually calls or that is permitted to call them) is unchanged.

The deletion of an automatically defined store raises the question of how to modify invocations of the to-be-deleted pair of storage reading and writing branches by the remaining branches of the selected program.

Higher dimensional array memory is superfluous for many problems. The operation of storage argument deletion creates the opportunity to conduct an experimental trial, during the run of genetic programming, as to whether all of the information in a particular array and the prevailing method of accessing it is useful for solving the problem at hand. After the deletion, the program with less information (and with a less specific way to access it) competes with other individuals in the population for survival in subsequent generations of the run. Genetic programming can implement internal storage in numerous forms, including named memory (Koza, John R., *Genetic Programming: On the Programming of Computers by Means of Natural Selection*, Cambridge, Mass.: The MIT Press, 1992, and Koza, John R., *Genetic Programming II: Automatic Discovery of Reusable Programs*, Cambridge, Mass.: The MIT Press, 1994), indexed (vector) memory (Teller, Astro, The Evolution of Mental Models in Kinnear, Kenneth E. Jr. (ed.) *Advances in Genetic Programming*, Cambridge, Mass.: The MIT Press, 1994, Teller, Astro, Genetic Programming, Indexed Memory, the Halting Problem, and other Curiosities, *Proceedings of the Seventh Florida Artificial Intelligence Research Symposium*, 1994), matrix memory (Andre, David and Koza, John R., Evolution of Map Making: Learning, Planning, and Memory using Genetic Programming. *Proceedings of the First IEEE Conference on Evolutionary Computation*, IEEE Press. Volume I, 1994), state (Raik, Simon E. and Browne, David G., Evolving State and Memory in Genetic Programming, in Yao, Xin, Kim, J. H. and Furuhashi, T. (eds.) *Simulated Evolution and Learning First Asia-Pacific Conference, SEAL '96*. Taejon, Korea, November 1996, Selected Papers, Lecture Notes in Artificial Intelligence, Volume 1285, Heidelberg: Springer-Verlag, 1997), and relational memory (Brave, Scott, Using Genetic Programming to Evolve Mental Models, *Proceedings of the Fourth Golden West Conference on Intelligent Systems*, Raleigh, N.C.: International Society for Computers and Their Applications, 1995, and Brave, Scott, The Evolution of Memory and Mental Models using Genetic Programming, in Koza, John R., Goldberg, David E., Fogel, David B., and Riolo, Rick L. (eds.) 1996, *Genetic Programming 1996: Proceedings of the First Annual Conference*, Jul. 28–31, 1996. Stanford University Cambridge, Mass.: MIT Press, 1996).

See also Langdon, William B., Evolving Data Structures Using Genetic Programming, in Eshelman, Larry J. (ed.), *Proceedings of the Sixth International Conference on Genetic Algorithms*, San Francisco, Calif.: Morgan Kaufmann Publishers, 1995; Langdon, William B., Using Data Structures within Genetic Programming in Koza, John R., Goldberg, David E., Fogel, David B., and Riolo, Rick L. (eds.), *Genetic Programming 1996: Proceedings of the First Annual Conference*, Jul. 28–31, 1996. Stanford University, Cambridge, Mass.: MIT Press, 1996; Langdon, William B., Data Structures and Genetic Programming in Angeline, Peter J. and Kinnear, Kenneth E. Jr. (editors), *Advances in Genetic Programming* 2, Cambridge, Mass.: The MIT Press, 1996).

Even-6-Parity Problem using GPPS 300 (FIG. 3a)

This section applies one embodiment of the Genetic Programming Problem Solver, such as GPPS 300 (FIG. 3a)

to a six-input, one-output problem of symbolic regression of the Boolean even-6-parity function.

A Boolean parity problem is especially suitable for purposes of illustration of GPPS because this problem can be solved in several distinct ways. First, the problem can be solved with an initial single result-producing branch without automatically defined functions or loops. A one-branch solution to this problem may contain a composition of the primitive Boolean functions of disjunction, conjunction, and negation and conditional branching operations (such as IFEQZ and IFGTZ).

Second, the problem can be solved using one or more automatically defined functions (ADFs). Such functions may perform some useful lower-order Boolean function (such as a lower-order parity function). The functions may or may not call each other.

Third, the problem can be solved using an automatically defined loop (ADL) that sums the six Boolean inputs and tests the sum to see whether it is even or odd.

Fourth, the problem can be solved with a chain in the style of a decision tree with a chain of conditional branching operations.

Fifth, the problem can be solved by combining the foregoing approaches in a variety of ways.

The six-argument version of the Boolean parity problem was specifically chosen for purposes of this illustrative example (as opposed to a lower-order version of this problem) to discourage solutions that employ only a single result-producing-branch.

Preparatory Steps

Program Architecture

When GPPS 300 is being used, each program in generation zero has a uniform architecture consisting of one result-producing branch as shown in FIG. 2. There are no automatically defined functions 310 or automatically defined loops 312 in generation zero.

After generation zero, GPPS 300 uses the architecture-altering operations to create, duplicate, and delete automatically defined functions 310 and to determine the number of arguments possessed by each automatically defined function 310. Hierarchical references are allowed among automatically defined functions 310 created by the architecture-altering operations. Similarly, GPPS 300 uses the architecture-altering operations to create, duplicate, and delete automatically defined loops 312.

For practical reasons, a maximum of four automatically defined functions 310, each possessing between zero and four arguments, was established for this problem. Similarly, a maximum of two automatically defined loops 312 (each consisting of a loop initialization branch, a loop condition branch, a loop body branch, and a loop update branch) was established for this problem.

Functions and Terminals

When GPPS 300 is being used, the function and terminal sets do not change from problem to problem.

The initial function set for the result-producing branch, $F_{rpb\text{-}initial}$, is $F_{rpb\text{-}initial}$={+,−, *, %, IFLTE, IFEQZ, TOR, TAND, TNOT, RLI, WIM, RIM, WLO, RLO, FLOOR}, taking 2,2,2,2,4,4,2,2,1,1,2,1,2,1, and 1 arguments, respectively.

Since there are no automatically defined functions 310 in generation zero, the initial function set for automatically defined functions, $F_{adf\text{-}initial}$, is empty. That is, $F_{adf\text{-}initial}$=empty.

Since there are no automatically defined loops 312 in generation zero, the initial function set for the four branches of the automatically defined loops 312, $F_{adl\text{-}initial}$, is empty. That is, $F_{adl\text{-}initial}$=empty.

After generation zero, the architecture-altering operations introduce automatically defined loops 310 (each consisting of four branches), automatically defined functions 312, and the dummy variables possessed by automatically defined functions 312. As a result, individuals in the population begin to contain invocations of the newly created automatically defined functions 310 (ADF0, ADF1, ADF2, and ADF3), and references to terminals representing the dummy variables of the newly created automatically defined functions 310 (ARG0, ARG1, ARG2, and ARG3). In addition, individuals in the population begin to contain terminals representing the return values of the loop body branches (LBB0 and LBB1) of automatically defined loops 312 ADL0 and ADL1.

The set of potential functions for the result-producing branch, $F_{rpb\text{-}potential}$, is $F_{rpb\text{-}potential}$={ADL0, ADF0, ADF1, ADF2, ADF3}.

The potential automatically defined functions 310 take an as-yet-unknown number of arguments (between zero and four).

The set of potential functions for the four branches of each automatically defined loop 312, $F_{adl\text{-}potential}$, is identical to the set of potential functions for the result-producing branch.

$F_{adl\text{-}potential}${ADF0, ADF1, ADF2, ADF3}.

Similarly, the potential function set for the automatically defined functions 310, $F_{adf\text{-}potential}$, is $F_{adf\text{-}potential}$={ADF0, ADF1, ADF2, ADF3}, subject to the limitation that a function-defining branch can refer hierarchically only to a previously-defined function-defining branch.

The initial terminal set for the result-producing branch, $T_{rpb\text{-}initial}$, is $T_{rpb\text{-}initial}$={NINPUTS, NOUTPUTS, INDEX, R}. For the even-6-parity problem, the size, NINPUTS, of input vector 302 is six (6) and the size, NOUTPUTS, of output vector 308 is one (1).

Since there are no automatically defined functions in generation zero, the initial terminal set for automatically defined functions 310, $T_{adf\text{-}initial}$, is empty. That is, $T_{adf\text{-}initial}$=empty.

Since there are no automatically defined loops 312 in generation zero, the initial terminal set for the four branches of the automatically defined loops 312, $T_{adl\text{-}initial}$, is empty. That is, $T_{adl\text{-}initial}$=empty, The set of potential terminals for the result-producing branch, $T_{rpb\text{-}potential}$, is $T_{rpb\text{-}potential}$={LBB0, LBB1}.

The set of potential terminals for the automatically defined functions 310, $T_{adf\text{-}potential}$, is $T_{adf\text{-}potential}$={ARG0, ARG1, ARG2, ARG3, NINPUTS, NOUTPUTS, INDEX, R}.

The set of potential terminals for the four branches of the automatically defined loops 312, $T_{adl\text{-}potential}$, is $T_{adl\text{-}potential}$={NINPUTS, NOUTPUTS, INDEX, R}.

The program tree used with GPPS 300 contains floating-point random constants and floating-point arithmetic functions. Thus, the program typically deposits a floating-point value in the output vector 308. For the even-6-parity problem, an output interface wrapper consisting of the IFGTZ ("If Greater Than Zero") operator is used to convert the value deposited into the output vector 308 (which is usually a floating-point number when GPPS is used) into a binary outcome (+1.0 and −1.0).

Fitness

The fitness cases for this problem consist of the set of $2^6$=64 possible combinations of the six Boolean inputs (0.000 and +1.000) in input vector 302.

The standardized fitness of an individual program in the population is the sum, over the 64 fitness cases, of the absolute value of the difference (Hamming distance) between the value returned by the result-producing branch (after interpretation by the wrapper) and the correct value of the Boolean even-6-parity function.

Parameters

This problem uses several control parameters not previously defined.

The size, NINDEXED, of indexed memory 304 is 20.

The maximum number, $N_{max-adl}$, of automatically defined loops 312 is two (2).

The maximum size, $S_{adl}$, for each of the four branches of each automatically defined loop 312 is 100 points.

None of the four branches of the automatically defined loops 312 possess arguments, so that $N_{min-argument-adl}=0$ and $N_{max-argument-adl}=0$.

The maximum number, $N_{max-adl-executions}$, of executions of an automatically defined loop 312 is seven (7).

The other control parameters for this problem are found in the tableau below.

Tableau

Table III summarizes the key features of the problem of symbolic regression of the Boolean even-6-parity function for GPPS 300.

When GPPS 300 is used to solve a problem, the function set and the terminal set are non-user-specified and generic and may be used for many different problems that the user may want to solve. This table may be used for a wide variety of problems.

TABLE III

| Tableau for the even-6-parity problem with GPPS 300. | |
| --- | --- |
| Objective: | Discover, using the Genetic Programming Problem Solver (GPPS) 300, a computer program that takes the values of the six independent Boolean variables in the input vector 302 and deposits the value of the Boolean even-6-parity function into the output vector 308. |
| Program architecture: | One result-producing branch, RPB. Automatically defined loops and automatically defined function(s) and their arguments will be created during the run by the architecture-altering operations. |
| Initial function set for the result-producing branches: | $F_{rpb-initial}$ = {+, −, *, %, IFLTE, IFEQZ, TOR, TAND, TNOT, RLI, WIM, RIM, WLO, RLO, FLOOR}. |
| Initial terminal set for the result-producing branches: | $T_{rpb-initial}$ = {$\Re$, NINPUTS, NOUTPUTS, INDEX}. |
| Initial function set for the automatically defined functions: | No automatically defined functions in generation zero. $F_{adf-initial}$ = empty. |
| Initial terminal set for the automatically defined functions: | No automatically defined functions in generation zero. $T_{adf-initial}$ = empty. |
| Initial function set for automatically defined loops: | No automatically defined loops in generation zero. $F_{adl-initial}$ = empty. |
| Initial terminal set for automatically defined loops: | No automatically defined loops in generation zero. $T_{adl-initial}$ = empty. |
| Potential function set for the result-producing branches: | $F_{rpb-potential}$ = {ADL0, ADF0, ADF1, ADF2, ADF3}. |
| Potential terminal set for the result-producing branches: | $T_{rpb-potential}$ = {LBB0, LBB1}. |
| Potential function set for the automatically defined functions: | $F_{adf-potential}$ = {ADF0, ADF1, ADF2, ADF3}. |
| Potential terminal set for the automatically defined functions: | $T_{adf-potential}$ = {ARG0, ARG1, ARG2, ARG3, NINPUTS, NOUTPUTS, INDEX, $\Re$}. |
| Potential function set for automatically defined loops: | $F_{adl-potential}$ = {ADF0, ADF1, ADF2, ADF3}. |
| Potential terminal set for automatically defined loops: | $T_{adl-potential}$ = {NINPUTS, NOUTPUTS, INDEX, $\Re$}. |
| Fitness cases: | All $2^6$ = 64 combinations of the six Boolean arguments in the input vector. |
| Raw fitness: | Raw fitness is the number of fitness cases for which the value deposited in the output vector equals, after interpretation by the wrapper, the correct Boolean value of the even-6-parity function. |

TABLE III-continued

Tableau for the even-6-parity problem with GPPS 300.

| | |
|---|---|
| Standardized fitness: | Standardized fitness is the sum, over the 64 fitness cases, of the absolute value of the difference (i.e., the Hamming distance) between the value deposited in the output vector and the correct value of the even-6-parity function. Standardized fitness is 64 minus the raw fitness. |
| Hits: | Same as raw fitness. |
| Wrapper: | A wrapper (output interface) consisting of the IFGTZ ("If Greater Than Zero") operator is used to convert the floating-point value deposited into the output vector to a binary outcome. |
| Parameters: | M = 640,000. G = 1,001. Q = 10,000. D = 64. B = 2%. $N_{rpb}$ = 1. $S_{rpb}$ = 500. $S_{adf}$ = 100. $N_{max-adf}$ = 4. $N_{max-argument-adf}$ = 4. $N_{min-argument-adf}$ = 0. $N_{max-adl}$ = 2. $S_{adl}$ = 100. $N_{max-adl-executions}$ = 7. $N_{max-argument-adl}$ = 0. $N_{min-argument-adl}$ = 0. NINDEXED = 20. |
| Result designation: | Best-so-far pace-setting individual. |
| Success predicate: | A program scores the maximum number of hits (64). |

Results

Six runs were made of this problem using GPPS 300 (FIG. 3a). Correct solutions were produced on generations 10, 15, 16, 17, 18, and 58.

Run A demonstrates the wide variety of architectural arrangements of automatically defined loops 312 and automatically defined functions 310 that can be created as part of the competitive evolutionary process of a single run of GPPS 300.

Run B illustrates the use of two automatically defined loops 312 in a particularly interesting solution to the problem.

Architectural Diversity of a Run

The best-of-generation program for generation zero scored 33 hits (out of 64).

A pace-setting individual (scoring 34 hits) from generation two had one automatically defined loop 312.

In generation six, the first pace-setting individual with two automatically defined loops 312 appeared.

The first pace-setting individual (scoring 38 hits) with both an automatically defined loop 312 and an automatically defined function 310 appeared later in generation six. This individual had one automatically defined loop 312, one zero-argument automatically defined function 310, and a single one-argument automatically defined function 310. One automatically defined function 31-hierarchically referred to the other automatically defined function 310. The result-producing branch referred to the automatically defined function 310 at the top of the hierarchy and to the automatically defined loop 312. Thus, as early as generation six, a rather complex architecture had emerged that was competitively superior to all other programs so far in the run.

In generation 15, the first pace-setting individual with a two-argument automatically defined function 310 appeared. This individual (scoring 42 hits) also had one automatically defined loop 312.

In generation 17, the first pace-setting individual with two two-argument automatically defined functions 310 appeared. This individual (scoring 44 hits) also had one automatically defined loop 312.

In generation 29, the first pace-setting individual with four two-argument automatically defined functions 310 appeared. This individual (scoring 55 hits) also had one automatically defined loop 312.

In generation 38, the first pace-setting individual with a three-argument automatically defined function 310 appeared. This individual (scoring 56 hits) also had one automatically defined loop 312 and one two-argument automatically defined function 310.

The 100%-correct individual scoring 64 hits (out of 64) emerged in generation 58. This best-of-run program consisted of the following branches:

(1) one result-producing branch, RPB;
(2) one automatically defined loop 312, ADL0, consisting of the following four branches,
    (a) a loop initialization branch, LIB0,
    (b) a loop condition branch, LCB0,
    (c) a loop body branch, LBB0, and
    (d) a loop update branch, LUB0; and
(3) two two-argument automatically defined functions 310 (ADF4 and ADF5) created by the architecture-altering operations.

The result-producing branch of the best-of-run individual from generation 58 had 444 points as follows:

(wlo (wlo (ifeqz (wlo (rli −7.274451) (tnot NINPUTS)) (+ (− (tand (+ (floor lbb0) (rli −0.405153)) (wlo (tor (rim index) (ifeqz NINPUTS NINPUTS 3.323932)) (rli NINPUTS))) (ifgtz (wim (rli (rli 3.058891)) (rli 1.327383)) (ifeqz (rli 2.908941) (wlo (rim index) (tnot −3.737233)) (wim (floor index) (rli NINPUTS))) (+ (wim (ifeqz (ifgtz (rli (rli 2.606788)) (ifeqz (% (tor (wlo NINPUTS 3.628510) (% 7.265455 (wlo (rli (floor index)) (tnot (tnot (tnot (tnot −3.737233))))))) (tor (rli −9.592547) (% −4.329314 3.872723))) (rli index) (ifeqz (wim (wlo −8.701645 6.955063) (rim index)). (ifgtz (rlo −1.110111) (* −6.981014 9.976995) (rli 1.327383)) (rli NINPUTS))) (ifgtz (rli 3.239255) (* (wim (rli 3.058891) LIB0) (− −8.536102 (rli −7.274451))) (ifeqz (tand (wlo (floor (rli 7.648451)) (floor lbb0)) (% 0.705781 index)) (ifeqz (* 8.318048 NINPUTS) (tnot (rli −1.110111)) (* −5.550876 −2.956903)) (tand (+ (+(floor lbb0) (rli −0.405153)) NINPUTS) (floor 1.436937))))) (rlo (wim (* (ifgtz −8.995371 index 9.470537) lcb0) 2.151551)) (rim (rli (ifeqz (rli 2.908941) (wlo (rim index) (tnot −3.737233)) (wim (floor (+ (ifeqz NINPUTS (rim index) 3.323932) (tor −2.793060 −6.639519))) (rli NINPUTS)))))) index) (rim (rlo 6.757090))))) (tand (tnot (tand (rim −5.206735) (rlo −0.405153))) (% (floor (rli (rim (ifgtz (wim (rli (rli −8.004584)) (rli 1.327383)) (ifeqz (rli 2.908941) (wlo (rim index) (tnot (tnot index))) (wim −1.633354 (rli NINPUTS))) (+ (tnot (rli (rli 2.908941))) (rim (rlo 6.757090)))))))) (rli NINPUTS)))) (− (+ (floor lbb0) (rli −0.405153)) (+ (− (tand (+ (floor lbb0) (rli −0.405153)) (wlo (tor (rim index) (ifeqz NINPUTS NINPUTS 3.323932)) (ifgtz (rim (rlo 6.757090)) (tor (* (ifgtz −8.995371 index 9.470537) lcb0) (+ (ifeqz index −2.302380 9.834745) (rim lcb0))) (wlo (rim index) (tnot −3.737233))))) (ifgtz (wim (rli (rli 3.058891)) (rli 1.327383)) (ifeqz. (rli 2.908941) (wlo (rim index) (tnot −3.737233)) (wim (floor index) (rli NINPUTS))) (+ (wim (ifeqz (ifgtz (rli (rli 2.606788)) (ifeqz (% (tor (wlo NINPUTS 3.628510) (% 7.265455 (wlo (rli (floor index)) (tnot (tnot (tnot index)))))) (tor (rli −9.592547) (% −4.329314 3.872723))) (rli index) (ifeqz (wim (wlo −8.701645 6.955063) (rim index)) (ifgtz (rlo −1.110111) (* −6.981014 9.976995) (rli 1.327383)) (rli NINPUTS))) (ifgtz (rli 3.239255) (* (wim (rli 3.058891) LIB0) (− −8.536102 (rli −7.274451))) (ifeqz (tand (wlo NIN- PUTS NINPUTS) (% 0.705781 index)) (ifeqz (* 8.318048 NINPUTS) (tnot (rli −1.110111)) (* −5.550876 −2.956903)) (tand (+ (+ (floor lbb0) (rli −0.405153)) NINPUTS) (floor 1.436937))))) (rlo (wim (* (ifgtz −8.995371 index (ifeqz (rli 2.908941) (wlo (rim index) (tnot −3.737233)) (wim (floor (+ (floor lbb0) (rli −0.405153))) (rli NINPUTS)))) lcb0) 2.151551)) (rim (rli (ifeqz (rli 2.908941) (wlo (rim index) (tnot −3.737233)) (wim (floor (+ (ifeqz NIN- PUTS (rim index) 3.323932) (rli −0.405153))) (rli NINPUTS)))))) index) (rim (rlo 6.757090))))) (tand (tnot (% (ifeqz (rli 4.258403) (wim −0.405153 2.151551) (tnot index)) (% (rli NINPUTS) index))) (% (floor (rim index)) (rli NINPUTS)))))) (rli 6.757090)) (rli 6.757090)).

The loop initialization branch, LIB0, of automatically defined loop 312 ADL0 consisted of the following ten points:

(ifgtz (rli 0.617464) (wim (rli 3.058891) (rlo 1.971325)) (floor −5.550876)).

The loop condition branch, LCB0, of automatically defined loop 312 ADL0 consisted of the following eight points:

(ifgtz (rim index) (* −6.981014 9.976995) (rli 1.327383)).

The loop body branch, LBB0, of automatically defined loop 312 ADL0 consisted of the following 31 points:

(* (rim (floor (rlo (− (wlo (rli 1.225266) (tnot (ifgtz −8.403739 NINPUTS (rim −5.206735)))) (rim (% (tnot (tand (rim −5.206735) (rlo (+ (ifeqz index −2.302380 9.834745) (rim LCB0))))) (rli 7.648451))))))) 2.256185).

The loop update branch, LUB0, of automatically defined loop 312 ADL0 consisted of the following eight points:

(tor (rim index) (ifeqz NINPUTS (rim index) 3.323932)).

Neither ADF4 nor ADF5 were referenced by the result-producing branch.

ADF4 was a two-argument automatically defined function 310 created by the architecture-altering operations. ADF4 consisted of one point and returned the numerical constant −6.981014.

ADF5 was a two-argument automatically defined function 310 created by the architecture-altering operations. It was equivalent to the two-argument disjunction function (which merely duplicates a function that was already in the initial function set for this problem):

(tor (tor arg0 arg1) arg1).

Automatically defined functions 310, automatically defined loops 312, and indexed memory 304 were all available to GPPS 300. As it turned out, only automatically defined loops 312 were used in solving this problem on this particular run. The decision to use (or not use) automatically defined functions 310, loops 312, and indexed memory 304 was made by the evolutionary process, not by the human user prior to presenting the problem to GPPS 300.

Evolution of an Iterative Solution

Now consider the 100%-correct best-of-run individual produced in generation ten of another run of GPPS 300 on this problem. The evolved solution consisted of one result-producing branch and two automatically defined loops 312.

The 6-point result-producing branch of the best-of-run individual from generation ten is shown below:

(tor LBB1 (tnot (floor (rli NINPUTS)))).

This branch is irrelevant in this program because it does not write anything to output vector 308.

First, consider the four branches of automatically defined loop 312 ADL0 of the best-of-run individual from generation ten.

The loop initialization branch, LIB0, of automatically defined loop 312 ADL0 consists of the following five points.

(wlo (RLI NINPUTS) (RLI 8.521336)).

The loop condition branch, LCB0, of automatically defined loop 312 ADL0 consists of the following two points:

(RLI index).

The loop body branch, LBB0, of automatically defined loop 312 ADL0 consists of the following three points:

(rlo (RLI 2.832704)).

The loop update branch, LUB0, of automatically defined loop 312 ADL0 consisted of the following two points:

(RLI −7.182307).

The last three of these four branches (i.e., LCB0, LBB0, and LUB0) merely read information from the input vector 302 and output vector 308 and, therefore, contribute nothing to the final output of the overall program.

The first of these four branches (i.e., the loop initialization branch, LIB0) executes one WLO ("Write Linear Output") function. Since NOUTPUTS is 1, this WLO writes to the sole location of output vector 308, regardless of the value of (RLI 8.521336). Since (RLI NINPUTS) is equivalent to (RLI 0), this RLI ("Read Linear Input") function reads the contents of location zero (0) of input vector 302. That is, the RLI reads external input D0 (of the six external inputs to the even-6-parity problem). The WLO of LIB0 then writes external input D0 into the single location of output vector 308. As will be seen, the loop body branch, LBB1, of automatically defined loop ADL1, begins by executing a RLO ("Read Linear Output") and thereby gains access to this deposited value of external input D0. The passing of this single external input D0 to LBB1 is the sole consequence of automatically defined loop 312 ADL0.

Now consider the four branches of automatically defined loop 312 ADL1 of the best-of-run individual from generation ten.

The loop initialization branch, LIB1, of automatically defined loop 312 ADL1 consists of the following two points:

(rlo NINPUTS).

The loop condition branch, LCB1, of automatically defined loop 312 ADL1 consists of the following four points:

(ifeqz −6.530157 4.493470 NINPUTS).

The loop body branch, LBB1, of automatically defined loop 312 ADL1 consists of the following 46 points.

(WLO (ifgtz (rlo (− (RLI −0.045897) (ifeqz (RLI 0.157271) (RLI −7.182307) (RLI −1.983282)))) (RLI index) (wim (tnot (RLI index)) (rim (tnot (wim (RLI −5.498105) (% (− (wim 9.525654 8.521336) (floor index)) (floor (floor −9.943804)))))))) (% (RLI (tnot (ifgtz (−index 9.230116) (floor −6.570716) −8.528593))) (RLI 6.669161))).

The loop update branch, LUB1, of automatically defined loop 312 ADL1 consists of the following two points:

(RLI NINPUTS).

Since −6.530157 is not equal to zero, the loop condition branch, LCB1, always, returns NINPUTS (the positive constant 6) . Thus, the loop is not terminated until INDEX reaches seven (7) (and is therefore no longer less than $N_{max-adl-executions}$, which is 7).

The top-most point of the loop body branch, LBB1, is a WLO ("Write Linear Output") function (underlined and emboldened). LBB1 also executes three WIM ("Write Indexed Memory") functions and one RIM ("Read Indexed Memory") function (all also underlined and emboldened). LBB1 also contains one RLO ("Read Linear Output") function.

(WLO (ifgtz (rlo (− (rli −0.045897) (ifeqz (rli 0.157271) (rli −7.182307) (rli −1.983282)))) (rli index) (wim (tnot (rli index)) (rim (tnot (wim (rli −5.498105) (% (− (wim 9.525654 8.521336) (floor index)) (floor (floor −9.943804)))))))) (% (rli (tnot (ifgtz (− index 9.230116) (floor −6.570716) −8.528593))) (rli 6.669161))).

The loop body branch, LBB1, of automatically defined loop 312 ADL1 can be simplified by making the following ten substitutions:

(1) (FLOOR −6.570716)=−7,
(2) (FLOOR (FLOOR −9.943804))=−10,
(3) Since NINPUTS is 6, (RLI 6.669161)=(RLI 0),
(4) (RLI −0.045897)=(RLI 5),
(5) (RLI −5.498105)=(RLI 0),
(6) (RLI 0.157271)=(RLI 0),
(7) (RLI −7.182307)=(RLI 4),
(8) (RLI −1.983282)=(RLI 4),
(9) Since INDEX is a non-negative integer, (FLOOR INDEX)=index, and
(10) Since the size of indexed memory 304 is 20, (WIM 9.525654 8.521336)=(WIM 9.525654 8), The effects of these ten changes on the loop body branch, LBB1, (each underlined and emboldened) are shown below:

(WLO (ifgtz (rlo (− (rli 5) (ifeqz (rli 0) (rli 4) (rli 4)))) (rli index) (wim (tnot (rli index)) (rim (tnot (wim (rli 0) (% (− (wim 9.525654 8) index) −10)))))) (% (rli (tnot (ifgtz (− index 9.230116) −7 −8.528593))) (rli 0))).

Since both the second and third arguments to the IFEQZ (the seventh point in the expression above) are identical, the entire seven-point subexpression (ifeqz (rli 0) (rli 4) (rli 4))

can be replaced with (RLI 4). The effect of this additional change on LBB1 (underlined and emboldened) is shown below:

(WLO (ifgtz (rlo (− (rli 5) (rli 4))) (rli index) (wim (tnot (rli index)) (rim (tnot (wim (rli 0) (% (− (wim 9.525654 8) index) −10)))))) (% (rli (tnot (ifgtz (− index 9.230116) −7 −8.528593))) (rli 0))).

Since NOUTPUTS is one (1), the entire second argument of the top-most WLO function is irrelevant. That is, the 11-point subexpression (% (rli (tnot (ifgtz (− index 9.230116) −7 −8.528593))) (rli 0))

can be replaced by a place holder (say, 1). The effect of this additional change on LBB1 (underlined and emboldened) is shown below:

(WLO (ifgtz (rlo (− (rli 5) (rli 4))) (rli index) (wim (tnot (rli index)) (rim (tnot (wim (rli 0) (% (− (wim 9.525654 8) index) −10)))))) 1).

Thus, the output vector contains the even-2-parity function (called E2P below) of D1 and D2.

(E2P D2 D1).

After the fourth execution of LBB1, the output vector contains (E2P D3 (EOP D2 D1)).

After the fifth execution of LBB1, the output vector contains (E2P D4 (E2P D3 (EOP D2 D1)).

After the sixth execution of LBB1, the output vector contains (E2P D5 (E2P D4 (E2P D3 (EOP D2 D1)).

On the seventh execution of LBB1, INDEX is 6 and (RLI INDEX) returns the external input D0. After the seventh execution of LBB1, the output vector contains (E2P D0 (E2P D5 (E2P D4 (E2P D3 (EOP D2 D1))

into the output vector.

This is the final execution of LBB1 because an INDEX of 7 will cause the loop condition branch, LCB1, to terminate automatically defined loop ADL1. This iterative computer program is a perfect solution to the even-6-parity problem.

Thus, the second execution of LBB1 cancels the effect of the first execution of LBB1 and deposits D1 into output vector 308.

The third execution of LBB1 is typical of all later executions. On the third execution of LBB1, INDEX is two (2) and output vector 308 contains D1. If D1 is positive, the IFGTZ returns (RLI 2), namely external input D2, and writes D2 into output vector 308. If D1 is negative, the IFGTZ returns the negation (tnot (RLI INDEX)) of external input D2, and writes the negation of D2 into output vector 308. Thus, output vector 308 has computed the odd-2-parity of D1 and D2, namely (xor D1 D2).

The fourth execution of LBB1 puts (xor D3 (xor D2 D1))

into output vector 308.

The fifth execution of LBB1 puts (xor D4 (xor D3 (xor D2 D1)))

into output vector 308.

The sixth execution of LBB1 puts (xor D5 (xor D4 (xor D3 (xor D2 D1))))

into output vector 308.

On the seventh execution of LBB1, INDEX is six (6) and (RLI INDEX) returns D0. This is the final execution of LBB1 because an INDEX of seven (7) will cause the loop condition branch, LCB1, to stop automatically defined loop 312 ADL1. The seventh execution of LBB1 puts (xor D0 (xor D5 (xor D4 (xor D3 (xor D2 D1))))) into output vector 308.

In other words, the second execution of LBB1 places the second input into output vector 308. Then, the third, fourth, fifth, sixth, and seventh executions of LBB1 place the even-2-parity of the previously written output and another input into output vector 308. Thus, this iterative computer program is a perfect solution to the even-6-parity problem.

This iterative solution can also be viewed as an unrolled recursive solution to this problem.

Automatically defined functions 310, automatically defined loops 312, and indexed memory 304 were all available to GPPS 300. The solution evolved for this problem on this particular run did not use automatically defined functions 310. The evolved solution makes nominal, but unimportant, use of indexed memory 304. The evolved solution actively employed automatically defined loops 312. The decision to use (or not use) automatically defined functions 310, automatically defined loops 312, and indexed memory 304 was made as part of the evolutionary process, not by the human user prior to presenting the problem to GPPS 300.

Even-6-Parity Problem using GPPS 320 (FIG. 3b)

In an alternative embodiment of the GPPS, such as GPPS 320 (FIG. 3b), to the Boolean even-6-parity problem above. In addition to automatically defined functions 310 and loops 312 (as used in GPPS 300, FIG. 3a), GPPS 320 has automatically defined stores 316 and recursions 314 available to solve the problem.

Preparatory Steps

Program Architecture

In one embodiment, when GPPS 320 is being used, each program in generation zero has a uniform architecture consisting of one result-producing branch as in FIG. 2. There are no automatically defined functions 310, no automatically defined loops 312, no automatically defined recursions 314, and no automatically defined stores 316 in generation zero.

After generation zero, GPPS 320 uses the architecture-altering operations to create, duplicate, and delete automatically defined functions 310 and to determine the number of arguments possessed by each automatically defined function 310. Hierarchical references are allowed among automatically defined functions 310 created by the architecture-altering operations. Similarly, GPPS 320 uses the architecture-altering operations to create, duplicate, and delete automatically defined loops 312, recursions 314, and stores 316 from individual programs.

For practical reasons, a maximum of four automatically defined functions 310, each possessing between zero and two arguments, were established for this problem. Similarly, there was a maximum of one automatically defined loop 312, one automatically defined recursion 314, and two automatically defined stores 316 made available. These (and other similar) limitations are made for purely practical reasons of computer time and are not limitations on the GPPS system.

Functions and Terminals

When GPPS 320 is being used, the function and terminal sets do not change from problem to problem.

The initial function set for the result-producing branch, $F_{rpb-initial}$, is $F_{rpb-initial}$={+, −, *, %, IFLTE, TOR, TAND, TNOT, RLI, WLO, RLO, FLOOR}, taking 2,2,2,2,4,2,2,1,1,2,1,2,1, and 1 arguments, respectively.

Notice that four functions appearing in GPPS 300 (WIM, RIM, RLO, and IFEQZ) are not used in GPPS 320.

Since there are no automatically defined functions 310 in generation zero, the initial function set for automatically defined functions 310, $F_{adf-initial}$, is empty. That is, $F_{adf-initial}$=empty.

Since there are no automatically defined loops 312 or automatically defined recursions 314 in generation zero, the initial function sets for the four branches of the automatically defined loops 312 and automatically defined recursions 314 are empty. That is, $F_{adl-initial}$=empty and $F_{adr-initial}$=empty.

After generation zero, the architecture-altering operations introduce automatically defined functions 310, the dummy variables possessed by the automatically defined functions 310, automatically defined loops 312 (each consisting of four branches), automatically defined recursions 314 (each consisting of four branches), and automatically defined stores 316 (each consisting of two branches). As a result, individuals in the population begin to contain functions and terminals associated with the newly created branches.

The set of potential functions for the result-producing branch, $F_{rpb-potential}$, is $F_{rpb-potential}$={ADL0, ADR0, SWB0, SWB1, ADF0, ADF1, ADF2, ADF3}.

Here SWB0 and SWB1 are the storage writing branches of automatically defined stores 316 ADS0 and ADS1, respectively. The automatically defined functions 310 take an as-yet-unknown number of arguments (between zero and four).

Similarly, the potential function set for the automatically defined functions 310, $F_{adf-potential}$, is $F_{adf-potential}$={ADF0, ADF1, ADF2, ADF3}, subject to the limitation that a function-defining branch can refer hierarchically only to a previously-defined function-defining branch.

The set of potential functions for the four branches of each automatically defined loop 312, $F_{adl-potential}$, is $F_{adl-potential}$={ADF0, ADF1, ADF2, ADF3}.

The set of potential functions for the four branches of each automatically defined recursion 314, $F_{adr-potential}$, includes the recursion body branch, RBB0, along with the automatically defined functions 310.

$F_{adr-potential}$={ADR0, ADF0, ADF1, ADF2, ADF3}.

The initial terminal set for the result-producing branch, $T_{rpb-initial}$, is $T_{rpb-initial}$={R, NINPUTS, NOUTPUTS, INDEX}.

For the even-6-parity problem, the size, NINPUTS, of the input vector is 6 and the size, NOUTPUTS, of output vector 308 is 1. INDEX is the index of the automatically defined loops 312.

Since there are no automatically defined functions 310 in generation zero, the initial terminal set for automatically defined functions 310, $T_{adf-initial}$, is empty. That is, $T_{adf-initial}$=empty.

Since there are no automatically defined loops 312 or automatically defined recursions 314 in generation zero, the initial terminal sets for the four branches of the automatically defined loops 312 and automatically defined recursions 314 are empty. That is, $T_{adl-initial}$=empty and $T_{adr-initial}$=empty.

The set of potential terminals for the result-producing branch, $T_{rpb-potential}$, is $T_{rpb-potential}$={LBB0, SRB0, SRB1}.

Here LBB0 is the return value from the loop body branch of automatically defined loop 312 ADL0. SRB0 and SRB1 are the return values of the storage reading branches of automatically defined stores 316 ADS0 and ADS1, respectively.

The set of potential terminals for the automatically defined functions 310, $T_{adf-potential}$, is $T_{adf-potential}$={ARG0, ARG1, NINPUTS, NOUTPUTS, INDEX, R}.

The set of potential terminals for the four branches of the automatically defined loops 312, $T_{adl-potential}$, is $T_{adl-potential}$={NINPUTS NOUTPUTS, INDEX, R}.

The set of potential terminals for the four branches of the automatically defined recursions 314, $T_{adr-potential}$, is $T_{adr-potential}$={NINPUTS, NOUTPUTS, INDEX, R}.

The program tree used with GPPS 320 contains floating-point random constants and floating-point arithmetic functions. An output interface wrapper 416 (FIG. 4) consisting of the IFGTZ ("If Greater Than Zero") operator is used to convert the value deposited into output vector 308 (which is usually a floating-point number when GPPS 320 is used) as a binary outcome (+1.0 and −1.0).

Fitness

The fitness cases for this problem consist of the set of $2^6=64$ possible combinations of the six Boolean inputs (0.000 and +1.000) in the input vector.

The standardized fitness of an individual program in the population is the sum, over the 64 fitness cases, of the absolute value of the difference (Hamming distance) between the value returned by the result-producing branch (after interpretation by the wrapper) and the correct value of the Boolean even-6-parity function.

Parameters & Tableau

Table IV summarizes the key features of the problem of symbolic regression of the Boolean even-6-parity function with GPPS 320.

When GPPS 320 is used to solve a problem, this function set and the terminal set may be used for many different problems.

TABLE IV

Tableau for the even 6-parity GPPS 320 problem.

| | |
|---|---|
| Objective: | Discover, using GPPS 320, a computer program that takes the values of the six independent Boolean variables in the input vector 302 and deposits the value of the Boolean even-6-parity function into the output vector 308. |
| Program architecture: | One result-producing branch, RPB. Automatically defined loops, automatically defined recursions, automatically defined stores, and automatically defined function(s) and their arguments will be created during the run by the architecture-altering operations. |
| Initial function set for the result-producing branches: | $F_{rpb\text{-}initial} = \{+, -, *, \%, IFLTE, TOR, TAND, TNOT, RLI, WLO, FLOOR\}$. |
| Initial terminal set for the result-producing branches: | $T_{rpb\text{-}initial} = \{\Re, NINPUTS, NOUTPUTS, INDEX\}$. |
| Initial function set for the automatically defined functions: | No automatically defined functions in generation zero. $F_{adf\text{-}initial}$ = empty. |
| Initial terminal set for the automatically defined functions: | No automatically defined functions in generation zero. $T_{adf\text{-}initial}$ = empty. |
| Initial function set for automatically defined loops: | No automatically defined loops in generation zero. $F_{adl\text{-}initial}$ = empty. |
| Initial terminal set for automatically defined loops: | No automatically defined loops in generation zero. $T_{adl\text{-}initial}$ = empty. |
| Initial function set for automatically defined recursions: | No automatically defined recursions in generation zero. $F_{adr\text{-}initial}$ = empty. |
| Initial terminal set for automatically defined recursions: | No automatically defined recursions in generation zero. $F_{adr\text{-}initial}$ = empty. |
| Potential function set for the result-producing branches: | $F_{rpb\text{-}potential} = \{ADL0, ADR0, SWB0, SWB1, ADF0, ADF1, ADF2, ADF3\}$. |
| Potential terminal set for the result-producing branches: | $T_{rpb\text{-}potential} = \{LBB0, SRB0, SRB1\}$. |
| Potential function set for the automatically defined functions: | $F_{adf\text{-}potential} = \{ADF0, ADF1, ADF2, ADF3\}$. |
| Potential terminal set for the automatically defined functions: | $T_{adf\text{-}potential} = \{ARG0, ARG1, NINPUTS, NOUTPUTS, INDEX, \Re\}$. |
| Potential function set for automatically defined loops: | $F_{adl\text{-}potential} = \{ADF0, ADF1, ADF2, ADF3\}$ |
| Potential terminal set for automatically defined loops: | $T_{adl\text{-}potential} = \{NINPUTS, NOUTPUTS, INDEX, \Re\}$. |
| Potential function set for automatically defined recursions: | $F_{adr\text{-}potential} = \{ADR0, ADF0, ADF1, ADF2, ADF3\}$. |
| Potential terminal set for automatically defined recursions: | $T_{adr\text{-}potential} = \{NINPUTS, NOUTPUTS, INDEX, \Re\}$. |
| Fitness cases: | All $2^6 = 64$ combinations of the six Boolean arguments in the input vector. |

TABLE IV-continued

Tableau for the even 6-parity GPPS 320 problem.

| | |
|---|---|
| Raw fitness: | Raw fitness is the number of fitness cases for which the value deposited in the output vector equals, after interpretation by the wrapper, the correct Boolean value of the even-6-parity function. |
| Standardized fitness: | Standardized fitness is the sum, over the 64 fitness cases, of the absolute value of the difference (i.e., the Hamming distance) between the value deposited in the output vector and the correct value of the even-6-parity function. Standardized fitness is 64 minus the raw fitness. |
| Hits: | Same as raw fitness. |
| Wrapper: | A wrapper (output interface) consisting of the IFGTZ ("If Greater Than Zero") operator is used to convert the floating-point value deposited into the output vector to a binary outcome. |
| Parameters: | $M = 120{,}000$. $G = 1{,}001$. NINPUTS = 6. NOUTPUTS = 1. $Q = 2{,}000$. $D = 60$. $B = 2\%$. $N_{rpb} = 1$. $S_{rpb} = 500$. $S_{adf} = 100$. $N_{max\text{-}adf} = 4$. $N_{max\text{-}argument\text{-}adf} = 2$. $N_{min\text{-}adf\text{-}arg} = 0$. $N_{max\text{-}adl} = 1$. $S_{adl} = 100$. $N_{max\text{-}argument\text{-}adl} = 0$. $N_{min\text{-}argument\text{-}adl} = 0$. $N_{max\text{-}adl\text{-}executions} = 9$. $N_{max\text{-}adr} = 1$. $S_{adr} = 100$. $N_{max\text{-}argument\text{-}adr} = 0$. $N_{min\text{-}argument\text{-}adr} = 0$. $N_{max\text{-}adr\text{-}executions} = 9$. $N_{max\text{-}ads} = 2$. |
| Result designation: | Best-so-far pace-setting individual. |
| Success predicate: | A program scores the maximum number of hits (64). |

Results

During the only run of the even-6-parity problem using GPPS 320, the best-of-generation program from generation zero had a fitness of 32 and scores 32 hits (out of 64).

Table V shows: the generation on which each pace-setting program of the run was created; the number of ADFs 310, ADLs 312, ADRs 314, and ADSs 316 in each pace-setting program; and the fitness and the number of hits for each pace-setting program. As can be seen, ADFs 310, ADLs 312, ADRs 314, and ADSs 316 each appeared sporadically during the run.

TABLE V

Pace-setting values of fitness for even-6-parity problem with GPPS 320.

| Generation | Number of ADFs | Number of ADLs | Number of ADRs | Number of ADSs | Fitness | Hits |
|---|---|---|---|---|---|---|
| 0 | 0 | 0 | 0 | 0 | 32 | 32 |
| 0 | 0 | 0 | 0 | 0 | 31 | 33 |
| 0 | 0 | 0 | 0 | 0 | 30 | 34 |
| 4 | 1 | 1 | 0 | 0 | 29 | 35 |
| 5 | 0 | 1 | 0 | 0 | 28 | 36 |
| 6 | 2 | 0 | 1 | 0 | 27 | 37 |
| 9 | 1 | 1 | 0 | 0 | 26 | 38 |
| 11 | 1 | 1 | 0 | 0 | 25 | 39 |
| 14 | 1 | 1 | 1 | 0 | 24 | 40 |
| 15 | 1 | 1 | 0 | 0 | 22 | 42 |
| 21 | 1 | 1 | 1 | 0 | 21 | 43 |
| 20 | 1 | 1 | 0 | 0 | 20 | 44 |
| 21 | 0 | 1 | 0 | 0 | 19 | 45 |
| 22 | 1 | 1 | 0 | 0 | 18 | 46 |
| 24 | 1 | 1 | 0 | 0 | 17 | 47 |
| 25 | 1 | 1 | 0 | 0 | 16 | 48 |
| 27 | 1 | 1 | 0 | 0 | 15 | 49 |
| 31 | 1 | 1 | 0 | 0 | 14 | 50 |
| 34 | 1 | 1 | 0 | 0 | 13 | 51 |
| 31 | 1 | 1 | 0 | 0 | 12 | 52 |
| 35 | 1 | 1 | 0 | 0 | 11 | 53 |
| 40 | 1 | 1 | 0 | 0 | 10 | 54 |
| 42 | 1 | 1 | 1 | 0 | 9 | 55 |
| 47 | 2 | 1 | 1 | 0 | 8 | 56 |
| 43 | 1 | 1 | 0 | 0 | 7 | 57 |
| 52 | 1 | 1 | 0 | 0 | 6 | 58 |
| 57 | 1 | 1 | 1 | 0 | 5 | 59 |
| 57 | 1 | 1 | 0 | 0 | 4 | 60 |
| 64 | 1 | 1 | 0 | 0 | 3 | 61 |
| 67 | 1 | 1 | 0 | 1 | 2 | 62 |
| 72 | 1 | 1 | 0 | 1 | 1 | 63 |
| 77 | 1 | 1 | 0 | 1 | 0 | 64 |

The best-of-run program for the even-6-parity problem emerged on generation 77. This program scored 64 hits (out of 64), and had a fitness (error) of zero (0). It had one ADF 310, one ADL 312, no ADRs 314, and one ADS 316. The ADF 310, ADL 312, and ADS 316 were present in this best-of-run program as a consequence of the architecture-altering operations.

The result-producing branch of the best-of-run program had 498 points. Automatically defined function 310 ADF0 was referenced twice by the result-producing branch. The storage write branch, SWB, and the storage read branch, SRB, were each referenced once by the result-producing branch. The result-producing branch referred four times to the value returned by the loop body branch, LBB, of the program's automatically defined loop 312. The program is shown below:

(ifgtz (wlo (* (* (ifgtz (tnot (rli (– (tnot (% –8.075199e-01
     (FLOOR (% index NINPUTS)))) (rli (tnot
     6.000711))))) (% (ifgtz NOUTPUTS (% (tor (%
     9.738825 index) (FLOOR (+ (wlo (LBB) (rli index))
     (FLOOR (rli –8.212069))))) (tand (rli 8.977148) (–

(tnot (% -8.075199e-01 (FLOOR (% index NINPUTS)))) (rli (tnot 6.000711))))) (- (wlo (rli 2.156086) (* 4.381680 index)) (rli -1.447678))) (tand (rli 8.977148) (ifgtz -3.081552 3.976555 -7.128815))) (- (wlo (rli -2.156086) (* 4.381680 index)) (rli -1.447678))) (rli -9.882646)). (rli -9.882646)) (rli (+ (wlo (FLOOR (% -2.435598e-01 (rli -8.065310e-01))) (rli NINPUTS)) (tor (tor (* -9.024844 NOUTPUTS) (rli index)) (* (% index 7.173054) (% (rli NINPUTS) -3.955457)))))) (ifgtz (+ (+(rli 1.111267) (% index (rli NOUTPUTS)))) (% (tand (rli 3.256218) (FLOOR (% NINPUTS index))) (+ (wlo (LBB) (rli index)) (FLOOR (rli -8.212069))))) (SWB (rli -5.770931e-01) (rli 4.759479)) (- (rli NINPUTS) (ifgtz (wlo (* (ifgtz (tnot (rli (rli (rli 2.087852)))) (% (tor (% 9.738825 index) (FLOOR NOUTPUTS)) (- (rli -4.211002) (- (wlo (rli -2.156086) (* 4.381680 index)) (rli -1.447678)))) (- (wlo (rli -2.156086) (* 4.381680 index)) (rli -1.447678))) (rli (- (rli -4.211002) (- (wlo (rli -2.156086) (* 4.381680 index)) (rli -1.447678))))) (rli NOUTPUTS)) (ifgtz (+ (FLOOR (rli (+ (- (rli -4.211002) (rli index)) (rli (- (wlo (rli -2.156086) (FLOOR (% -2.435598e-01 -8.010729))) (rli -1.447678)))))) (% (tand (rli -4.834002) (FLOOR (% NINPUTS index))) (+ (wlo (rli -8.065310e-01) (rli (rli NINPUTS))) (LBB)))) (rli -5.770931e-01) (rli 4.759479)) (- (rli NINPUTS) (ifgtz (wlo (* (ifgtz (tnot (rli (rli -4.108169))) (% (tor (% 9.738825 index) (FLOOR NOUTPUTS)) (tand (rli 8.977148) (ifgtz -3.081552 3.976555 -7.128815))) (- (wlo (rli -2.156086) (* 4.381680 index)) (% index (rli 1.111267)))) (rli -9.882646)) (rli NOUTPUTS)) (ifgtz (+ (+ (rli 1.111267) (% index 5.010924)) (% (tand (* 4.381680 (rli -4.108169)) -4.108169) (+ (wlo (tor (rli -4.834002) (rli index)) (rli index)) (FLOOR (rli -8.212069))))) (rli index) -4.355075) (- (rli (rli -2.156086)) (ifgtz (ifgtz (wlo (* (ifgtz (tnot (rli (rli (rli -2.156086)))) (+ (rli (wlo (+ 4.950438 NINPUTS) (FLOOR (* index (tor (* -9.024844 NOUTPUTS) (rli index)) (* (tand (rli 3.256218) (FLOOR (rli -8.065310e-01))) (% NOUTPUTS -3.955457)))))) index) (- (wlo (rli index) (rli -4.048536)) (rli -1.447678))) (rli -9.882646)) (rli (FLOOR (* (rli -4.355075) (rli (wlo (FLOOR (% -2.435598e-01 -8.010729)) (tand (ADF0 -1.014584 4.222528) (- -5.528134 8.375563)))))))) (ifgtz (+ (FLOOR (rli (+ (FLOOR 6.581360) (rli 4.936962e-01)))) (% (tand (rli 3.256218) (FLOOR (% NINPUTS (tnot 6.000711)))) (+ (wlo (rli -8.065310e-01) (rli index)) (FLOOR (rli (rli -4.108169)))))) (rli (rli NINPUTS)) (rli 4.759479)) (- (rli NINPUTS) (ifgtz (* (rli (rli NOUTPUTS)) (% NINPUTS index)) (tnot (FLOOR (* (+ (rli NOUTPUTS) -7.780355) (rli NINPUTS)))) (+ (wlo (FLOOR (% -2.435598e-01 -8.010729)) (tand (ADF0 -1.014584 4.222528) (- -5.528134 8.375563))) (tor (tor (* index (tor (tor (* -9.024844 NOUTPUTS) (rli index)) (* (tand (rli 4.759479) (FLOOR (% NINPUTS (+ (wlo (LBB) (rli index)) (FLOOR (rli -8.212069)))))) (% NOUTPUTS -3.955457)))) (rli index)) (* (% index 7.173054) (% NOUTPUTS -6.547245)))))) (tnot (SRB)) (+ (wlo (FLOOR (% -2.435598e-01 (rli -8.065310e-01))) (rli NINPUTS)) (tor (tor (* -9.024844 NOUTPUTS) (rli index)) (* (% index 7.173054) (% NOUTPUTS -3.955457))))))))))).

Automatically defined function 310 ADF0 had 52 points and is shown below:

(* (ifgtz (tnot (tor (% 9.738825 index) (FLOOR NOUTPUTS))) (% (+ (rli 1.111267) (% index 5.010924)) (tand (rli 8.977148) (ifgtz -3.081552 3.976555 -7.128815))) (- (wlo (rli -2.156086) (* 4.381680 index)) (rli -1.447678))) (ifgtz (tnot (rli (rli (rli -2.156086)))) (+ (rli (rli 4.759479)) index) (-(* (rli (rli NOUTPUTS)) (rli -9.927546)) (rli -1.447678)))).

The loop iteration branch, LIB, had two points and is shown below:

(rli 4.759479)

The loop condition branch, LCB, had seven points and is shown below:

(tnot (FLOOR (* (rli -4.355075) (rli NINPUTS)))).

The loop update branch, LUB, had 21 points and is shown below:

(% (tand (rli (wlo (rli -8.065310e-01) (rli index))) (FLOOR (% NINPUTS index))) (+ (wlo (rli -8.065310e-01) (rli index)) (FLOOR (rli -8.212069)))).

The loop body branch, LBB, had two points and is shown below:

(rli -8.065310e-01).

The above program demonstrates that GPPS 320 can evolve a solution to the Boolean even-6-parity problem.

Although automatically defined functions 310, loops 312, recursions 314, and stores 316 were all available to GPPS 320, the decision to use (or not use) these architecture-altering operations was dynamically made by GPPS 320 during the run.

Parallel Computer System

Parallel processing is advantageous, but not required, for implementation of the present invention because of the uncoupled nature of the time-consuming fitness measurements of the process. Parallelization can be used with almost 100% efficiency by the process of the present invention.

Relatively little time is expended on tasks such as the creation of the initial population at the beginning of the run and the execution of the genetic operations during the run (e.g., reproduction, crossover, mutation, and architecture-altering operations). The task of measuring the fitness of each individual in each generation of the evolving population is usually the dominant component of the computational burden.

These observations give rise to the most commonly used approach to parallelization of evolutionary algorithms, namely the asynchronous island model for parallelization. In this approach, the population for a given run is divided into semi-isolated subpopulations called demes. Each subpopulation is assigned to a separate processor of the parallel computing system. A variety of embodiments may be used to implement this approach. In one embodiment, the run begins with the random creation of the initial population and each individual in a subpopulation is randomly created locally on its local processor. Similarly, the genetic operations are performed locally at each processor. In particular, the selection of individuals to participate in crossover is localized to the processor. The time-consuming task of measuring the fitness of each individual is performed locally at each processor. Upon completion of a generation (or other interval), a relatively small percentage of the individuals in each subpopulation are probabilistically selected (based on fitness) for emigration from each processor to other nearby processors. The processors operate asynchronously in the sense that generations start and end independently at each processor and in the sense that the time of migration is not synchronized. In one embodiment, the immigrants to a particular destination wait in a buffer at their destination until the destination is ready to assimilate them. The immigrants are then inserted into the subpopulation at the destination processor in lieu of the just-departed emigrants. The overall iterative process then proceeds to the next generation. The guiding principle in implementing this parallel approach is always to fully utilize the computing power of each processor. Thus, for example, if a full complement of immigrants has not yet been received when a processor is ready to assimilate immigrants, one advantageous embodiment is to make up the deficiency in immigrants with randomly chosen copies of the just-departed emigrants. Similarly, if a processor receives two groups of immigrants from a particular other processor before it finishes its current generation, another advantageous embodiment is that the later immigrants may overwrite the previous immigrants. The inter-processor communication requirements of migration are low because only a modest number of individuals migrate during each generation and because each migration is separated by a comparatively longer periods of time for fitness evaluation.

Because the time-consuming task of measuring fitness is performed independently for each individual at each processing node, the asynchronous island model for parallelization delivers an overall increase in the total amount of work performed that is nearly linear with the number of independent processing nodes. That is, Nearly 100% efficiency is routinely realized when an evolutionary algorithm is run on a parallel computer system using the asynchronous island model for parallelization. This near-100% efficiency is in marked contrast to the efficiency achieved in parallelizing the vast majority of computer calculations.

In one embodiment, the processing logic generates and executes a run on a parallel Beowulf-style computer system consisting of 56 Dec Alpha® 533 megahertz (MHz) processors with 64 megabytes of Random Access Memory (RAM) arranged in a two-dimensional 7×8 toroidal mesh with a DEC Alpha® computer as host. (See Sterling, Salmon, and Becker 1999.) The DEC Alpha® processors communicate by way of a 100 megabit-per-second Ethernet. The so-called distributed genetic algorithm or island model for parallelization is used, Andre, David and Koza, John R. 1996, Parallel Genetic Programming: A Scalable Implementation Using the Transputer Architecture, in Angeline, Peter J. and Kinnear, Kenneth E. Jr. (editors), *Advances in Genetic Programming* 2, Cambridge, Mass.: The MIT Press, 1996. That is, subpopulations (referred to herein as demes) are situated at the processing nodes of the system. The population size may be, for example, Q=20,000 at each of the D=56 demes, so that the total population size, M, is 1,120,000. The initial random subpopulations of generation zero are created locally at each processing node. Generations are run asynchronously on each node. After the genetic operations are performed locally on each node, four boatloads of emigrants, each consisting of B=2% (the migration rate used in one embodiment of the system) of the node's subpopulation (selected on the basis of fitness) are dispatched to each of the four toroidally adjacent processing nodes. The immigrants are assimilated into each destination processing node just after that node dispatches its immigrants to its neighboring nodes.

A 56-node parallel system with a 533-MHz DEC Alpha® microprocessor at each processing node operates at about 30 giga-hertz (GHz) in the aggregate. The DEC Alpha® processor has a total of four instruction units. Two of these are integer units and two are floating-point units. The instruction units are pipelined and able to produce a result on every clock cycle if the pipelines are kept full.

In one embodiment, the system is arranged as a computing cluster or Beowulf style system. The system has a host computer with a 533-MHz DEC Alpha® microprocessor with 64 megabytes of RAM (running the Linux operating system). The host contains a 4 giga-byte (GB) hard disk, video display, and keyboard. Each of the processing nodes of the system contains a 533-MHz DEC Alpha® microprocessor with 64 megabytes (MB) of RAM. There is no disk storage at the processing nodes. The processing nodes do not directly access input-output devices or the host's file system. The processing nodes run the Linux operating system. The processing nodes are arranged in a toroidal network with each processing node communicating with four torodially adjacent neighbors. The communication between processing nodes is by means of 100 megabit-per-second Ethernet. A system such as this can be built with "Commodity Off The Shelf" (COTS) products.

Approximately half of 64 MB of RAM is available for the storage of the population (with the remainder housing the Linux operating system, the application software, and buffers for exporting and importing individuals, and other items of overhead). Memory is rarely a constraining consideration for the genetic algorithm operating on fixed-length binary character strings; however, it is a consideration for genetic programming. For genetic programming, a population of 32,000 individuals, each occupying 1,000 bytes of RAM, can be accommodated with 32 MB of RAM. Using the commonly used one-byte-per-point method of storing individual program trees in genetic programming, each individual in the population can possess 1,000 points (functions or terminals). Each processing node may, therefore, accommodate a population of 320,000 1,000-point individuals. Depending on the intended size of individuals in the population for the user's particular application, it may be desirable to install more than 64 MB of RAM on each processing node.

The 100 megabit-per-second Ethernet is sufficient to handle the migration of individuals in most practical runs of genetic programming using the island model. Migration usually occurs at a rate of about 2% in each of four directions on each generation for each processing node. For example, if the population size is 32,000 at each processing node and 2% of the population migrates in each of four directions, then communication of 2,560 individuals (2.56 MB of data if each individual consists of 1,000 bytes) is required for every generation for each processing node. If one generation is processed every 15 minutes (900 seconds), this amounts to transmission of 2,844 bytes (about 23 kilobits) per second for each processing node. This inter-node communication does not tax a 100 megabit-per-second Ethernet. The Ethernet also easily handles the end-of-generation messages (usually involving less than 10,000 bytes each and occurring only once per generation) from each of the processing.nodes to the host processor (as well as other less frequent messages).

The DEC Alpha® 164LX processor is available on a motherboard with the ATX form factor. A standard midtower-style case for a DEC Alpha® motherboard with the ATX form factor is available as an off-the-shelf commodity product. Such a case solves the electromagnetic emission problems associated with a 533 MHz microprocessor as well as the heat dissipation requirements associated with the Alpha® chip. The use of standard cases does not minimize the space occupied by the system; however, it provides a highly cost-effective solution to the emission and heat problems. The standard 230 watt power supplies (produced and priced as a commodity product) are similarly cost-effective. Each processing node has three fans (one for the Alpha® microprocessor chip, one for the power supply, and one for the case). The fan on the microprocessor contains a sensor that shuts down the node if it fails.

An Ethernet ("dumb") hub may be sufficient for a 10-node system. However, in a larger system, for example, (such as a 56-node system), Ethernet ("smart") switches are required in conjunction with the hubs. In one embodiment, a 16-port switch such as a Bay Networks BayStack 350T 16-port 10/100 BT Ethernet switch for every 15 processing nodes is suitable.

An uninterruptable power supply (UPS) providing 15 minutes of support for the system is advisable.

Linux is the most common operating system used on individual nodes of Beowulf-style parallel computer systems (whether the nodes are Alpha® processors, Pentium® processors, or other processors). The Linux operating system is remarkably robust. The relatively small size of the Linux operating system obviates the need for disk storage at each processing node. Since the main requirement for memory in genetic programming work is storage of the population and the relatively small genetic programming application, in one embodiment no hard disks are used at each processing node. In this embodiment, diskless booting of the processing nodes is handled by using the BOOTP protocol and configuring the host computer as a BOOTP server.

In one embodiment, the host computer receives the end-of-generation reports from each processing node. The host creates an output file containing statistics about the run and all pace-setting individuals. In this embodiment, this file is stored on the hard disk of the host computer. Since communication between the host processor and the processing nodes is by means of Ethernet, in one embodiment, the host computer need not be an Alpha® processor and need not employ the Linux operating system. In alternate embodiments, it is possible to have a heterogeneous mixture of processing nodes with different types of computers, running different operating systems, at various nodes in the overall system.

Figure 9:
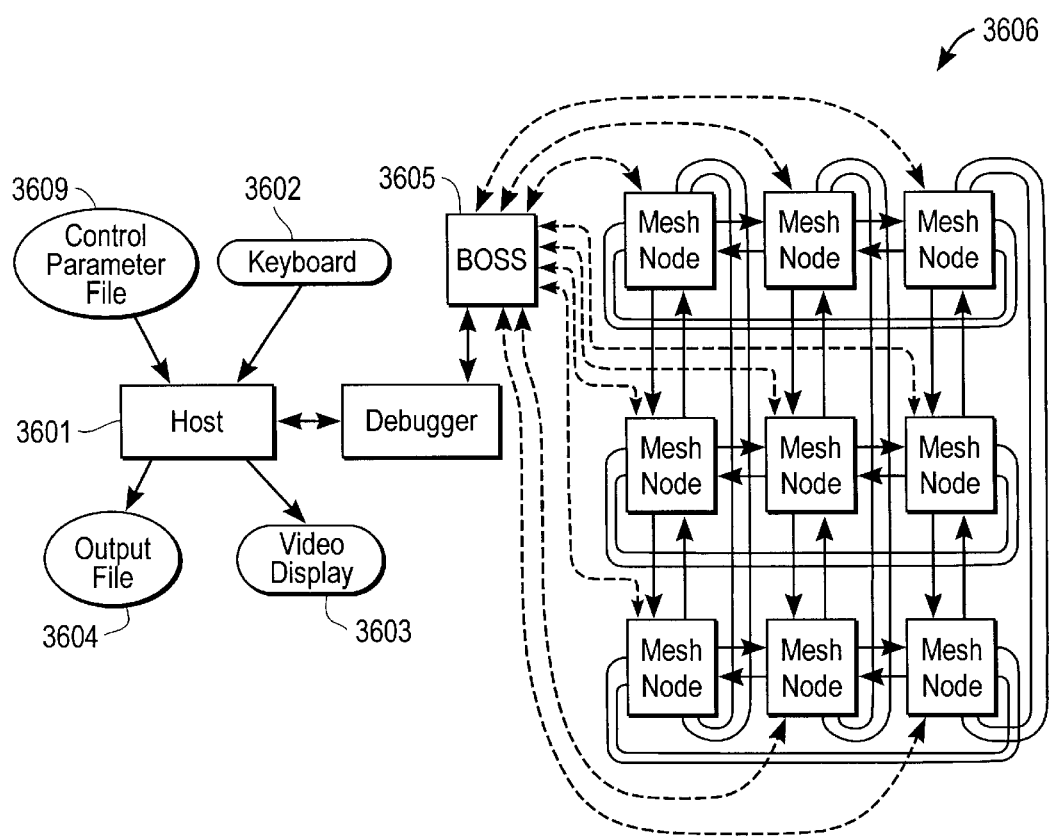
FIG. 9 is a block diagram of one embodiment of a parallel genetic programming system.

The physical system used in one implementation of parallel genetic programming uses a DEC Alpha® processor type computer as a host and a network of processing nodes. FIG. 9 shows the various elements of the system. These elements are arranged in an overall system consisting of the following:

(1) the host computer consisting of a keyboard 3602, a video display monitor 3603, and a large disk memory 3604, (2) a processor 3605 containing the central supervisory process (the Boss process), and (3) the 56 processors 3606 of the parallel network, each running a Monitor process, a Breeder process, an Exporter process, and an Importer Process.

A DEC Alpha® computer 3601 is the host and acts as the file server for the overall system. The "Boss Node" 3605 contains the central supervisory process for running genetic programming.

Conclusion

Several variations in the implementation for a system and method for a genetic programming problem solver that automatically generates computer programs to solve arbitrary problems using architecture-altering operations and a predefined set of terminals and functions have been described.

The specific arrangements and methods herein are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather, it is limited only by the appended claims.

What is claimed is:

1. A computer-implemented method for solving problems comprising:

creating a population of programmatic entities from a set of generic functions; and generating a solution to the problem by, altering an architecture of at least one programmatic entity of the population of programmatic entities by performing at least one of an automatically defined loop operation, an automatically defined recursion operation, and an automatically defined store operation, and evolving the population to generate a new entity.

2. The method defined in claim 1 wherein altering the Architecture comprises performing two or more of the automatically defined loop operation, the automatically defined recursion operation, and the automatically defined store operation.

3. The method defined in claim 1 wherein altering the architecture comprises performing the automatically defined loop operation, the automatically defined recursion operation, and the automatically defined store operation.

4. The method defined in claim 1 wherein evolving the population further comprises creating at least one new entity having sub-entities, wherein at least one of the sub-entities is externally invocable and at least one of the new entities has a first internally invocable sub-entity, the at least one externally invocable sub-entity including at least one invocation of the first internally invocable sub-entity.

5. The method defined in claim 4 wherein the at least one of the sub-entities comprises a second internally invocable sub-entity, wherein the second internally invocable sub-entity comprises an invocation of the first internally invocable sub-entity.

6. The method defined in claim 4 wherein the first internally invocable sub-entity comprises a subroutine.

7. The method defined in claim 1 wherein the set of generic functions comprises addition, subtraction, multiplication, division, and at least one conditional operation.

8. The method defined in claim 1 further comprises performing a storage creation operation by selecting an entity from the population of programmatic entities; and adding a new storage definition branch to the selected entity.

9. The method defined in claim 8 wherein adding a new storage definition branch comprises:

choosing a storage dimension and storage type for the new storage definition branch;

selecting an ordered set of storage sizes responsive to the storage dimension and storage size, the set of storage sized being appropriate for the storage dimension and storage size;

adding a storage writing branch and a storage reading branch to the new storage definition branch;

inserting a storage read branch and storage write branch pair into the selected entity; and inserting a copy of the storage read branch and storage write branch pair for each dimension of the storage definition branch greater than one.

10. The method defined in claim 1 further comprises performing a storage addition operation by:

selecting an entity from the population of entities;

adding a new storage definition branch to the selected entity;

choosing a storage dimension, storage type, and storage size for the new storage definition branch;

adding a storage writing branch and a storage reading branch to the new storage definition branch;

choosing a node within the selected entity;

inserting a storage read branch and storage write branch pair at the node, wherein a write branch consists of a subtree rooted at the node; and inserting a copy of the storage read branch and storage write branch pair into the selected entity for each dimension of the storage definition branch greater than one.

11. The method defined in claim 1 further comprises performing a storage deletion operation by:

selecting an entity from the population of entities;

choosing a storage read branch and storage write branch pair in the selected entity;

deleting the storage read branch and storage write branch pair;

removing references to the selected storage read branch and storage write branch pair from the set of terminals and set of functions; and deleting all invocations of the deleted storage read branch and storage write branch pair from the selected entity.

12. The method defined in claim 1 further comprises performing a storage duplication operation by:

selecting an entity from the population of entities;

choosing a storage read branch and storage write branch pair in the selected entity;

duplicating the storage read branch and storage write branch pair in the selected entity; and replicating preexisting invocations of the chosen storage read branch and storage write branch pair with invocations of the duplicated storage read branch and storage write branch pair.

13. The method defined in claim 1 further comprises performing a storage argument duplication operation by:

selecting an entity from the population of entities;

choosing a storage read branch and storage write branch pair in the selected entity;

choosing an argument from an argument list of a storage definition branch corresponding to the storage read branch and storage write branch pair;

adding a new argument to the argument list which is a copy of the argument;

duplicating the new argument for all invocations of the argument list of the storage read branch and storage write branch pair in the selected entity; and replicating preexisting storage in the selected entity.

14. The method defined in claim 1 further comprises performing a storage argument deletion operation by:

selecting an entity from the population of entities;

choosing a storage read branch and storage write branch pair in the selected entity;

choosing an argument from an argument list of a storage definition branch corresponding to the storage read branch and storage write branch pair;

deleting the argument in the argument list;

deleting all subtrees in the selected entity corresponding to the argument;

replacing all occurrences of the argument with a surviving argument from the argument list; and compressing preexisting storage in the selected entity.

15. The method defined in claim 1 wherein evolving the population comprises invoking an internally invokable sub-entity that provides a memory allocation for least one entity in the population.

16. The method defined in claim 1 further comprises performing a storage creation operation by:

selecting an entity from the population of entities; and adding a new storage definition branch to the selected entity.

17. The method defined in claim 16 wherein adding the new storage definition branch comprises:

choosing a storage dimension, storage type, and storage size for the new storage definition branch;

adding a storage writing branch and a storage reading branch to the new storage definition branch;

inserting a storage read branch and storage write branch pair into the selected entity; and inserting a copy of the storage read branch and storage write branch pair for each dimension of the storage definition branch greater than one.

18. The method defined in claim 1 further comprises performing a storage addition operation by:

selecting an entity from the population of entities;

adding a new storage definition branch to the selected entity;

choosing a storage dimension, storage type, and storage size for the new storage definition branch;

adding a storage writing branch and a storage reading branch to the new storage definition branch;

choosing a node within the selected entity;

inserting a storage read branch and storage write branch pair at the node, wherein a write branch consists of a subtree rooted at the node; and inserting a copy of the storage read branch and storage write branch pair into the selected entity for each dimension of the storage definition branch greater than one.

19. The method defined in claim 1 further comprises performing a storage deletion operation by:

selecting an entity from the population of entities;

choosing a storage read branch and storage write branch pair in the selected entity;

deleting the storage read branch and storage write branch pair;

removing references to the selected storage read branch and storage write branch pair from the set of terminals and set of functions; and deleting all invocations of the deleted storage read branch and storage write branch pair from the selected entity.

20. The method defines in claim 1 further comprises performing a storage duplication operation by:

selecting an entity from the population of entities;

choosing a storage read branch and storage write branch pair in the selected entity;

duplicating the storage read branch and storage write branch pair in the selected entity; and replicating preexisting invocations of the chosen storage read branch and storage write branch pair with invocations of the duplicated storage read branch and storage write branch pair.

21. The method defined in claim 1 further comprises performing a storage argument duplication operation by:
- selecting an entity from the population of entities;
- choosing a storage read branch and storage write branch pair in the selected entity;
- choosing an argument from an argument list of a storage definition branch corresponding to the storage read branch and storage write branch pair;
- adding a new argument to the argument list which is a copy of the argument;
- duplicating the new argument for all invocations of the argument list of the storage read branch and storage write branch pair in the selected entity; and
- replicating preexisting storage in the selected entity.

22. The method defined in claim 1 further comprises performing a storage argument deletion operation by:
- selecting an entity from the population of entities;
- choosing a storage read branch and storage write branch pair in the selected entity;
- choosing an argument from an argument list of a storage definition branch corresponding to the storage read branch and storage write branch pair;
- deleting the argument in the argument list;
- deleting all subtrees in the selected entity corresponding to the argument;
- replacing all occurrences of the argument with a surviving argument from the argument list; and
- compressing preexisting storage in the selected entity.

23. The method defined in claim 1 further comprises performing a loop creation operation by:
- selecting an entity from the population of entities; and
- adding a new loop definition branch to the selected entity.

24. The method defined in claim 23 wherein adding a new loop definition branch comprises:
- adding a loop initialization branch to the new loop definition branch;
- adding a loop condition branch to the new loop definition branch;
- adding a loop update branch to the new loop definition branch;
- adding a loop body branch to the new loop definition branch; and
- inserting an invocation of the new loop definition branch within the selected entity.

25. The method defined in claim 24 wherein adding a loop initialization branch comprises:
- choosing a first node in the selected entity; and
- attaching a copy of the subtree rooted at the first node to the loop initialization branch.

26. The method defined in claim 24 wherein adding a loop condition branch comprises:
- choosing a second node in the selected entity; and
- attaching a copy of the subtree rooted at the second node to the loop condition branch.

27. The method defined in claim 24 wherein adding a loop update branch comprises:
- choosing a third node in the selected entity; and
- attaching a copy of the subtree rooted at the third node to the loop update branch.

28. The method defined in claim 24 wherein adding a loop body branch comprises:
- choosing a fourth node in the selected entity; and
- attaching a copy of the subtree rooted at the fourth node to the loop body branch.

29. The method defined in claim 28 further comprising replacing the subtree rooted at the fourth node with an invocation of the new loop definition branch.

30. The method defined in claim 1 further comprises performing a loop creation operation by:
- selecting an entity from the population of entities;
- adding a new loop definition branch to the selected entity;
- choosing a first node in the selected entity;
- adding a loop initialization branch to the new loop definition branch, wherein the loop initialization branch consists of a copy of the subtree rooted at the first node;
- choosing a second node in the selected entity;
- adding a loop condition branch to the new loop definition branch, wherein the loop condition branch consists of a copy of the subtree rooted at the second node;
- choosing a third node in the selected entity;
- adding a loop update branch to the new loop definition branch, wherein the loop update branch consists of a copy of the subtree rooted at the third node;
- choosing a fourth node in the selected entity;
- adding a loop body branch to the new loop definition branch, wherein the loop body branch consists of a copy of the subtree rooted at the fourth node; and
- replacing the subtree rooted at the fourth node with an invocation of the new loop definition branch.

31. The method defined in claim 1 further comprises performing a loop duplication operation by:
- selecting an entity from the population of entities;
- creating a new loop definition branch in the selected entity by copying an existing loop definition in the selected entity; and
- randomly replacing invocations of the existing loop definition branch in the selected entity with invocations of the new loop definition branch.

32. The method defined in claim 1 further comprises performing a recursion creation operation by:
- selecting an entity from the population of entities; and
- creating a new recursion definition branch in the selected entity.

33. The method defined in claim 32 wherein creating a new recursion definition branch comprises:
- adding a recursion ground branch to the new recursion definition branch;
- adding a recursion condition branch to the new recursion definition branch;
- adding a recursion update branch to the new recursion definition branch;
- adding a recursion body branch to the new recursion definition branch;
- replacing a node terminal of the recursion body branch with an invocation to the argument list of the new recursion definition branch;
- inserting an invocation to the new recursion definition branch within the selected entity;
- randomly replacing an invocation of an argument subtree within the recursion definition branch with an invocation of the new recursion definition branch.

34. The method defined in claim 33 wherein adding a recursion ground branch comprises:
- choosing a first node in the selected entity;
- attaching a copy of the subtree rooted at the first node to the recursion ground branch; and replacing a terminal node of the recursion ground branch with an invocation of an argument list of the new recursion definition branch.

35. The method defined in claim 33 wherein adding a recursion condition branch comprises:

choosing a second node in the selected entity;

attaching a copy of the subtree rooted at the second node to the recursion condition branch; and replacing a terminal node of the recursion condition branch with an invocation of an argument list of the new recursion definition branch.

36. The method defined in claim 33 wherein adding a recursion update branch comprises:

choosing a third node in the selected entity;

attaching a copy of the subtree rooted at the third node to the recursion update branch; and replacing a terminal node of the recursion update branch with an invocation of an argument list of the new recursion definition branch.

37. The method defined in claim 33 wherein adding a recursion body branch comprises:

choosing a fourth node in the selected entity;

attaching a copy of the subtree rooted at the fourth node to the recursion body branch; and replacing a terminal node of the recursion body branch with an invocation of an argument list of the new recursion definition branch.

38. The method defined in claim 1 further comprises performing a recursion creation operation by:

selecting an entity from the population of entities;

creating a new recursion definition branch in the selected entity;

choosing a first node in the selected entity;

adding a recursion ground branch to the new recursion definition branch, wherein the recursion ground branch consists of a copy of the subtree rooted at the first node;

replacing a terminal node of the recursion ground branch with an invocation of an argument list of the new recursion definition branch;

choosing a second node in the selected entity;

adding a recursion condition branch to the new recursion definition branch, wherein the recursion condition branch consists of a copy of the subtree rooted at the second node;

replacing a node terminal of the recursion condition branch with an invocation of the argument list of the new recursion definition branch;

choosing a third node in the selected entity;

adding a recursion update branch to the new recursion definition branch, wherein the recursion update branch consists of a copy of the subtree rooted at the third node;

replacing a node terminal of the recursion update branch with an invocation to the argument list of the new recursion definition branch;

choosing a fourth node in the selected entity;

adding a recursion body branch to the new recursion definition branch, wherein the recursion body branch consists of a copy of the subtree rooted at the fourth node;

replacing a node terminal of the recursion body branch with an invocation to the argument list of the,new recursion definition branch;

replacing the subtree rooted at the fourth node with an invocation to the new recursion definition branch;

randomly replacing an invocation of an argument subtree within the recursion definition branch with an invocation of the new recursion definition branch.

39. A computer-implemented method for solving problems comprising:

creating a population of programmatic entities from a set of generic functions;

determining the behavior of each of the entities in the population; and generating a solution to the problem by,
altering an architecture of at least one programmatic entity of the population of programmatic entities by performing at least one of an automatically defined loop operation, an automatically defined recursion operation, and an automatically defined store operation, and adding the at least one new entity to the population of entities.

40. A computer-readable medium for solving problems, the computer-readable medium containing executable program instructions for performing iterations of a series of steps, each iteration comprising:

creating a population of programmatic entities from a set of generic functions; and generating a solution to the problem by,
altering an architecture of at least one programmatic entity of the population of programmatic entities by invocation of at least one of an automatically defined loop operation, an automatically defined recursion operation, and an automatically defined store operation, and evolving the population to generate a new entity.

41. The medium defined in claim 40 wherein altering the architecture comprises performing two or more of the automatically defined loop operation, the automatically defined recursion operation, and the automatically defined store operation.

42. The medium defined in claim 40 wherein altering the architecture comprises performing the automatically defined loop operation, the automatically defined recursion operation, and the automatically defined store operation.

43. The medium defined in claim 40 wherein evolving the population further comprises creating at least one new entity having sub-entities, wherein at least one of the sub-entities is externally invocable and at least one of the new entities has a first internally invocable sub-entity, the at least one externally invocable sub-entity including at least one invocation of the first internally invocable sub-entity.

44. The medium defined in claim 43 wherein the at least one of the sub-entities comprises a second internally invocable sub-entity, wherein the second internally invocable sub-entity comprises an invocation of the first internally invocable sub-entity.

45. The medium defined in claim 43 wherein the first internally invocable sub-entity comprises a subroutine.

46. The medium defined in claim 40 wherein the set of generic functions comprises addition, subtraction, multiplication, division, and at least one conditional operation.

47. The medium defined in claim 40 further comprises performing a storage creation operation by selecting an entity from the population of programmatic entities; and adding a new storage definition branch to the selected entity.

48. The medium defined in claim 47 wherein adding a new storage definition branch comprises:
- choosing a storage dimension and storage type for the new storage definition branch;
- selecting an ordered set of storage sizes responsive to the storage dimension and storage size, the set of storage sized being appropriate for the storage dimension and storage size;
- adding a storage writing branch and a storage reading branch to the new storage definition branch;
- inserting a storage read branch and storage write branch pair into the selected entity; and
- inserting a copy of the storage read branch and storage write branch pair for each dimension of the storage definition branch greater than one.

49. The medium defined in claim 40 further comprises performing a storage addition operation by:
- selecting an entity from the population of entities;
- adding a new storage definition branch to the selected entity;
- choosing a storage dimension, storage type, and storage size for the new storage definition branch;
- adding a storage writing branch and a storage reading branch to the new storage definition branch;
- choosing a node within the selected entity;
- inserting a storage read branch and storage write branch pair at the node, wherein a write branch consists of a subtree rooted at the node; and
- inserting a copy of the storage read branch and storage write branch pair into the selected entity for each dimension of the storage definition branch greater than one.

50. The medium defined in claim 40 further comprises performing a storage deletion operation by:
- selecting an entity from the population of entities;
- choosing a storage read branch and storage write branch pair in the selected entity;
- deleting the storage read branch and storage write branch pair;
- removing references to the selected storage read branch and storage write branch pair from the set of terminals and set of functions; and
- deleting all invocations of the deleted storage read branch and storage write branch pair from the selected entity.

51. The medium defined in claim 40 further comprises performing a storage duplication operation by:
- selecting an entity from the population of entities;
- choosing a storage read branch and storage write branch pair in the selected entity;
- duplicating the storage read branch and storage write branch pair in the selected entity; and
- replicating preexisting invocations of the chosen storage read branch and storage write branch pair with invocations of the duplicated storage read branch and storage write branch pair.

52. The medium defined in claim 40 further comprises performing a storage argument duplication operation by:
- selecting an entity from the population of entities;
- choosing a storage read branch and storage write branch pair in the selected entity;
- choosing an argument from an argument list of a storage definition branch corresponding to the storage read branch and storage write branch pair;
- adding a new argument to the argument list which is a copy of the argument;
- duplicating the new argument for all invocations of the argument list of the storage read branch and storage write branch pair in the selected entity; and
- replicating preexisting storage in the selected entity.

53. The medium defined in claim 40 further comprises performing a storage argument deletion operation by:
- selecting an entity from the population of entities;
- choosing a storage read branch and storage write branch pair in the selected entity;
- choosing an argument from an argument list of a storage definition branch corresponding to the storage read branch and storage write branch pair;
- deleting the argument in the argument list;
- deleting all subtrees in the selected entity corresponding to the argument;
- replacing all occurrences of the argument with a surviving argument from the argument list; and
- compressing preexisting storage in the selected entity.

54. The medium defined in claim 40 wherein evolving the population comprises invoking an internally invokable subentity that provides a memory allocation for least one entity in the population.

55. The medium defined in claim 40 further comprises performing a storage creation operation by:
- selecting an entity from the population of entities; and
- adding a new storage definition branch to the selected entity.

56. The medium defined in claim 55 wherein adding the new storage definition branch comprises:
- choosing a storage dimension, storage type, and storage size for the new storage definition branch;
- adding a storage writing branch and a storage reading branch to the new storage definition branch;
- inserting a storage read branch and storage write branch pair into the selected entity; and
- inserting a copy of the storage read branch and storage write branch pair for each dimension of the storage definition branch greater than one.

57. The medium defined in claim 40 further comprises performing a storage addition operation by:
- selecting an entity from the population of entities;
- adding a new storage definition branch to the selected entity;
- choosing a storage dimension, storage type, and storage size for the new storage definition branch;
- adding a storage writing branch and a storage reading branch to the new storage definition branch;
- choosing a node within the selected entity;
- inserting a storage read branch and storage write branch pair at the node, wherein a write branch consists of a subtree rooted at the node; and
- inserting a copy of the storage read branch and storage write branch pair into the selected entity for each dimension of the storage definition branch greater than one.

58. The medium defined in claim 40 further comprises performing a storage deletion operation by:
- selecting an entity from the population of entities;
- choosing a storage read branch and storage write branch pair in the selected entity;
- deleting the storage read branch and storage write branch pair;

removing references to the selected storage read branch and storage write branch pair from the set of terminals and set of functions; and deleting all invocations of the deleted storage read branch and storage write branch pair from the selected entity.

59. The medium defines in claim 40 further comprises performing a storage duplication operation by:

selecting an entity from the population of entities;

choosing a storage read branch and storage write branch pair in the selected entity;

duplicating the storage read branch and storage write branch pair in the selected entity; and replicating preexisting invocations of the chosen storage read branch and storage write branch pair with invocations of the duplicated storage read branch and storage write branch pair.

60. The medium defined in claim 40 further comprises performing a storage argument duplication operation by:

selecting an entity from the population of entities;

choosing a storage read branch and storage write branch pair in the selected entity;

choosing an argument from an argument list of a storage definition branch corresponding to the storage read branch and storage write branch pair;

adding a new argument to the argument list which is a copy of the argument;

duplicating the new argument for all invocations of the argument list of the storage read branch and storage write branch pair in the selected entity; and replicating preexisting storage in the selected entity.

61. The medium defined in claim 40 further comprises performing a storage argument deletion operation by:

selecting an entity from the population of entities;

choosing a storage read branch and storage write branch pair in the selected entity;

choosing an argument from an argument list of a storage definition branch corresponding to the storage read branch and storage write branch pair;

deleting the argument in the argument list;

deleting all subtrees in the selected entity corresponding to the argument;

replacing all occurrences of the argument with a surviving argument from the argument list; and compressing preexisting storage in the selected entity.

62. The medium defined in claim 40 further comprises performing a loop creation operation by:

selecting an entity from the population of entities; and adding a new loop definition branch to the selected entity.

63. The medium defined in claim 62 wherein adding a new loop definition branch comprises:

adding a loop initialization branch to the new loop definition branch;

adding a loop condition branch to the new loop definition branch;

adding a loop update branch to the new loop definition branch;

adding a loop body branch to the new loop definition branch; and inserting an invocation of the new loop definition branch within the selected entity.

64. The medium defined in claim 63 wherein adding a loop initialization branch comprises:

choosing a first node in the selected entity; and attaching a copy of the subtree rooted at the first node to the loop initialization branch.

65. The medium defined in claim 63 wherein adding a loop condition branch comprises:

choosing a second node in the selected entity; and attaching a copy of the subtree rooted at the second node to the loop condition branch.

66. The medium defined in claim 63 wherein adding a loop update branch comprises:

choosing a third node in the selected entity; and attaching a copy of the subtree rooted at the third node to the loop update branch.

67. The medium defined in claim 63 wherein adding a loop body branch comprises:

choosing a fourth node in the selected entity; and attaching a copy of the subtree rooted at the fourth node to the loop body branch.

68. The medium defined in claim 67 further comprising replacing the subtree rooted at the fourth node with an invocation of the new loop definition branch.

69. The medium defined in claim 40 further comprises performing a loop creation operation by:

selecting an entity from the population of entities;

adding a new loop definition branch to the selected entity;

choosing a first node in the selected entity;

adding a loop initialization branch to the new loop definition branch, wherein the loop initialization branch consists of a copy of the subtree rooted at the first node;

choosing a second node in the selected entity;

adding a loop condition branch to the new loop definition branch, wherein the loop condition branch consists of a copy of the subtree rooted at the second node;

choosing a third node in the selected entity;

adding a loop update branch to the new loop definition branch, wherein the loop update branch consists of a copy of the subtree rooted at the third node;

choosing a fourth node in the selected entity;

adding a loop body branch to the new loop definition branch, wherein the loop body branch consists of a copy of the subtree rooted at the fourth node; and replacing the subtree rooted at the fourth node with an invocation of the new loop definition branch.

70. The medium defined in claim 40 further comprises performing a loop duplication operation by:

selecting an entity from the population of entities;

creating a new loop definition branch in the selected entity by copying an existing loop definition in the selected entity; and randomly replacing invocations of the existing loop definition branch in the selected entity with invocations of the new loop definition branch.

71. The medium defined in claim 40 further comprises performing a recursion creation operation by:

selecting an entity from the population of entities; and creating a new recursion definition branch in the selected entity.

72. The medium defined in claim 71 wherein creating a new recursion definition branch comprises:

adding a recursion ground branch to the new recursion definition branch;

adding a recursion condition branch to the new recursion definition branch;

adding a recursion update branch to the new recursion definition branch;

adding a recursion body branch to the new recursion definition branch;

replacing a node terminal of the recursion body branch with an invocation to the argument list of the new recursion definition branch;

inserting an invocation to the new recursion definition branch within the selected entity;

randomly replacing an invocation of an argument subtree within the recursion definition branch with an invocation of the new recursion definition branch.

73. The medium defined in claim 72 wherein adding a recursion ground branch comprises:

choosing a first node in the selected entity;

attaching a copy of the subtree rooted at the first node to the recursion ground branch; and replacing a terminal node of the recursion ground branch with an invocation of an argument list of the new recursion definition branch.

74. The medium defined in claim 72 wherein adding a recursion condition branch comprises:

choosing a second node in the selected entity;

attaching a copy of the subtree rooted at the second node to the recursion condition branch; and replacing a terminal node of the recursion condition branch with an invocation of an argument list of the new recursion definition branch.

75. The medium defined in claim 72 wherein adding a recursion update branch comprises:

choosing a third node in the selected entity;

attaching a copy of the subtree rooted at the third node to the recursion update branch; and replacing a terminal node of the recursion update branch with an invocation of an argument list of the new recursion definition branch.

76. The medium defined in claim 72 wherein adding a recursion body branch comprises:

choosing a fourth node in the selected entity;

attaching a copy of the subtree rooted at the fourth node to the recursion body branch; and replacing a terminal node of the recursion body branch with an invocation of an argument list of the new recursion definition branch.

77. The medium defined in claim 40 further comprises performing a recursion creation operation by:

selecting an entity from the population of entities;

creating a new recursion definition branch in the selected entity;

choosing a first node in the selected entity;

adding a recursion ground branch to the new recursion definition branch, wherein the recursion ground branch consists of a copy of the subtree rooted at the first node;

replacing a terminal node of the recursion ground branch with an invocation of an argument list of the new recursion definition branch;

choosing a second node in the selected entity;

adding a recursion condition branch to the new recursion definition branch, wherein the recursion condition branch consists of a copy of the subtree rooted at the second node;

replacing a node terminal of the recursion condition branch with an invocation of the argument list of the new recursion definition branch;

choosing a third node in the selected entity;

adding a recursion update branch to the new recursion definition branch, wherein the recursion update branch consists of a copy of the subtree rooted at the third node;

replacing a node terminal of the recursion update branch with an invocation to the argument list of the new recursion definition branch;

choosing a fourth node in the selected entity;

adding a recursion body branch to the new recursion definition branch, wherein the recursion body branch consists of a copy of the subtree rooted at the fourth node;

replacing a node terminal of the recursion body branch with an invocation to the argument list of the new recursion definition branch;

replacing the subtree rooted at the fourth node with an invocation to the new recursion definition branch;

randomly replacing an invocation of an argument subtree within the recursion definition branch with an invocation of the new recursion definition branch.

78. A computer-readable medium for solving problems, the computer-readable medium containing executable program instructions for performing iterations of a series of steps, each iteration comprising:

creating a population of programmatic entities from a set of generic functions;

determining the behavior of each of the entities in the population; and generating a solution to the problem by, altering an architecture of at least one programmatic entity of the population of programmatic entities by performing at least one of an automatically defined loop operation, an automatically defined recursion operation, and an automatically defined store operation, and adding the at least one new entity to the population of entities.

79. A system for solving problems comprising:

means for creating a population of programmatic entities from a set of generic functions; and means for generating a solution to the problem by, means for altering an architecture of at least one programmatic entity of the population of programmatic entities by means for performing at least one of an automatically defined loop operation, an automatically defined recursion operation, and an automatically defined store operation, and means for evolving the population to generate a new entity.

80. The system defined in claim 79 wherein means for altering the architecture comprises means for performing two or more of the automatically defined loop operation, the automatically defined recursion operation, and the automatically defined store operation.

81. The system defined in claim 79 wherein means for altering the architecture comprises means for performing the automatically defined loop operation, the automatically defined recursion operation, and the automatically defined store operation.

82. A system for solving problems comprising:

means for creating a population of programmatic entities from a set of generic functions;

means for determining the behavior of the entity; and means for generating a solution to the problem by, means for altering an architecture of at least one programmatic entity of the population of programmatic entities by means for at least one of an automatically defined loop operation, an automatically defined recursion operation, and an automatically defined store operation, and means for adding the at least one new entity to the population of entities.

83. A computer-implemented method for solving a problem comprising:

creating a population of programmatic entities from a set of generic functions; and generating a solution to the problem by altering an architecture of at least one programmatic entity of the population of programmatic entities by performing at least one of an automatically defined loop operation, an automatically defined recursion operation, and an automatically defined store operation using one or more of a plurality of processors, and evolving the population to generate a new entity using one or more of the plurality of processors.

84. A computer-implemented method for solving arbitrary problems comprising:

creating a population of programmatic entities for each of the arbitrary problems from a set of generic functions; and generating a solution to each of the arbitrary problems by altering an architecture of at least one programmatic entity of the population of programmatic entities, and evolving the population to generate a new entity.

* * * * *

UNITED STATES PATENT AND TRADEMARK OFFICE
CERTIFICATE OF CORRECTION

PATENT NO. : 6,532,453 B1  
DATED : March 11, 2003  
INVENTOR(S) : Koza et al.

It is certified that error appears in the above-identified patent and that said Letters Patent is hereby corrected as shown below:

<u>Title page, Item [54] and Column 1, line 3,</u>
After "STORES" insert -- , --.

<u>Column 4,</u>
Line 25, delete "on.variables" and insert -- on variables --.

<u>Column 6,</u>
Line 57, delete "second.embodiment" and insert -- second embodiment --.

<u>Column 8,</u>
Line 28, delete "need.for" and insert -- need for --.

<u>Column 9,</u>
Line 56, delete "conform.to" and insert -- confirm to --.

<u>Column 10,</u>
Line 3, delete "in.that" and insert -- in that --.
Line 7, delete "the.branches." and insert -- the branches --.
Line 34, delete "duplicate;" and insert -- duplicate, --.

<u>Column 19,</u>
Line 44, delete "computing.the" and insert -- computing the --.

<u>Column 20,</u>
Line 5, delete "e".
Line 14, after "figure" insert -- . --.
Line 53, delete "4000" and insert -- 1000 --.

<u>Column 21,</u>
Line 18, delete "value.of" and insert -- value of --.

<u>Column 25,</u>
Line 36, delete "the.newly" and insert -- the newly --.

<u>Column 28,</u>
Line 60, "1230.and" and insert -- 1230 and --.

<u>Column 32,</u>
Line 31, delete "to.use" and insert -- to use --.

UNITED STATES PATENT AND TRADEMARK OFFICE
CERTIFICATE OF CORRECTION

PATENT NO. : 6,532,453 B1
DATED : March 11, 2003
INVENTOR(S) : Koza et al.

It is certified that error appears in the above-identified patent and that said Letters Patent is hereby corrected as shown below:

<u>Column 33,</u>
Line 38, delete "is.an" and insert -- is an --.

<u>Column 34,</u>
Line 58, delete "be.written" and insert -- be written --.

<u>Column 62,</u>
Line 51, delete "processing.nodes" and insert -- processing nodes --.

<u>Column 63,</u>
Line 8, delete "Ethemet" and insert -- Ethernet --.

<u>Column 64,</u>
Line 18, delete "Architecture" and insert -- architecture --.

Signed and Sealed this

Fifth Day of August, 2003

JAMES E. ROGAN
*Director of the United States Patent and Trademark Office*